United States Patent [19]
Shimizu et al.

[11] Patent Number: 6,012,218
[45] Date of Patent: Jan. 11, 2000

[54] PROCESS FOR PRODUCING THIN FILM MAGNETIC HEADS

[75] Inventors: Yoshiaki Shimizu, Mino; Fumio Tatezono, Hirakata; Naoto Matono, Nishinomiya; Takashi Ogura, Kyotanabe; Hiroyuki Okuda, Kadoma; Katsumi Umeda, Higashiosaka, all of Japan

[73] Assignee: Sanyo Electric Co., Ltd., Osaka, Japan

[21] Appl. No.: 09/042,631

[22] Filed: Mar. 17, 1998

[30] Foreign Application Priority Data

Mar. 18, 1997 [JP] Japan ................................. 9-065037
Mar. 27, 1997 [JP] Japan ................................. 9-076191

[51] Int. Cl.⁷ ........................................ G11B 5/42
[52] U.S. Cl. ........................... 29/603.14; 29/603.15
[58] Field of Search ........................ 29/603.14, 603.15, 29/603.13; 427/131, 132; 360/126, 125, 122

[56] References Cited

U.S. PATENT DOCUMENTS 5,673,474  10/1997  Watterston ........................ 29/603.14

*Primary Examiner*—Carl E. Hall
*Attorney, Agent, or Firm*—Nikaido Marmelstein Murray & Oram, LLP

[57] ABSTRACT

The invention provides a thin film magnetic head including an upper core layer 9 which comprises a front first core layer 91a formed on a gap spacer layer 6 and having the same width as a track width on the recording medium at least in the vicinity of the face to be opposed to a recording medium, and a second core layer 92 extending from the medium-opposed face over the upper surface of the front first core layer 91a and further over the upper surface of an upper insulating layer 72. The upper core layer 9 has a thickness greater in a region extending from the medium-opposed face to a depth end restricting face DE of a lower insulating layer 71 than in a region extending over the upper surface of the upper insulating layer 72. The front first core layer 91a has an upper surface flush with the upper surface of the lower insulating layer 71. This structure gives an accurate track width and assures production with a high yield.

11 Claims, 41 Drawing Sheets

PROCESS FOR PRODUCING THIN FILM MAGNETIC HEADS

FIELD OF THE INVENTION

The present invention relates to thin film magnetic heads comprising an inductive head element, or thin film magnetic heads of the composite type comprising an inductive head element and a magnetoresistance effect (MR) head element integral therewith, and processes for producing such heads.

BACKGROUND OF THE INVENTION

For example, for use in hard disk drive devices as external memory devices for computers, attention has been directed in recent years to thin film magnetic heads of the composite type which comprise an inductive head element for recording signals and a magnetoresistance effect head element (hereinafter referred to as an "MR head element") for reproducing signals.

U.S. Pat. No. 5,438,747 discloses a composite-type thin film magnetic head, the structure of which is shown in FIG. 67, FIG. 68 (section taken along the line A—A in FIG. 67), FIG. 69 (section taken along the line B—B in FIG. 67) and FIG. 70 (section taken along the line C—C in FIG. 67). An upper insulating layer 72 and protective layer 12 are not shown in FIG. 67 for the sake of convenience.

The composite-type thin film magnetic head includes an MR head element comprising a lower shield layer 2, lower insulating layer 31, MR element layer 4, electrode layer (not shown) and upper insulating layer 32 which are successively formed as superposed on a substrate 1.

Provided on the MR head element is an inductive head element comprising a lower core layer 5, gap spacer layer 6, lower insulating layer 71, coil layer 8, upper insulating layer 72 and upper core layer 90 which are successively formed as superposed layers.

The lower core layer 5 comprises a shield layer 51 formed on the substrate (1) side thereof and having a large width, and a core layer 52 formed on the other side thereof and having a small width equal to the track wide on recording media in the vicinity of the face to be opposed to the medium. The core layer 5 serves the function of the magnetic core of the inductive head element and also performs the function of a magnetic shield between the inductive head element and the MR head element.

The upper core layer 90 comprises a first core layer 901 in the form of a thin film and formed on the substrate (1) side thereof, and a second core layer 902 in the form of a thick film and formed on the other side thereof. These first and second core layers 901, 902 have the same width as the track width in the vicinity of the medium-opposed face. As shown in FIG. 68, the core portion 52 of the lower core layer 5, gap spacer layer 6, first core layer 901 and second core layer 902 are aligned with one another on a vertical plane at each of opposite sides with respect to the direction of the track wide.

A protective layer 12 is formed over the MR head element and the inductive head element.

In producing the composite-type thin film magnetic head described, the upper core layer 90 is formed by plating with use of a resist frame, and the core portion 52 of the lower core layer 5 is thereafter formed by ion beam etching with the upper core layer 90 serving as a mask.

Alternatively, the core portion 52 of the lower core layer 5 and the upper core layer 90 can be formed at the same time by ion beam etching with use of a resist layer.

With the magnetic head of the type described, a large stepped portion C3 is formed between the surface of the gap spacer layer 6 and the surface of the upper insulating layer 72 as seen in FIG. 69. In fabricating the magnetic head, a resist frame or resist layer is provided on the stepped portion C3 to form the upper core layer 90.

However, it is difficult to accurately form the resist frame or resist layer on such a large stepped portion C3, and it is impossible to form the resist frame or layer in a predetermined configuration. The accuracy of the resist frame or layer formed is still lower especially in fabricating composite-type thin film magnetic heads having a reduced track width of up to 3 micrometers so as to achieve a higher recording density.

As a result, it is impossible to obtain an upper core layer of contemplated width and to obtain an accurate track width. This gives rise to the problem that the production process achieves a lower yield.

The present applicant has disclosed the technique of forming an upper core layer by ion beam etching with use of a double-layer resist in JP-A-161222/1997, whereas a great stepped portion is formed also in this case as is the case with the magnetic head described above, so that the double-layer resist formed is low in accuracy, a double-layer resist of specified configuration still remains to be obtained.

SUMMARY OF THE INVENTION

An object of the present invention is to provide a thin film magnetic head which has an accurate track width and which can be manufactured in a high yield.

Accordingly, we have conducted intensive research in an attempt to obtain an accurate track width to achieve an improved production yield, and found that the width of the track to be formed on the recording medium is determined by the lower layer portion of the upper core layer and is almost free of any influence of the upper layer portion of the upper core layer. This finding has matured to the present invention.

The present invention provides a thin film magnetic head having at least one inductive head element on a substrate, the inductive head element comprising, as formed between a lower core layer and an upper core layer, a lower nonmagnetic insulating layer disposed at a position retracted from a medium-opposed face to be opposed to a recording medium by a predetermined gap depth and having a depth end restricting face at the retracted position, and an upper insulating layer formed over the lower nonmagnetic insulating layer with a coil layer interposed therebetween. The inductive head element further comprises a gap spacer layer formed between the lower core layer and the upper core layer and extending from the medium-opposed face at least to the same depth as the depth end restricting face of the lower nonmagnetic insulating layer.

The upper core layer comprises a first core layer formed on the gap spacer layer and having the same width as a track width on the recording medium at least in the vicinity of the medium-opposed face, and a second core layer extending from the medium-opposed face over an upper surface of the first core layer and further over an upper surface of the upper insulating layer, the upper core layer having a thickness greater in a region extending from the medium-opposed face to the depth end restricting face DE of the lower insulating layer than in a region extending over the upper surface of the upper insulating layer. The first core layer has an upper surface flush with or higher than an upper surface of the lower nonmagnetic insulating layer.

More specifically, a magnetoresistance effect head element is provided under the inductive head element, and the lower core layer of the inductive head element comprises a core portion formed on the upper core layer side thereof and having a small width, and a shield portion formed on the substrate side thereof and having a greater width than the core portion, the gap spacer layer and the core portion of the lower core layer being aligned with the first core layer on a vertical plane at each of opposite sides thereof with respect to the direction of the track width.

The present invention provides a first process for producing a thin film magnetic head comprising a procedure for fabricating a magnetoresistance effect head element on a substrate 1, and a procedure for fabricating an inductive head element on the head element. The inductive head element fabricating procedure comprises the steps of:

forming a lower magnetic layer 500 on the magnetoresistance effect head element, forming a gap spacer layer 6 on a surface of the lower magnetic layer 500, forming on a surface of the gap spacer layer 6 a lower insulating layer 71 extending rearward from a position retracted from a medium-opposed face to be opposed to a recording medium by a predetermined gap depth, forming an upper magnetic layer 910 over the surface of the gap spacer layer 6 and a surface of the lower insulating layer 71, coating a surface of the upper magnetic layer 910 with a resist, forming a resist layer 99 by exposing the resulting resist coating to light and developing the exposed resist coating, the resist layer 99 having the same width as a track width on the recording medium in the vicinity of the medium-opposed face, forming a lower core layer 5 by etching the upper magnetic layer 910, the gap spacer layer 6 and an upper layer portion of the lower magnetic layer 500 with the resist layer 99 formed on the magnetic layer 910 to remove the upper magnetic layer 910, the gap spacer layer 6 and the upper layer portion of the lower magnetic layer 500 at the parts thereof extending outward from opposite sides of the resist layer 99 with respect to the direction of the track width and thereby form the upper layer portion of the lower magnetic layer 500 into a core portion 52 constituting the lower core layer 5 and having the same width as the track width on the recording medium in the vicinity of the medium-opposed face, removing the resist layer 99, level difference. In the step of forming the upper magnetic layer, therefore, the presence of the stepped portion C1 is negligible in determining the thickness of the upper magnetic layer 910. Further because the upper core layer 9 has a double-layer structure comprising the first core layer 91a and second core layer 92, the upper magnetic layer 910 to be made into the first core layer 91a can be made thinner by an amount corresponding to the thickness of the second core layer 92. The upper magnetic layer 910 has a small thickness, for example, of about 1.2 micrometers.

Generally etching with use of a resist layer requires that the resist layer be of a large thickness in conformity with the depth of etching, whereas the upper magnetic layer 910 can be of a small thickness in the process of the invention as stated above, so that the depth of etching in the lower core layer forming step to be performed later is smaller than in the prior art. Accordingly, the resist can be applied to a small thickness to the surface of the upper magnetic layer to a small thickness.

The resist coating is thus small in thickness, giving a resist layer with a high accuracy. The stepped portion C1 between the surface of the gap spacer layer 6 forming a first core layer 91a by machining the surface of the upper magnetic layer 910 and the surface of the lower insulating layer 71 to make the surfaces planar and form the upper magnetic layer 910 into the first core layer 91a, the first core layer 91a extending from the medium-opposed face to a front end face of the lower insulating layer 71, forming an upper insulating layer 72 over the resulting lower insulating layer 71 with a coil layer 8 interposed therebetween, and forming a second core layer 92 on a surface of the first core layer 91a and a surface of the upper insulating layer 72 to form an upper core layer 9 comprising the first core layer 91a and the second core layer 92, the second core layer extending from the medium-opposed face over the upper surface of the first core layer 91a and further over the upper surface of the upper insulating layer 72.

In the first production process, the lower insulating layer 71 formed by the step of forming this layer has a thickness, for example, of about 1.0 micrometer. Accordingly, the stepped portion C1 formed between the surface of the gap spacer layer 6 and the surface of the lower insulating layer 71 gives a small and the surface of the lower insulating layer 71 provides a small level difference, consequently given a substantially uniform thickness to the resist coating and precluding halation in the exposure step. As a result, the resist layer 99 formed has an improved accuracy.

The resist layer 99 thus prepared with a high accuracy serves as a mask for etching in the lower core layer forming step. This gives the upper magnetic layer 910 an accurately determined width as desired.

The upper layer portion of the lower magnetic layer 500 is made into a core portion 52 of desired width to provide a lower core layer 5. On the other hand, the lower layer portion of the lower magnetic layer 500 is not etched and therefore remains on the MR head element. The lower core layer 5 consequently formed comprises the core portion 52 having the same width as the track width in the vicinity of the medium-opposed face, and a shield portion 51 having a larger width than the core portion 52. The core portion 52 of the lower core layer 5 functions as the magnetic core of the inductive head element, while the shield portion 51 serves as a magnetic shield between the inductive head element and the MR head element.

In the first core layer forming step, the surface of the upper magnetic layer 910 is made planar by machining to expose the surface of the lower insulating layer 71 from the surface of the magnetic layer 910, and the surface of the magnetic layer 910 and the surface of the lower insulating layer 71 are further made planar by machining. Upon the two surfaces becoming flush, the machining operation is discontinued. As a result, the upper magnetic layer 910 remains in the region extending from the medium-opposed face to the front end face of the lower insulating layer 71, providing a first core layer 91a. Since the magnetic layer 910 is given the desired width in the lower core forming step described, the first core layer 91a obtained has the desired width.

With the thin film magnetic head of the present invention, the width of the track to be formed on the recording medium is defined by the first core layer 91a which is the lower layer portion of the upper core layer 9 and by the core portion 52 which is the upper layer portion of the lower core layer 5. An accurate track width is available since the desired width is given to the first core layer 91*a* of the upper core layer 9 and the core portion 52 of the lower core layer 5 as described above.

In the second core layer forming step, the second core layer 92 is formed on a relatively great stepped portion C2 between the surface of the first core layer 91*a* and the surface of the upper insulating layer 72. Accordingly, it is likely that the second core layer 92 will not be obtained with the specified configuration, whereas small errors involved in the width of the second core layer 92 will pose no problem since the track width on the recording medium is defined by the first core layer 91*a*.

The present invention provides a second process for producing a thin film magnetic head which process includes a procedure for fabricating an inductive head element. This procedure comprises the steps of:

forming a lower magnetic layer 500 on the magnetoresistance effect head element, forming a gap spacer layer 6 on a surface of the lower magnetic layer 500, forming on a surface of the gap spacer layer 6 a lower insulating layer 71 extending rearward from a position retracted from a medium-opposed face to be opposed to a recording medium by a predetermined gap depth, forming an upper magnetic layer 910 over the surface of the gap spacer layer 6 and a surface of the lower insulating layer 71, machining a surface of the upper magnetic layer 910 and the surface of the lower insulating layer 71 to make the surfaces planar, coating the surface of the upper magnetic layer 910 and the surface of the lower insulating layer 71 with a resist, forming a resist layer 99 by exposing the resulting resist coating to light and developing the exposed resist coating, the resist layer 99 having the same width as a track width on the recording medium in the vicinity of the medium-opposed face, forming core layers 5 and 91*a* by etching the upper magnetic layer 910, the gap spacer layer 6 and an upper layer portion of the lower magnetic layer 500 with the resist layer 99 formed on the magnetic layer 910 to remove the upper magnetic layer 910, the gap spacer layer 6 and the upper layer portion of the lower magnetic layer 500 at the parts thereof extending outward from opposite sides of the resist layer 99 with respect to the direction of the track width, thereby form the upper layer portion of the lower magnetic layer 500 into a core portion 52 constituting a lower core layer 5 and having the same width as the track width on the recording medium in the vicinity of the medium-opposed face and thereby form the upper magnetic layer 910 into a first core layer 91*a* having the same width as the track width on the recording medium in the vicinity of the medium-opposed face, removing the resist layer 99, forming an upper insulating layer 72 over the lower insulating layer 71 with a coil layer 8 interposed therebetween, and forming a second core layer 92 on a surface of the first core layer 91*a* and a surface of the upper insulating layer 72 to form an upper core layer 9 comprising the first core layer 91*a* and the second core layer 92, the second core layer 92 extending from the medium-opposed face over the upper surface of the first core layer 91*a* and further over the upper surface of the upper insulating layer 72.

The planar surface forming machining step of the second process makes the surface of the upper magnetic layer 910 planar to expose the surface of the lower insulating layer 71 from the surface of the magnetic layer 910, and further makes the surface of the magnetic layer 910 and the surface of the insulating layer 71 planar and flush with each other, whereupon the machining operation is discontinued. This step diminishes these layers 910 and 71 to a thickness, for example, of 1.2 micrometers. Consequently, the upper magnetic layer 910 remains in the region extending from the medium-opposed face to the front end face of the lower insulating layer 71.

Since the upper magnetic layer 910 is thus small in thickness, the etching depth of the etching step which follows later is smaller than in the prior art as is the case with the first production process. Accordingly, the resist can be applied to the surface of the upper magnetic layer 910 to a small thickness in the subsequent resist coating step.

Because the resist coating is thin and further because the surface of the upper magnetic layer 910 and the surface of the lower insulating layer 71 are flush with each other, the resist coating to be treated by the resist layer forming step has a uniform thickness, which reliably precludes halation during exposure. The resist layer can therefore be formed with a improved accuracy.

As a result, the upper magnetic layer 910 is made into a first core layer 91*a* having the desired width in the core layer forming step. After the machining step, the magnetic layer 910 remains in the region extending from the medium-opposed face to the front end face of the lower insulating layer 71, so that the first core layer 91*a* formed extends in this region.

The upper layer portion of the lower magnetic layer 500 is formed into the core portion 52 of a lower core layer 5 which portion has the desired width. Thus, the lower core layer 5 formed comprises the core portion 52 having the same width as the track width in the vicinity of the medium-opposed face, and a shield portion 51 having a greater width than the core portion 52.

The present invention provides a third process for producing a thin film magnetic head which process includes a procedure for fabricating an inductive head element. This procedure comprises the steps of:

forming a lower magnetic layer 500 on the magnetoresistance effect head element, forming a gap spacer layer 6 on a surface of the lower magnetic layer 500, forming an upper magnetic layer 940 on a surface of the gap spacer layer 6, forming on a surface of the upper magnetic layer 940 a first resist layer extending from a surface to be opposed to a recording medium to a position retracted by a predetermined gap depth, subjecting at least the upper magnetic layer 940 to a first etching process with the first resist layer formed thereon to remove the upper magnetic layer 940 extending rearward from a rear end face of the first resist layer in the direction of the gap depth, removing the first resist layer, and forming a lower insulating layer 710 over the upper magnetic layer 940 and a surface to be etched, machining a surface of the lower insulating layer 710 and the surface of the upper magnetic layer 940 to make the surfaces planar.

These steps are further followed by the same steps as in the second process, i.e., the resist coating step, resist layer forming step, core layer forming step, resist layer removing step, upper insulating layer forming step and second core layer forming step.

The first etching step of the third process permits the upper magnetic layer 940 to remain in the region extending from the medium-opposed face to the rear end face of the first resist layer in the gap depth direction. Incidentally, the etching step gives rise to no problem even if removing the portions of the gap spacer layer 6 and the lower magnetic layer 500 extending rearward beyond the rear end face of the first resist layer.

The machining step makes the surface of the lower insulating layer planar to expose the surface of the upper magnetic layer 940 from the surface of the lower insulating layer 710, further rendering the surface of the lower insulating layer 710 and the surface of the upper magnetic layer 940 planar. This operation is discontinued upon the two surfaces becoming flush with each other. Consequently, the lower insulating layer 710 formed extends rearward from a position retracted from the medium opposed face by a predetermined gap depth.

The present invention provides a fourth process for producing a thin film magnetic head which process includes a procedure for fabricating an inductive head element. This procedure comprises the steps of:

forming a lower magnetic layer 530 on the magnetoresistance effect head element, forming a gap spacer layer 6 on a surface of the lower magnetic layer 530, forming on a surface of the gap spacer layer 6 an insulating layer 730 extending rearward from a position retracted from a face to be opposed to a recording medium by a predetermined gap depth and having a slanting face 731 inclined rearward from the retracted position to a gradually elevated level, forming an upper magnetic layer 960 over the surface of the gap spacer layer 6 and a surface of the insulating layer 730, forming on a surface of the upper magnetic layer 960 a resist layer 98 having the same width as a track width on the recording medium in the vicinity of the medium-opposed face and having a rear end face 981 perpendicular to the substrate 1 on the slanting face 731 of the insulating layer 730, etching the upper magnetic layer 960, the gap spacer layer 6 and an upper layer portion of the lower magnetic layer 530 with the resist layer 98 formed on the upper magnetic layer to remove the upper magnetic layer 960, the insulating layer 730, the gap spacer layer 6 and an upper layer portion of the lower magnetic layer 530 at the parts thereof extending rearward beyond the rear end face 981 of the resist layer 98, align rear ends of the upper magnetic layer 960, the insulating layer 730, the gap spacer layer 6 and the upper layer portion of the lower magnetic layer 530 on a vertical plane, form the insulating layer 730 into a depth end defining layer 73, remove the upper magnetic layer 960, the insulating layer 730, the gap spacer layer 6 and the upper layer portion of the lower magnetic layer 530 at the parts thereof extending outward from opposite sides of the resist layer 530 with respect to the direction of the track width, form the upper layer portion of the lower magnetic layer 530 into a core portion 55 having the same width as the track width in the vicinity of the medium-opposed face and provide a lower core layer 53 including the core portion 55, forming a nonmagnetic high-hardness layer 13 having approximately the same hardness as the upper magnetic layer 960 over the upper magnetic layer 960, the depth end defining layer 73, the gap spacer 6 and a surface of the lower core layer 53, forming a first core layer 96a by machining a surface of the nonmagnetic high-hardness layer 13 and the surface of the upper magnetic layer 960 to a depth not reaching the depth end defining face 73 to make the surfaces planar, expose the entire surface of the upper magnetic layer 960 and form the upper magnetic layer 960 into the first core layer 96a, forming an upper insulating layer 72 over a surface region of the nonmagnetic high-hardness layer 13 formed rearwardly of the first core layer 96a by the machining with a coil layer 8 interposed therebetween, and forming on a surface of the first core layer 96a and a surface of the upper insulating layer 72 a second core layer 92 extending from the medium-opposed faces over the upper surface of the first core layer 96a and further over the upper surface of the upper insulating layer 72 to provide an upper core layer 95 comprising the first core layer 96a and the second core layer 92.

Since the resist layer 98 has a rear end face 981 perpendicular to the substrate 1, the etching step of the fourth process aligns the upper magnetic layer 960, insulating layer 730, gap spacer layer 6 and upper layer portion of the lower magnetic layer 530 at their rear ends on a vertical plane R. Further because the rear end face 981 of the resist layer 98 is formed at an intermediate portion of slanting face 731 of the insulating layer 730, a front end portion of the insulating layer 730 remains, forming a depth end defining layer 73 having a depth end restricting face DE" slanting rearward to a gradually elevated level from a position retracted from the medium-opposed face by a predetermined gap depth.

The first core layer forming step makes the surface of the nonmagnetic high-hardness layer 13 planar to expose the surface of the upper magnetic layer 960 from the high-hardness layer 13, further machining the surfaces of these layers 13, 960 to a depth not reaching the depth end defining layer 73 to form respective planar surfaces. The rear end face of the upper magnetic layer 960 is vertical as stated above, so that the joint between the high-hardness layer 13 and the upper magnetic layer 960 is positioned in a vertical plane. Accordingly, during the progress of machining for making the surfaces of the layers 13, 960 planar, the boundary S between the two surfaces is present always at a definite position. As a result, even if the machining operation completed involves variations in the machining depth, the boundary S between the two surfaces 13, 960 is unlikely to shift from the specified position. Since the nonmagnetic high-hardness layer 13 is comparable to the upper magnetic layer 960 in hardness, the surface of the layer 13 and the surface of the layer 960 can be machined at approximately the same rate, and consequently made planar and flush with each other.

In this way, the upper magnetic layer 960 is formed into a first core layer 96a. The high-hardness layer 13 remains at opposite sides, with respect to the track width direction, of the first core layer 96a, gap spacer layer 6 and core portion 55 of the lower core layer 53 and in the rear of the rear end faces of these layers.

The upper insulating layer forming step forms an upper insulating layer 72 in the surface region of the high-hardness layer 13 extending rearward from the rear end faces of the first core layer 96a, gap spacer layer 6 and core portion 55 of the lower core layer 53. The boundary S between the surface of the layer 13 and the surface of the layer 96a is present at the specified position as stated above, and the surfaces of the layers 13 and 96a are flush with each other, so that the front end E of the upper insulating layer 72 can be reliably positioned at the boundary S between the surface of the high-hardness layer 13 and the surface of the first core layer 96a.

The processes for producing the heads of the invention accurately form the lower layer portion of the upper core layer defining the track width on the recording medium, i.e., the first core layer, consequently giving an accurate track width and assuring production in a high yield.

DETAILED DESCRIPTION OF EMBODIMENTS

With reference to the drawings, the present invention will be described below as embodied in the form of thin film magnetic heads of the composite type comprising an inductive head element and an MR head element.

First Embodiment

Figure 1:
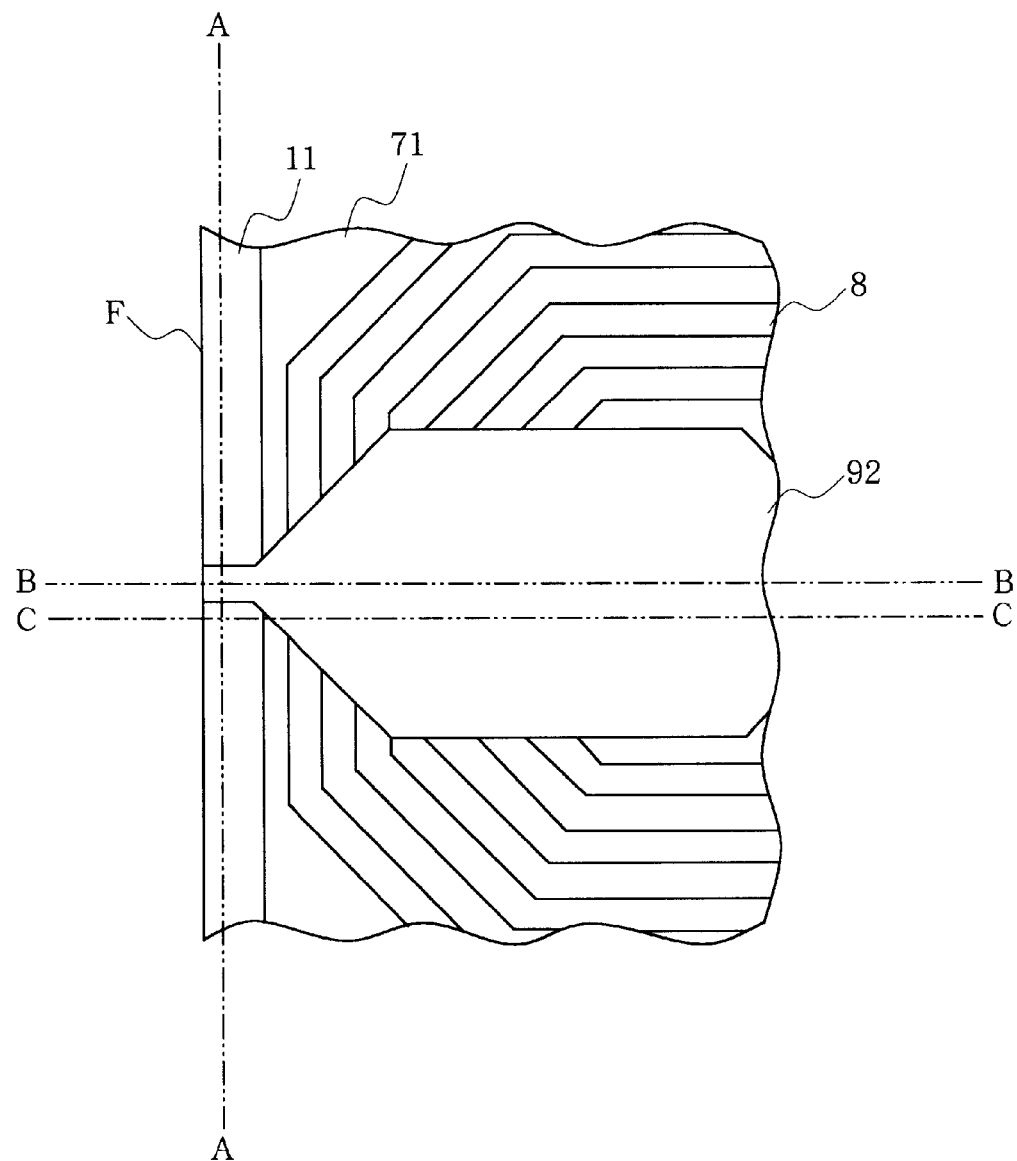
FIG. 1 is a plan view showing a composite-type thin film magnetic head as a first embodiment as it is seen from above.
Figure 2:
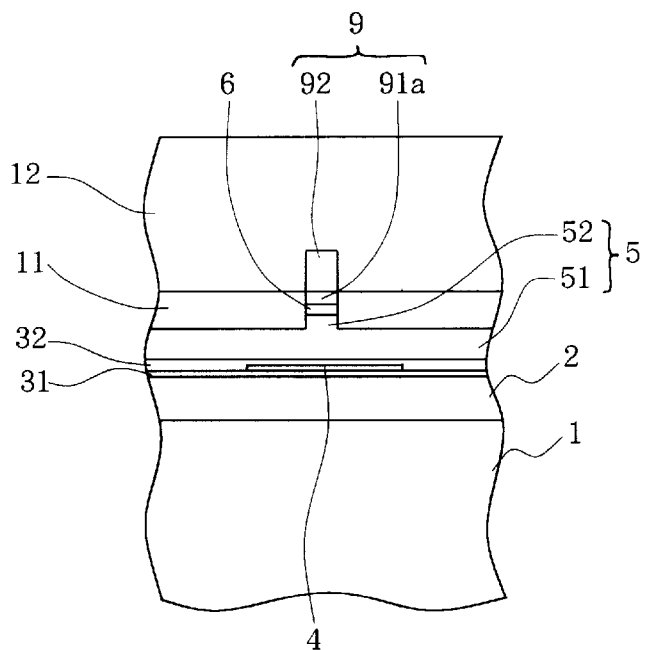
FIG. 2 is a view in section taken along the line A—A in FIG. 1.

The structure of a composite-type thin film magnetic head as a first embodiment is shown in FIG. 1, FIG. 2 (section taken along the line A—A in FIG. 1), FIG. 3 (section taken along the line B—B in FIG. 1) and FIG. 4 (section taken along the line C—C in FIG. 1). An upper insulating layer 72 and protective layer 12 are not shown in FIG. 1 for the sake of convenience.

The composite-type thin film magnetic head according to the present embodiment includes an MR head element comprising a lower shield layer 2 formed on a substrate 1, and an MR element layer 4 and an electrode layer (not shown) which are formed over the shield layer 2 with an interposed lower insulating layer 31 formed directly on the layer 2. An upper insulating layer 32 is formed over the MR element layer 4.

Formed on the upper insulating layer 32 is a lower core layer 5 providing an inductive head element. The lower core layer 5 comprises a shield portion 51 having a large width and positioned at the substrate (1) side thereof, and a core portion 52 having a small width and formed at the other side thereof. The core portion 52 has the same width as the track width on recording media, in the vicinity of the face to be opposed to the recording medium. The lower core layer 5 serves the function of the magnetic core of the inductive head element, also performing the function of a magnetic shield between the MR head element and the inductive head element.

Formed on the lower core layer 5 is a gap spacer layer 6 having the same width as the track width in the vicinity of the face to be opposed to the recording medium. A lower insulating layer 71 is formed on the gap spacer layer 6 at a position retracted from the medium-opposed face by a predetermined gap depth (gap length). The layer 71 has a depth end restricting face DE slanting rearward to a gradually elevated level from one end thereof at the MR element layer (4) side thereof. Provided on the lower insulating layer 71 is a coil layer 8, which is covered with an upper insulating layer 72.

Figure 3:
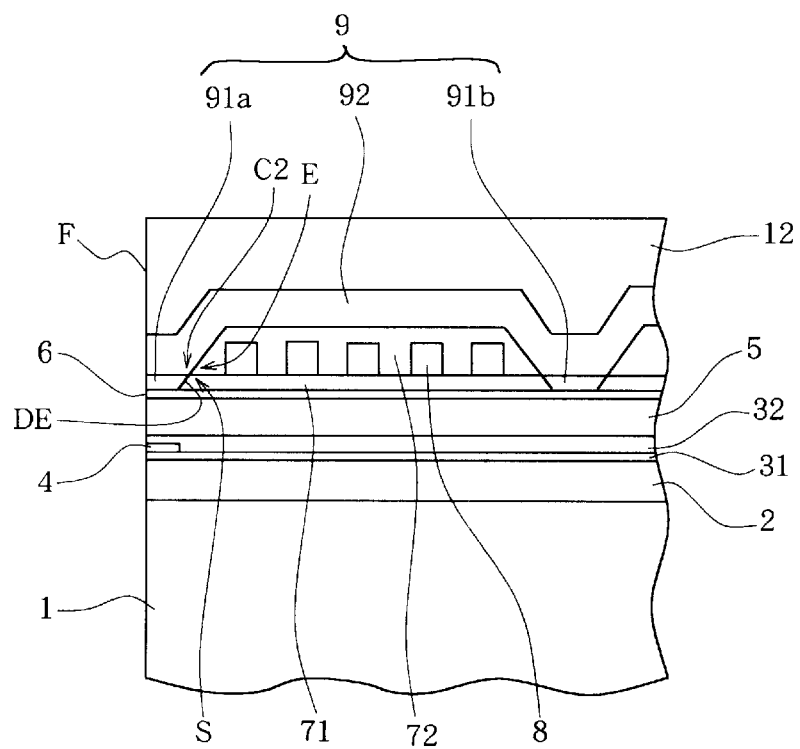
FIG. 3 is a view in section taken along the line B—B in FIG. 1.
Figure 4:
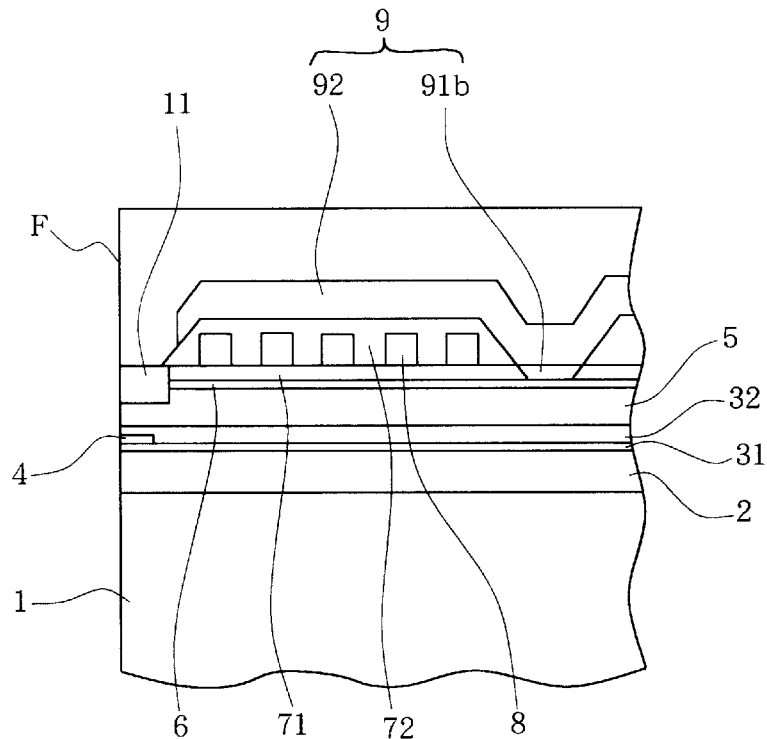
FIG. 4 is a view in section taken along the line C—C in FIG. 1.

An upper core layer 9 is formed on the gap spacer layer 6 and the upper insulating layer 72. As shown in FIGS. 3 and 4, the core layer 5 comprises a front first core layer 91a and a back first core layer 91b which are positioned at the substrate (1) side thereof, and a second core layer 92 formed at the other side thereof. The front first core layer 91a is formed in a region extending from the medium-opposed face to the depth end restricting face DE of the lower insulating layer 71, while the back first core layer 91b is formed in a region extending rearward from the rear end of the insulating layer 71. The second core layer 92 extends from the medium-opposed face onto the front first core layer 91a, upper insulating layer 72 and back first core layer 91b. The upper core layer 9 has a thickness greater by the thickness of the front first core layer 91a in the region from the medium-opposed face to the restricting face DE of the lower insulating layer 71 than in the region over the upper insulating layer 72.

The front first core layer 91a has a width same as the track width on the recording medium. In the vicinity on the medium-opposed face, the second core layer 92 has a width same as the track width of the medium. In the vicinity of the medium-opposed face, the second core layer 92, front first core layer 91a, gap spacer layer 6 and core portion 52 of the lower core layer 5 are aligned on a vertical plane at each of opposite sides with respect to the direction of the track width as seen in FIG. 2.

At opposite sides, with respect to the direction of the track width, of the core portion 52 of the lower core layer 5, gap spacer layer 6 and front first core layer 91a, a nonmagnetic high-hardness layer 11 is formed over the shield portion 51 of the lower core layer 5. The upper surfaces of the nonmagnetic high-hardness layer 11, front first core layer 91a, lower insulating layer 71 and back first core layer 91b are planar and flush with one another.

The unillustrated protective layer 12 is formed over the second core layer 92 of the upper core layer 9.

The composite-type thin film magnetic head is produced by the process to be described below in detail with reference to FIGS. 7 to 25. In producing the head of the type described, a multiplicity of heads are prepared at the same time on a wafer 10 serving as the substrate 1. However, FIGS. 7 to 25 show specific steps following the formation of the upper insulating layer 32 and ending with the formation of the protective layer 12 for one head.

Figure 7:
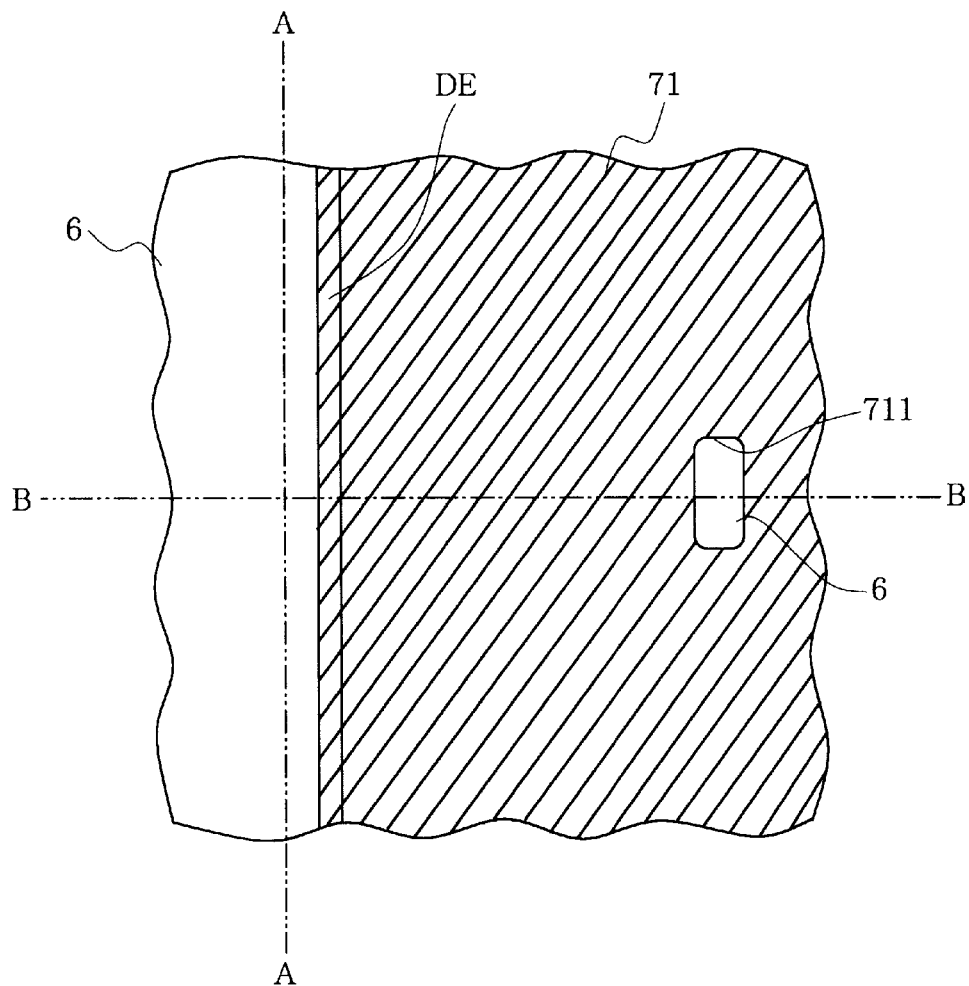
FIG. 7 is a plan view showing a lower insulating layer of the first embodiment as it is seen from above.
Figure 8:
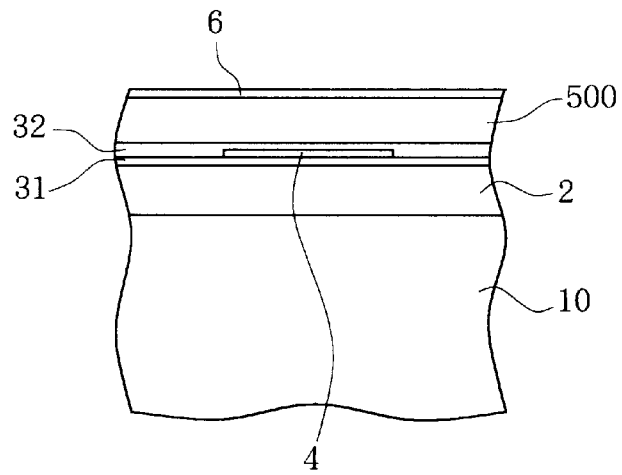
FIG. 8 is a view in section taken along the line A—A in FIG. 7.
Figure 9:
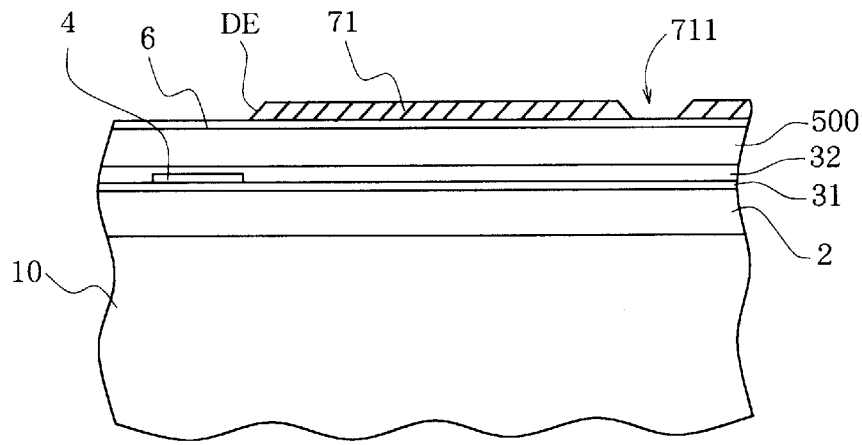
FIG. 9 is a view in section taken along the line B—B in FIG. 7.

With reference to FIG. 7, FIG. 8 (section taken along the line A—A in FIG. 7) and FIG. 9 (section taken along the line B—B in FIG. 7), an MR head element is prepared first by successively forming a lower shield layer 2, lower insulating layer 31, MR element layer 4, electrode layer (not shown) and upper insulating layer 32 in the same manner as in the prior art.

Subsequently, a lower magnetic layer 500 is formed on the entire surface of the upper insulating layer 32. A gap spacer, for example, 0.2 micrometer in thickness, is then formed over the entire surface of the magnetic layer 500.

The surface of the gap spacer layer 6 is coated with a photosensitive resin, e.g., a photoresist, which is thereafter exposed to light with use of a specified mask pattern, followed by development and curing to prepare a lower insulating layer 71 of specified configuration from the photoresist.

The lower insulating layer 71 is formed at a position retracted from a position providing the face to be opposed to the medium by a predetermined gap depth, and has a depth end restricting face DE slanting rearward to a gradually elevated level from the retracted position. The slope of the face DE is formed during the curing of the photoresist.

The insulating layer 71 has an opening 711 shaped in conformity with the shape of a back first core layer 91b when seen from above, at the position where the layer 91b is to be provided. The opening 711 leaves the gap spacer layer 6 exposed. The insulating layer 71 is, for example, 1.0 micrometer in thickness.

Figure 10:
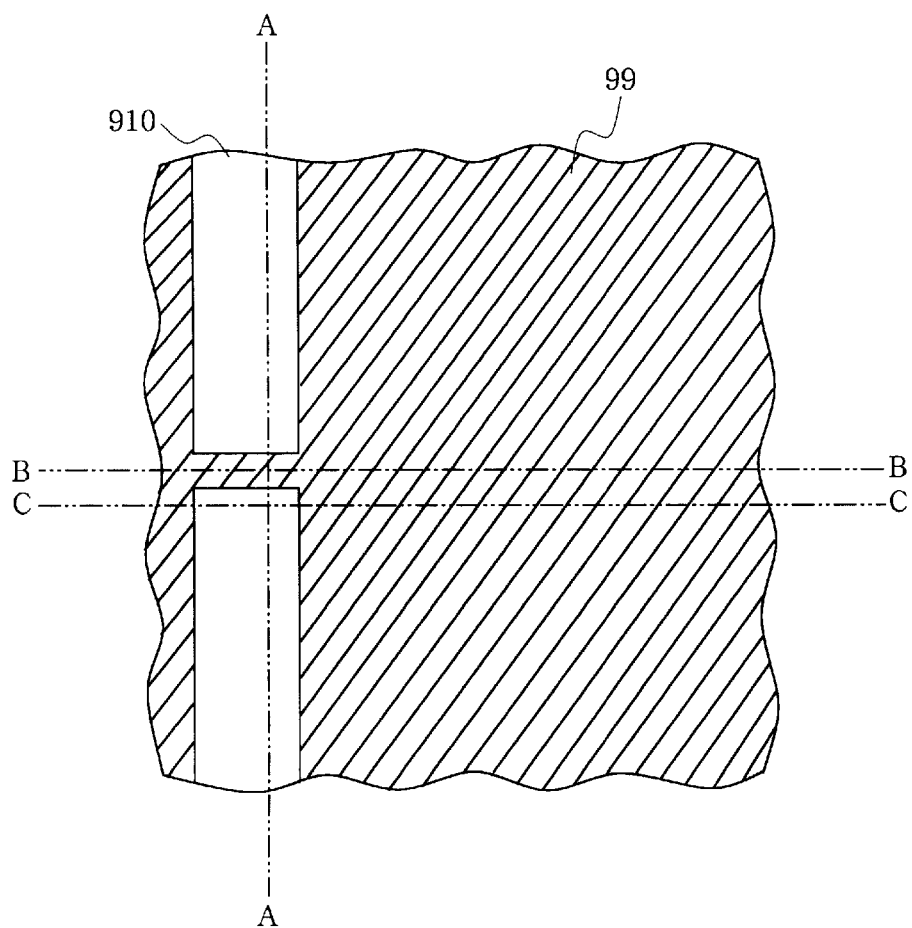
FIG. 10 is a plan view showing a resist layer of the first embodiment as it is seen from above.
Figure 11:
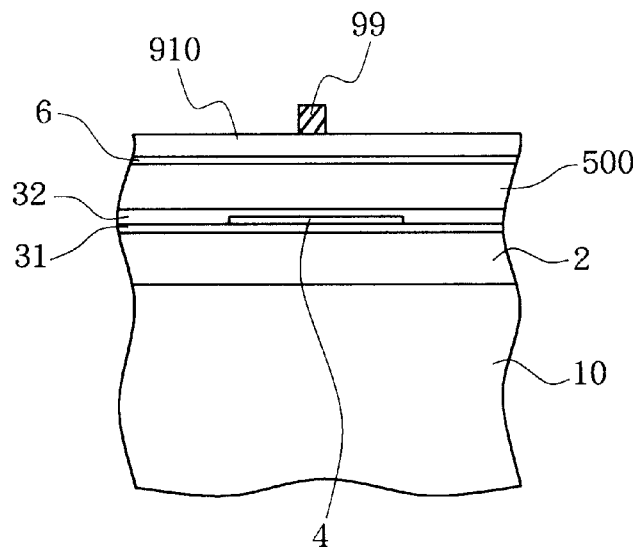
FIG. 11 is a view in section taken along the line A—A in FIG. 10.
Figure 12:
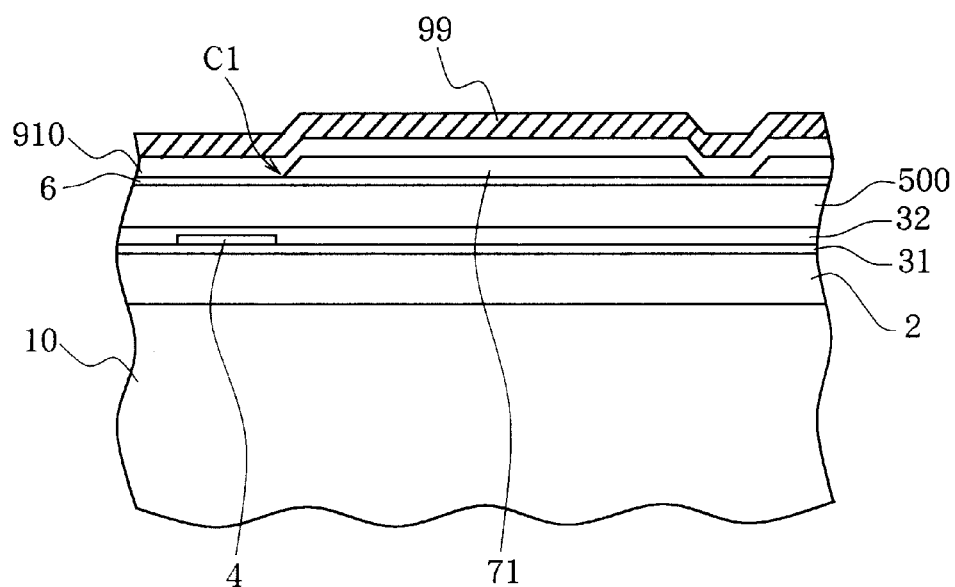
FIG. 12 is a view in section taken along the line B—B in FIG. 10.
Figure 13:
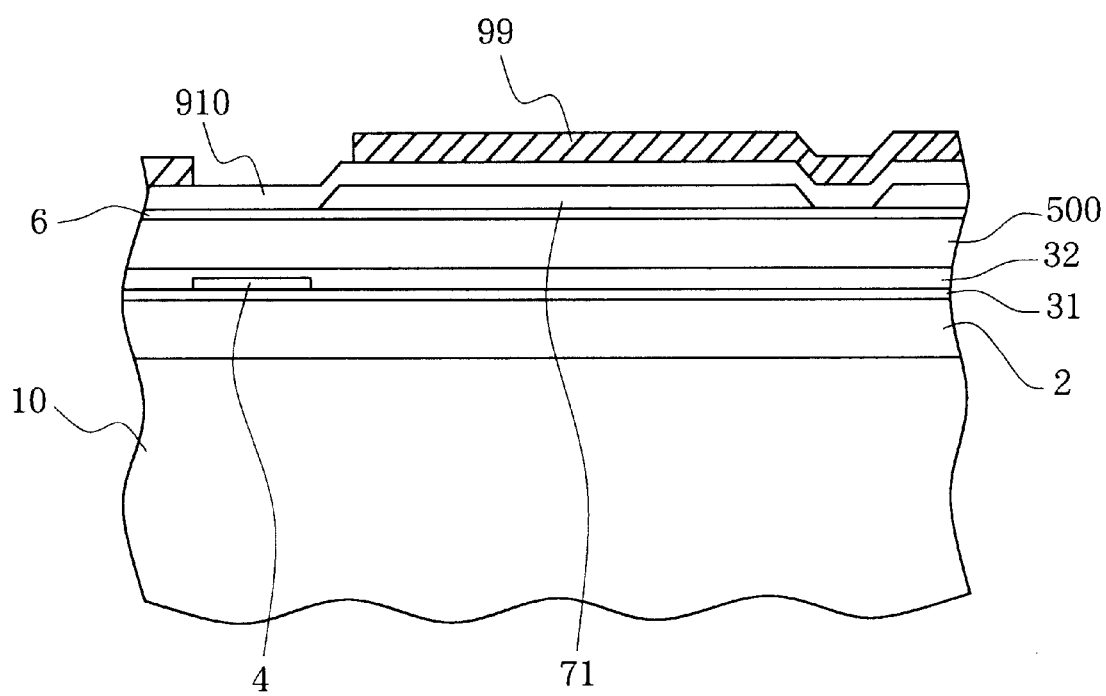
FIG. 13 is a view in section taken along the line C—C in FIG. 10.

With reference to FIG. 10, FIG. 11 (section taken along the line A—A in FIG. 10), FIG. 12 (section taken along the line B—B in FIG. 10) and FIG. 13 (section taken along the line C—C in FIG. 10), an upper magnetic layer 910 is formed over the entire surfaces of the gap spacer layer 6 and the lower insulating layer 71. The insulating layer 71 has a small thickness of 1.0 micrometer as mentioned above, and the stepped portion C1 between the surface of the spacer layer 6 and the surface of the insulating layer 71 gives a small level difference as seen in FIGS. 12 and 13, so that the presence of the stepped portion C1 is negligible in determining the thickness of the magnetic layer 910. The upper magnetic layer 910 has a small thickness, for example, of 1.2 micrometers.

A resist is then applied to the entire surface of the magnetic layer 910, thereafter exposed to light and developed and thereby made into a resist layer 99 so shaped as to have the same width as the track width when seen from above, in the vicinity of the position providing the medium-opposed face. In the following etching step, the upper magnetic layer 910 with a thickness of 1.2 micrometers, the gap spacer layer 6 with a thickness of 0.2 micrometer and an upper layer portion of the lower magnetic layer 500 with a depth of 1.5 micrometers from the surface thereof are subjected to ion beam etching. The etching depth is therefore as small as about 3.0 micrometers. Accordingly, the resist is applied to a small thickness, for example, of about 5.0 micrometers.

The resist coating is thus small in thickness, affording a resist layer with a high accuracy, while the stepped portion C1 from the surface of the spacer layer 6 to the surface of the insulating layer 71 provides a small level difference as shown in FIGS. 12 and 13, with the result that the resist coating is given a substantially uniform thickness, which precludes halation in the exposure step. Consequently, the resist layer 99 of predetermined shape can be obtained with a high accuracy.

Figure 14:
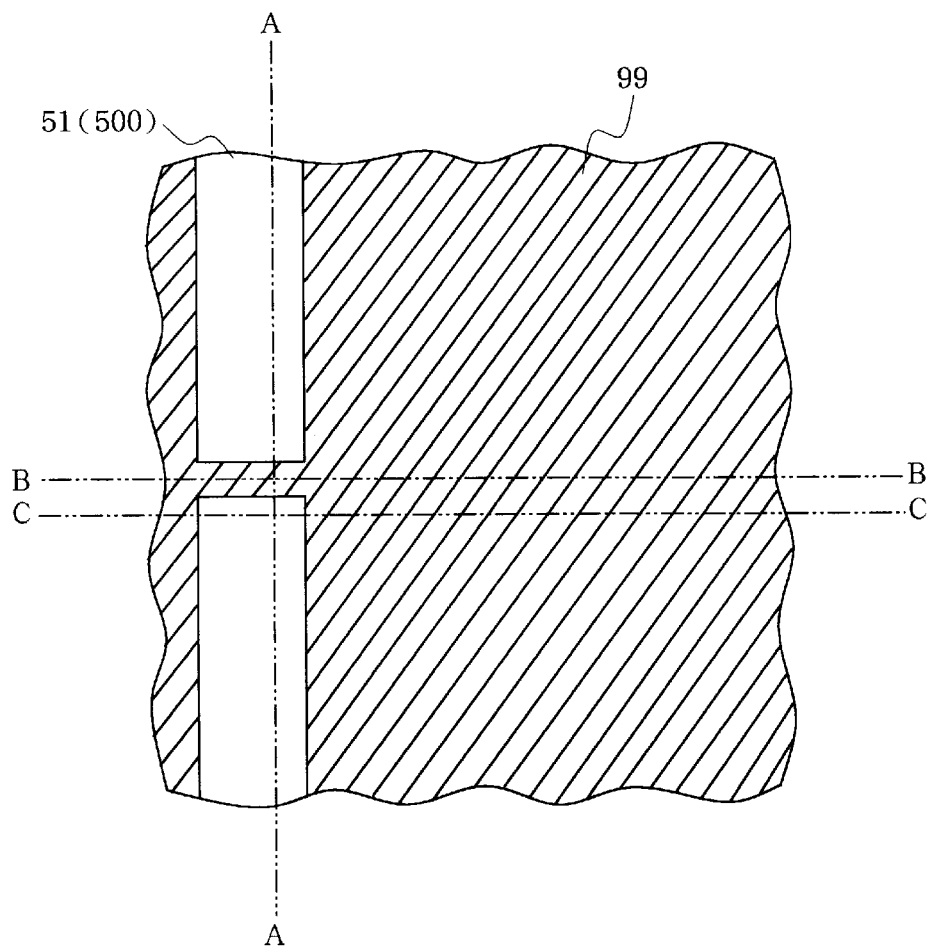
FIG. 14 is a plan view showing a shield portion of a lower core layer as it is seen from above.
Figure 15:
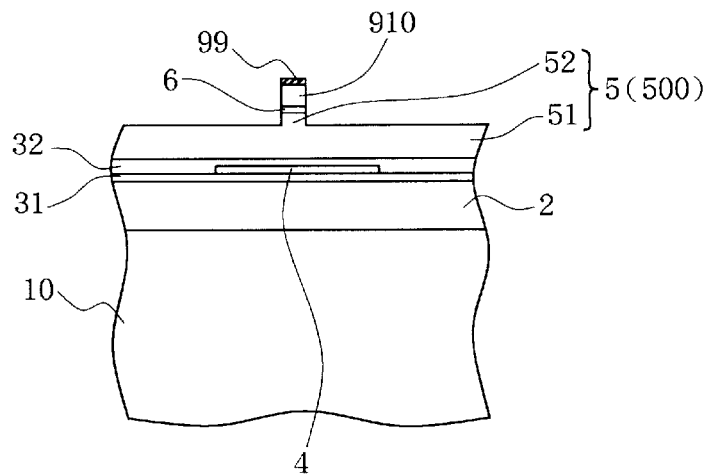
FIG. 15 is a view in section taken along the line A—A in FIG. 14.
Figure 16:
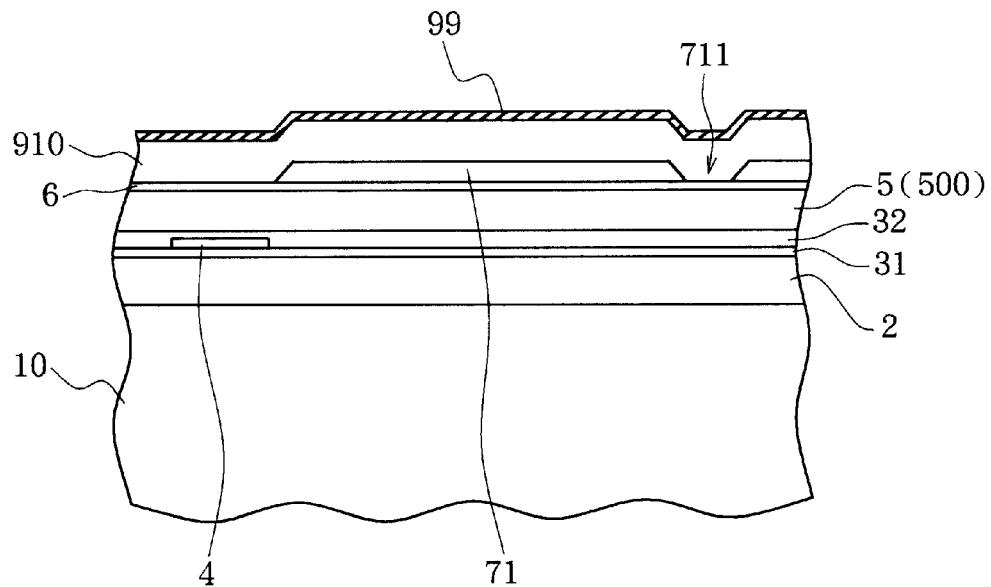
FIG. 16 is a view in section taken along the line B—B in FIG. 14.
Figure 17:
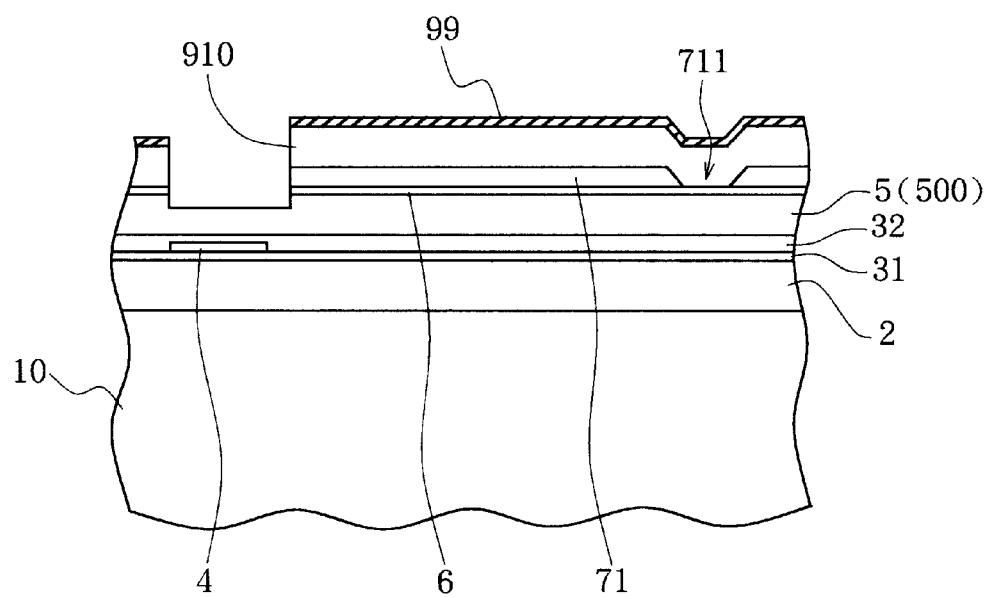
FIG. 17 is a view in section taken along the line C—C in FIG. 14.

Subsequently, the resist layer 99, upper magnetic layer 910, gap spacer layer 6 and surface of the lower magnetic layer 500 are subjected to ion beam etching to remove the layers 910, 6 and an upper layer portion of the layer 500 at the parts thereof extending outward from opposite sides of the resist layer 99 with respect to the direction of track width, whereby the upper magnetic layer 910, gap spacer layer and upper layer portion of the lower magnetic layer 500 are aligned with one another on a vertical plane at each of opposite sides with respect to the track width direction as shown in FIG. 14, FIG. 15 (section taken along the line A—A in FIG. 14), FIG. 16 (section taken along the line B—B in FIG. 14) and FIG. 17 (section taken along the line C—C in FIG. 14). Since the resist layer 99 is accurately formed as described above, the upper magnetic layer 910, gap spacer layer 6 and upper layer portion of the lower magnetic layer 500 are given the desired width, i.e., the same width as the track width, in the vicinity of the position providing the medium-opposed face. In this way, the upper layer portion of the lower magnetic layer 500 is formed into the core portion 52 of a lower core layer 5.

On the other hand, the lower layer portion of the lower magnetic layer 500 is not treated by ion beam etching and therefore remains over the entire surface of the upper insulating layer 32.

Consequently, a lower core layer 5 is prepared which comprises a core portion 52 having the same width as the track width in the vicinity of the position providing the medium-opposed face, and a shield portion 51 having a greater width than the core portion 52.

The reactive ion etching process can be resorted to instead of the ion beam etching process.

Figure 18:
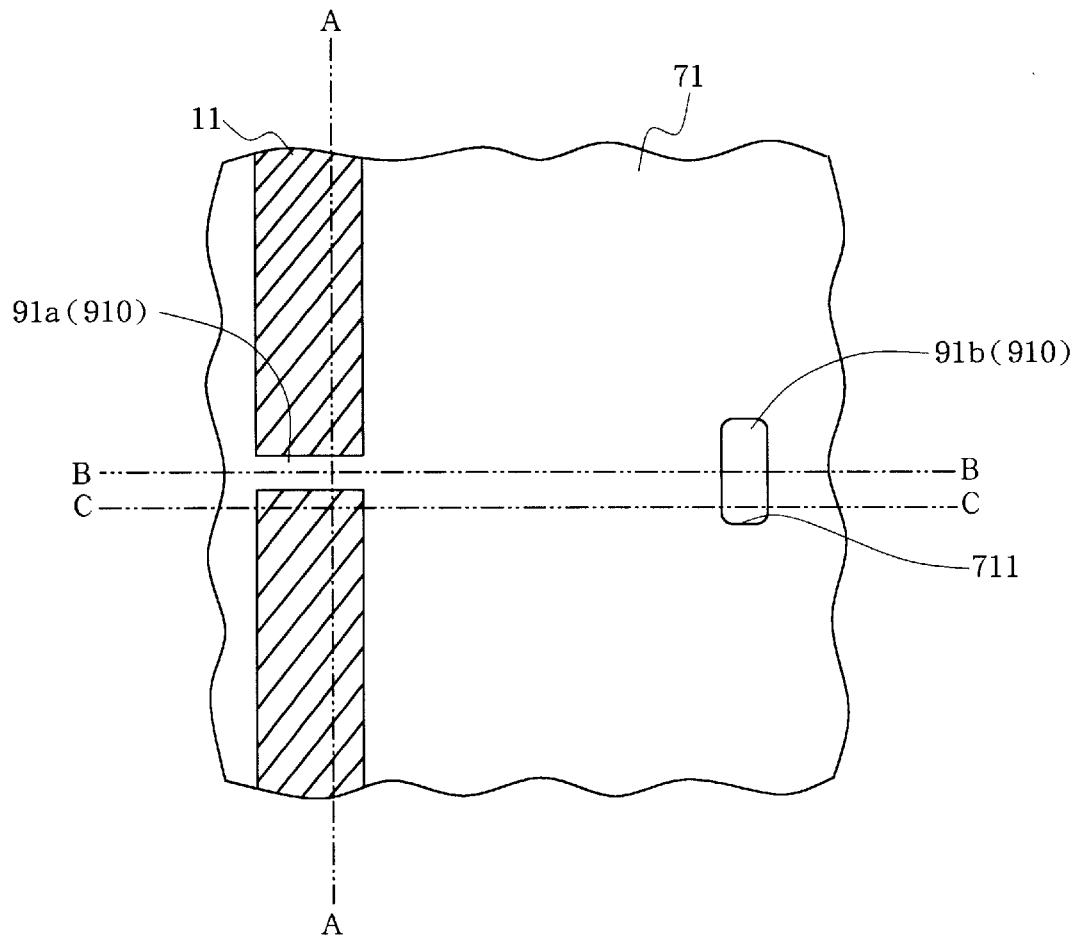
FIG. 18 is a plan view showing a nonmagnetic high-hardness layer of the first embodiment as it is seen from above.
Figure 19:
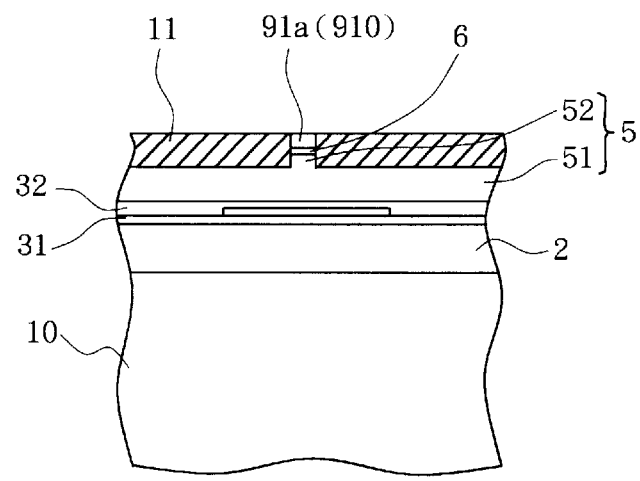
FIG. 19 is a view in section taken along the line A—A in FIG. 18.

Next, the resist layer 99 is removed, and a nonmagnetic high-hardness layer 11, such as $Al_2O_3$ or $SiO_3$, is thereafter formed over the upper magnetic layer 910 and the lower core layer 5, and the surface of the nonmagnetic layer 11 is polished to expose the surfaces of the lower insulating layer 71 and the upper magnetic layer 910 from the nonmagnetic layer 11 and make the surface of the nonmagnetic layer 11, the surface of the lower insulating layer 71 and the surface of the nonmagnetic layer 11 planar and flush with one another as shown in FIG. 18, FIG. 19 (section taken along the line A—A in FIG. 18), FIG. 20 (section taken along the line B—B in FIG. 18) and FIG. 21 (section taken along the line C—C in FIG. 18).

As a result, the upper magnetic layer 910 remains in the region forward of the depth end restricting face DE of the lower insulating layer 71 and in the region of the opening 711 in the insulating layer 71, providing a front first core layer 91a and a back first core layer 91b having respective upper surfaces flush with the upper surface of the lower insulating layer 71. Since the upper magnetic layer 910 has the same width as the track width in the vicinity of the position providing the medium-opposed face as previously stated, the front first core layer 91a formed has the same width as the track width.

Figure 22:
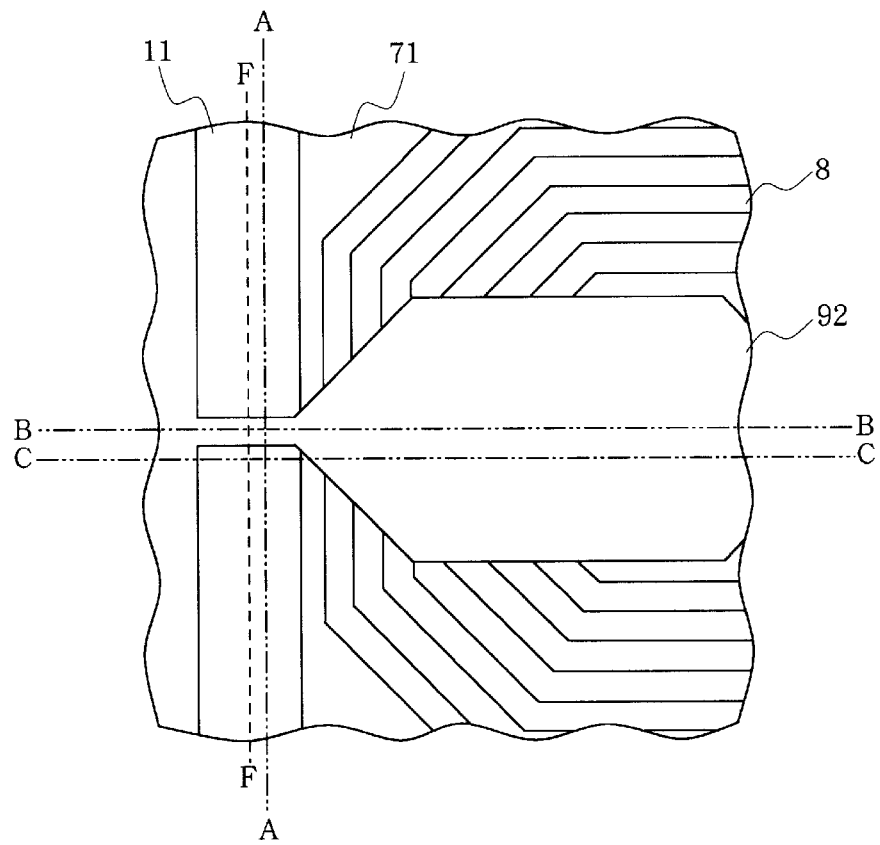
FIG. 22 is a plan view showing a second core layer of the first embodiment as it is seen from above.
Figure 23:
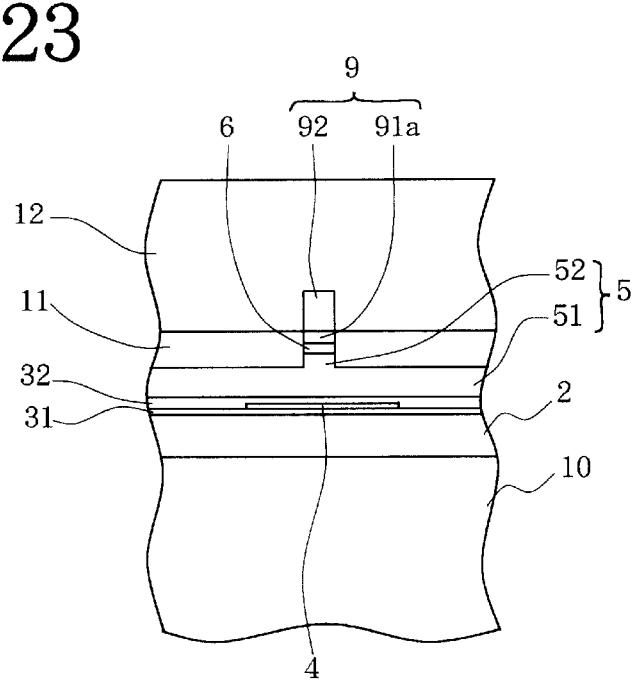
FIG. 23 is a view in section taken along the line A—A in FIG. 22.
Figure 24:
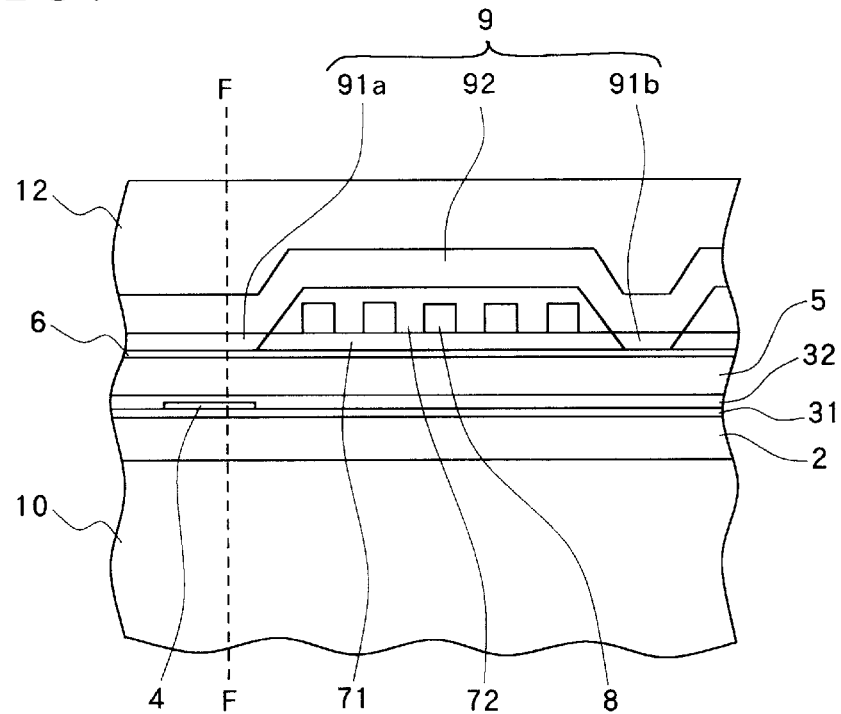
FIG. 24 is a view in section taken along the line B—B in FIG. 22.
Figure 25:
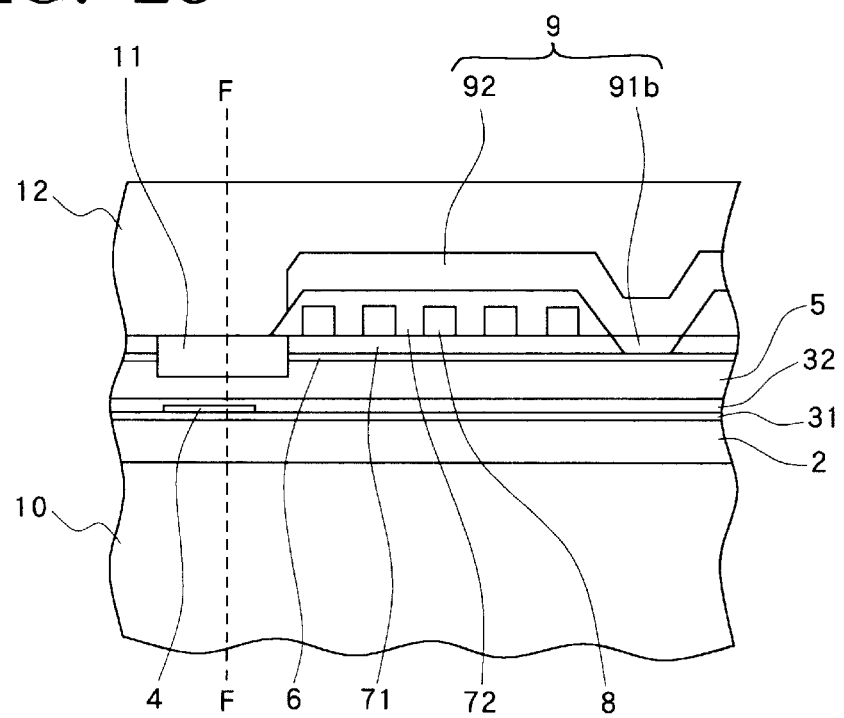
FIG. 25 is a view in section taken along the line C—C in FIG. 22.

Known steps then follow to form a coil layer 8 on the lower insulating layer 71 and an upper insulating layer 72 over the coil layer 8 as shown in FIG. 22, FIG. 23 (section taken along the line A—A in FIG. 22), FIG. 24 (section taken along the line B—B in FIG. 22) and FIG. 25 (section taken along the line C—C in FIG. 22). The upper insulating layer 72 is not shown in FIG. 22 for the sake of convenience.

Next, a second core layer 92 is formed on the surfaces of the front first core layer 91*a*, upper insulating layer 72 and back first core layer 91*b* by a known step resorting to ion beam etching.

A protective layer 12 is then formed over the second core layer 92 and the nonmagnetic layer 11 of high hardness. For the sake of convenience, the protective layer 12 is omitted from FIG. 22. Finally the wafer 10 is cut into individual heads. The cut face of the head at the MR element (4) side thereof is then polished to the position of the medium-opposed face indicated by the line F—F, whereby a composite-type thin film magnetic head is completed.

In the process for producing the head of the present embodiment, the first core layer 91*a* defining the track width on the recording medium can be accurately formed to the desired width as described above. This provides an accurate track width and assures production in a high yield. Since the second core layer 92 is formed on a great stepped portion C2 extending from the surface of the front first core layer 91*a* to the surface of the upper insulating layer 72 as shown in FIG. 3, it is likely that the second core layer 92 will not be formed in the specified configuration, whereas small errors, if involved in the width of the layer 92, pose no problem since the track width is defined by the width of the front first core layer 91*a*.

Second Embodiment

The construction of composite-type thin film magnetic head of this embodiment is the same as that of the first embodiment shown in FIGS. 1 to 4 and therefore will not be described.

Further the process for producing this embodiment includes the same steps as for the first embodiment until a lower insulating layer 1 is formed.

FIGS. 26 to 39 show in detail the steps following the formation of the lower insulating layer 71 up to the formation of the lower core layer 5.

Figure 26:
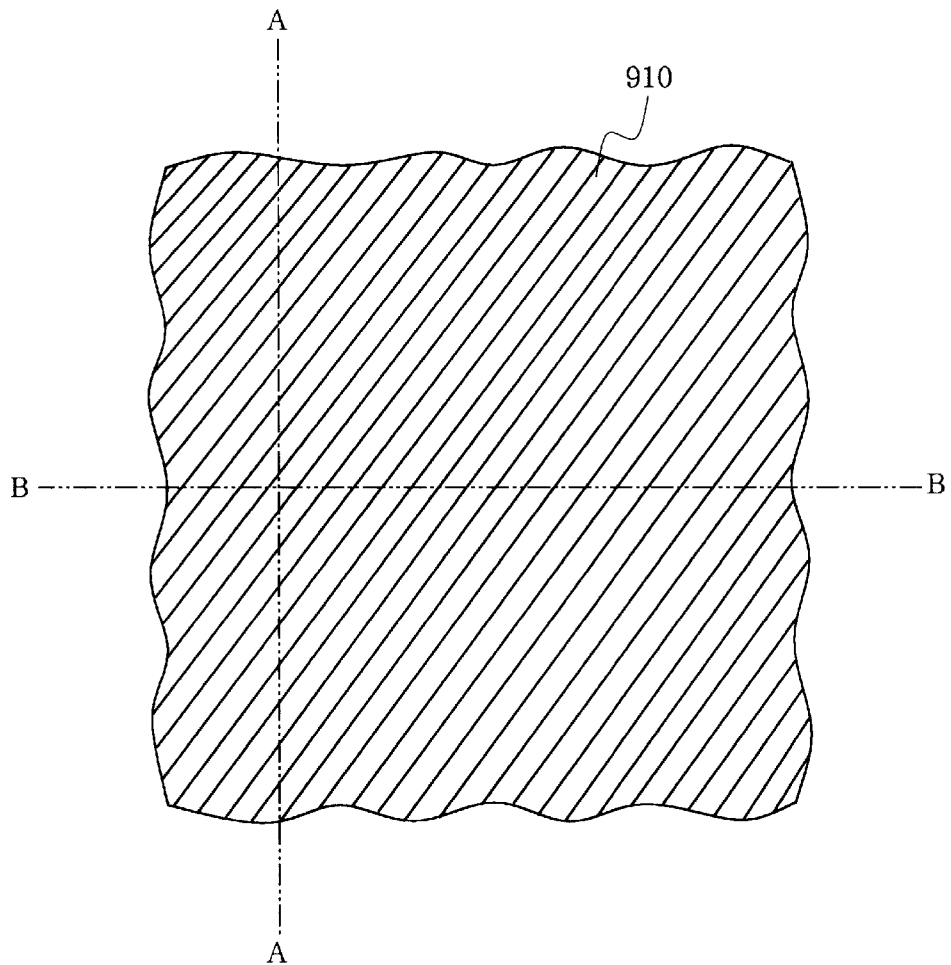
FIG. 26 is a plan view showing an upper magnetic layer of the second embodiment as it is seen from above.
Figure 27:
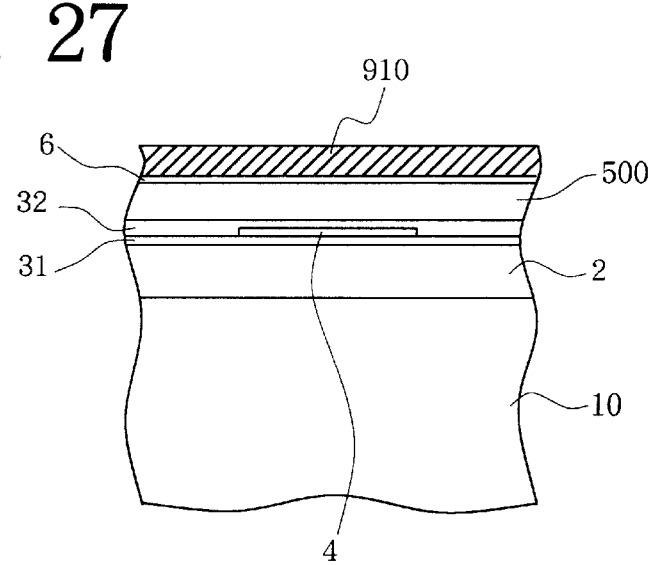
FIG. 27 is a view in section taken along the line A—A in FIG. 26.
Figure 28:
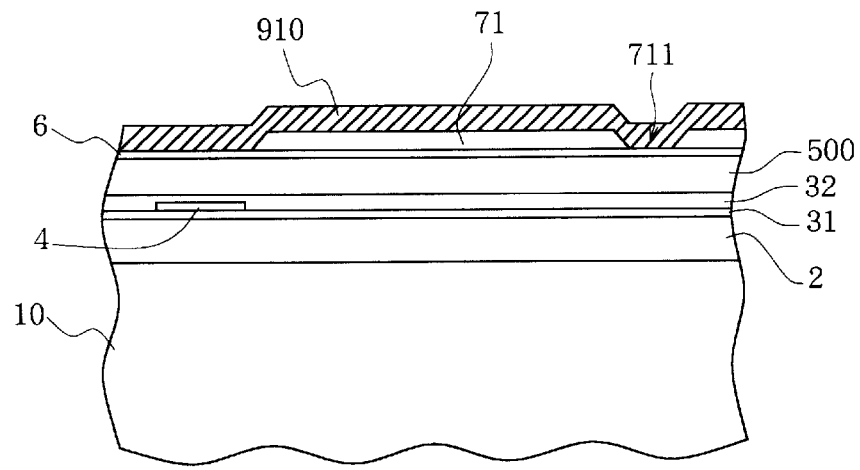
FIG. 28 is a view in section taken along the line B—B in FIG. 26.

With reference to FIG. 26, FIG. 27 (section taken along the line A—A in FIG. 26) and FIG. 28 (section taken along the line B—B in FIG. 26), a wafer 10 has successively formed thereon a lower shield layer 2, lower insulating layer 31, MR element layer 4, electrode layer (not shown), upper insulating layer 32, lower magnetic layer 500, gap spacer layer 6 and lower insulating layer 71.

First, an upper magnetic layer 910 is formed over the gap spacer layer 6 and the lower insulating layer 71.

Figure 29:
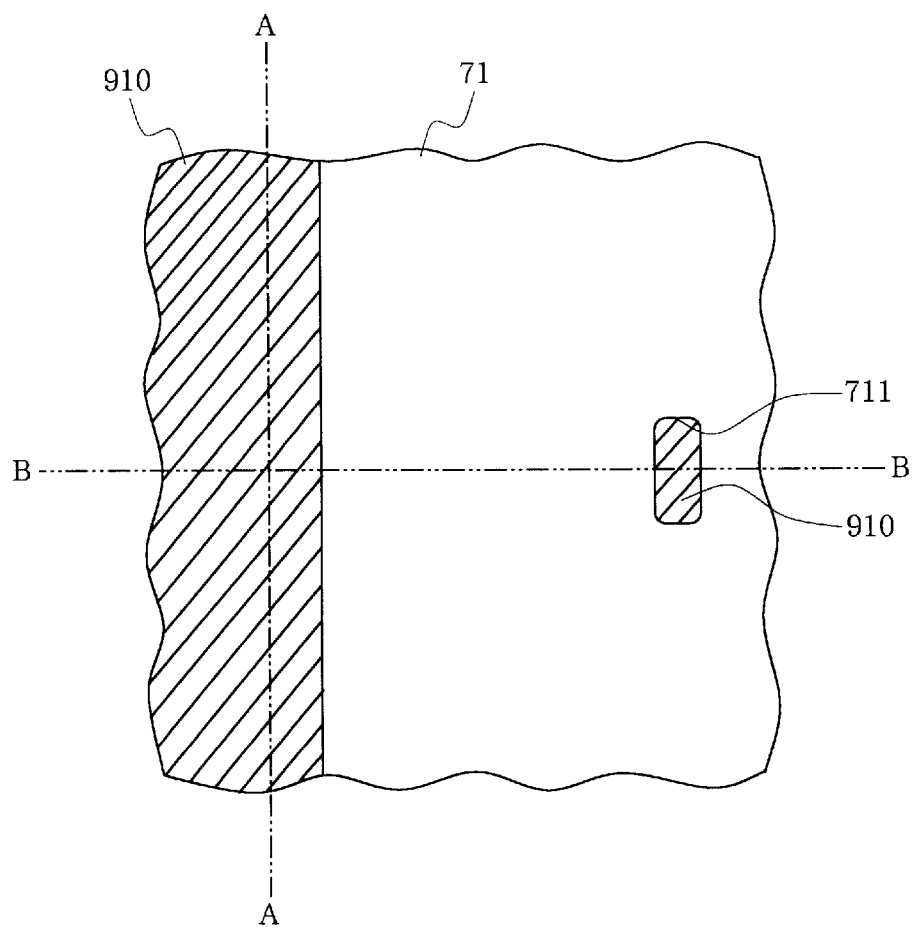
FIG. 29 is a plan view showing the upper magnetic layer and lower insulating layer resulting from a polishing step as they are seen from above.
Figure 30:
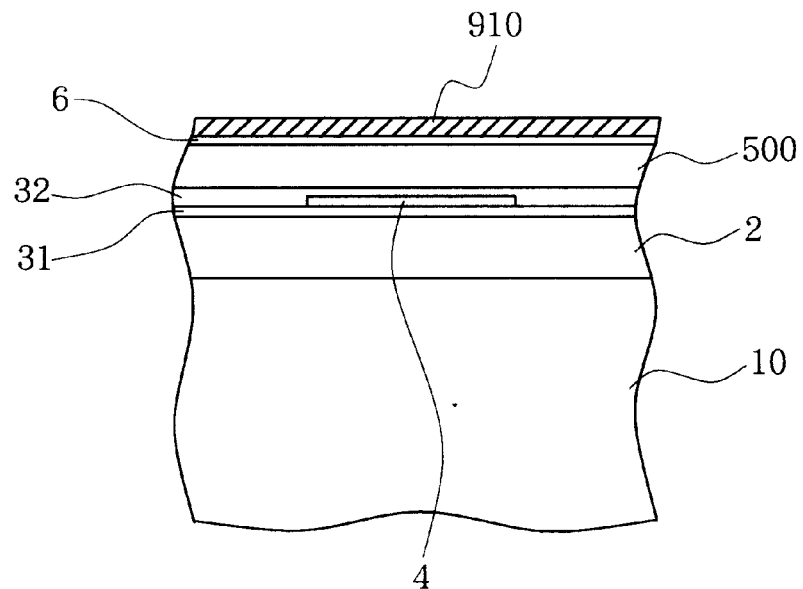
FIG. 30 is a view in section taken along the line A—A in FIG. 29.
Figure 31:
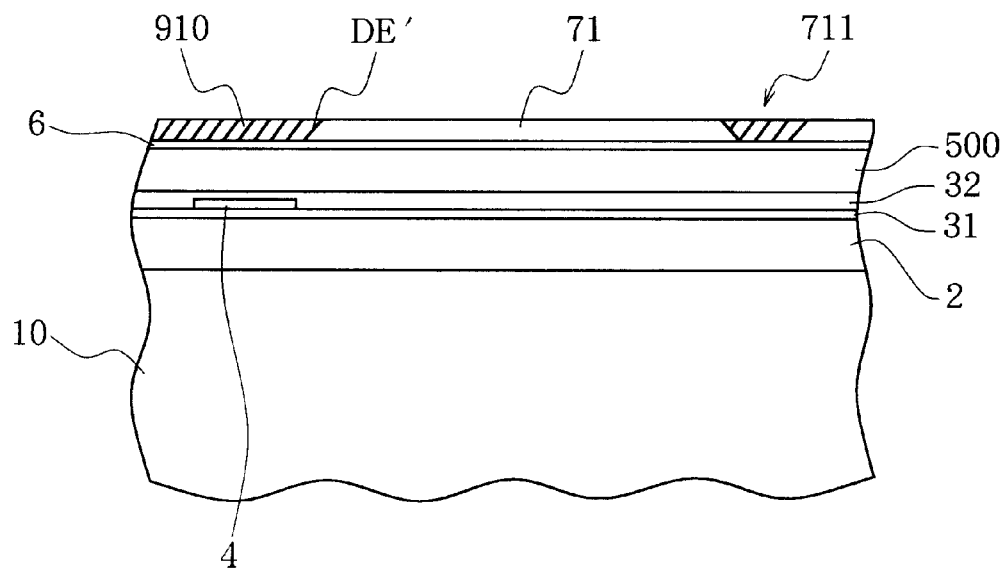
FIG. 31 is a view in section taken along the line B—B in FIG. 29.

Next, the surface of the upper magnetic layer 910 is polished to expose the surface of the lower insulating layer 71 from the surface of the upper magnetic layer 910 and to make the surface of the layer 910 and the surface of the layer 71 planar and flush with each other as shown in FIG. 29, FIG. 30 (section taken along the line A—A in FIG. 29) and FIG. 31 (section taken along the line B—B in FIG. 29). The polishing operation is discontinued when the thickness of the lower insulating layer 71 has reduced, for example, to 1.2 micrometers. The upper magnetic layer 910 now remains in the region forward of a depth end restricting face DE' of the lower insulating layer 71 and in the region of an opening 711 in the layer 71.

Figure 32:
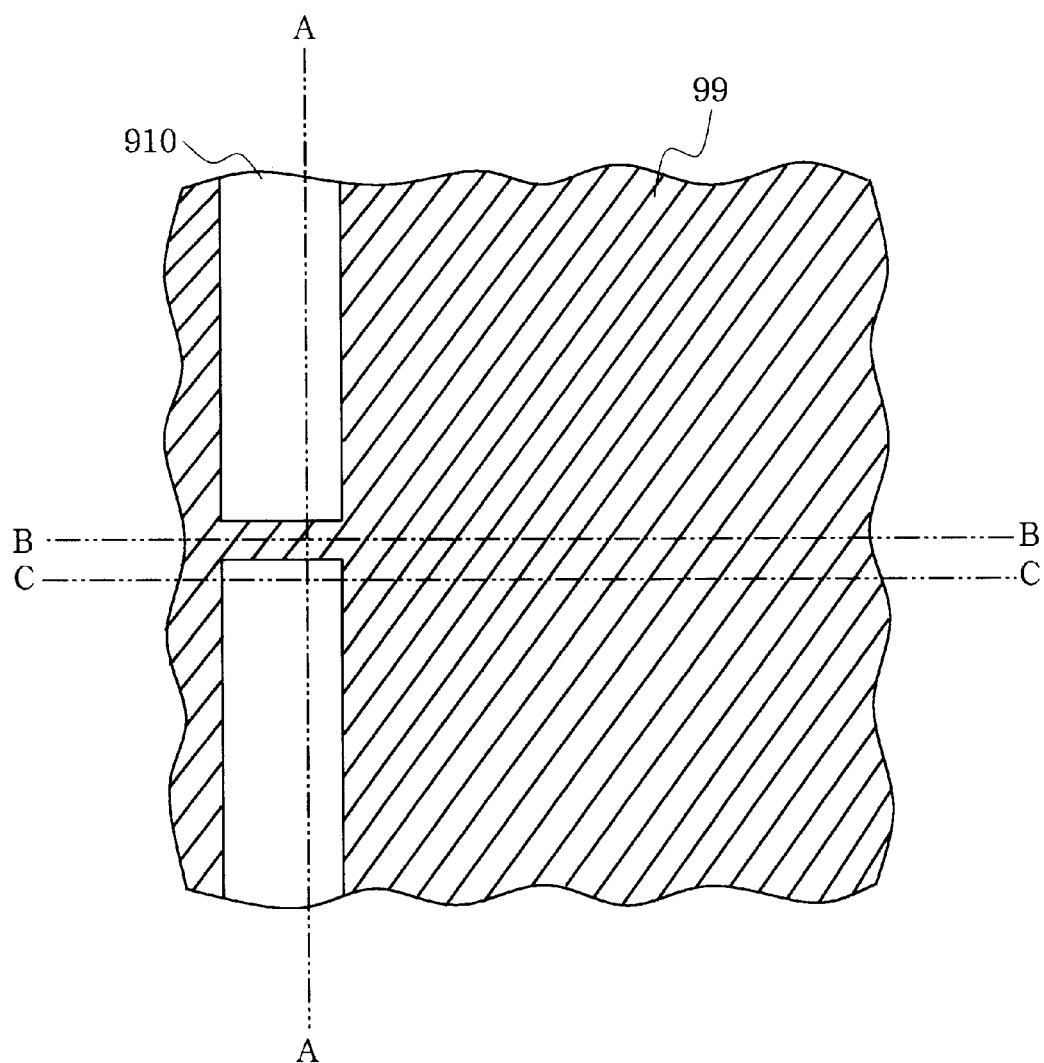
FIG. 32 is a plan view showing a resist layer of the second embodiment as it is seen from above.
Figure 33:
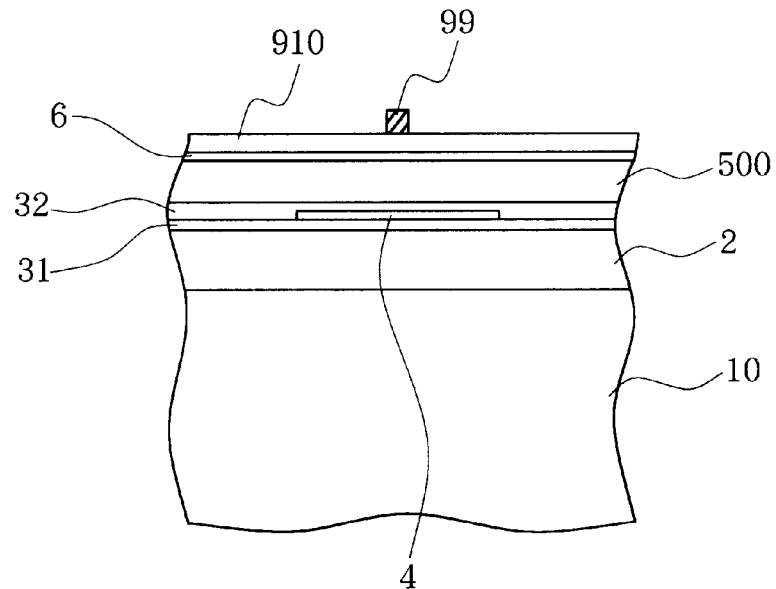
FIG. 33 is a view in section taken along the line A—A in FIG. 32.

The combined surface of the upper magnetic layer 910 and the lower insulating layer 71 is then coated with a resist, and the coating is exposed to light and developed to form the resist into a resist layer 99 which, when seen from above, is so shaped as to have the same width as the track width in the vicinity of the position providing the face to be opposed to the medium, as shown in FIG. 32, FIG. 33 (section taken along the line A—A in FIG. 32), FIG. 34 (section taken along the line B—B in FIG. 32) and FIG. 35 (section taken along the line C—C in FIG. 32). In the following etching step, the upper magnetic layer 910 with a thickness of 1.2 micrometers, the gap spacer layer 6 with a thickness of 0.2 micrometer and an upper layer portion of the lower magnetic layer 500 with a depth of 1.5 micrometers from the surface thereof are subjected to ion beam etching. The etching depth is therefore as small as about 3.0 micrometers. Accordingly, the resist is applied to a small thickness, for example, of about 5.0 micrometers.

Figure 34:
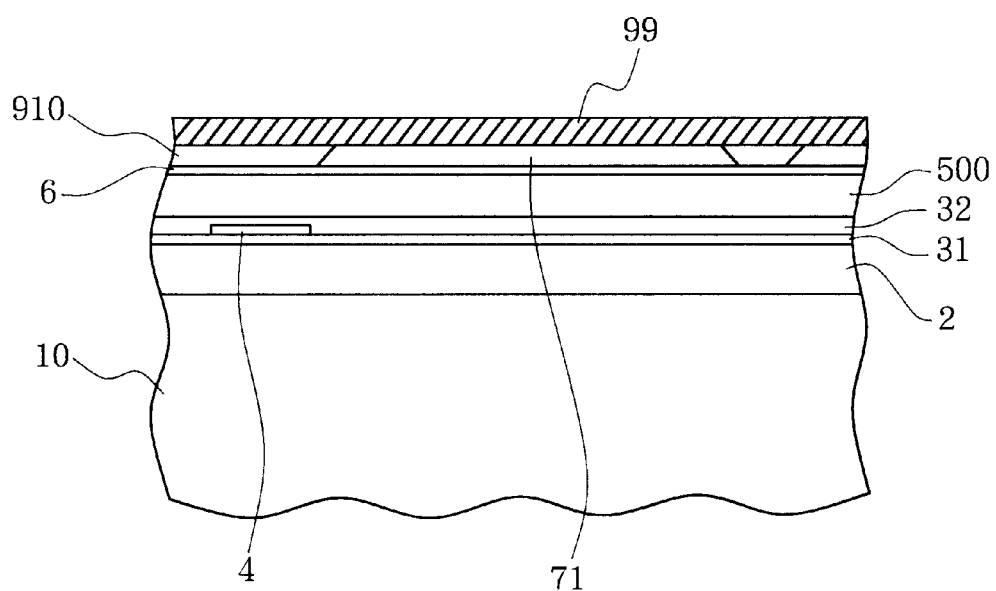
FIG. 34 is a view in section taken along the line B—B in FIG. 32.
Figure 35:
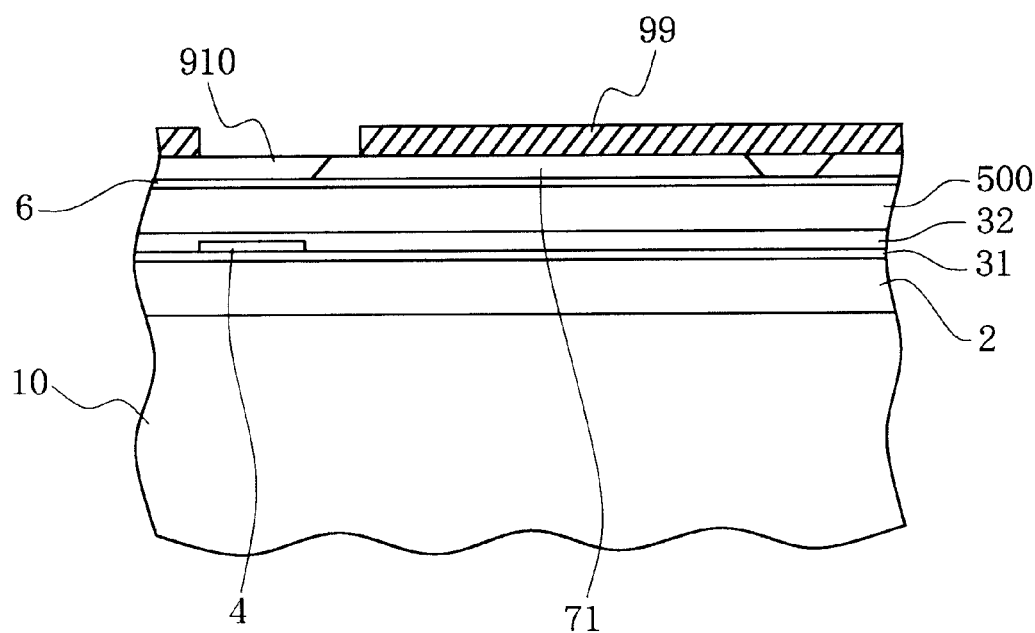
FIG. 35 is a view in section taken along the line C—C in FIG. 32.

The resist coating is thus small in thickness, affording a resist layer with a high accuracy, while the surface of the upper magnetic layer 910 and the surface of the lower insulating layer 71 are flush with each other as shown in FIGS. 34 and 35, with the result that the resist coating is given a substantially uniform thickness, which precludes halation in the exposure step. Consequently, the resist layer 99 of predetermined shape can be obtained with a high accuracy.

Figure 36:
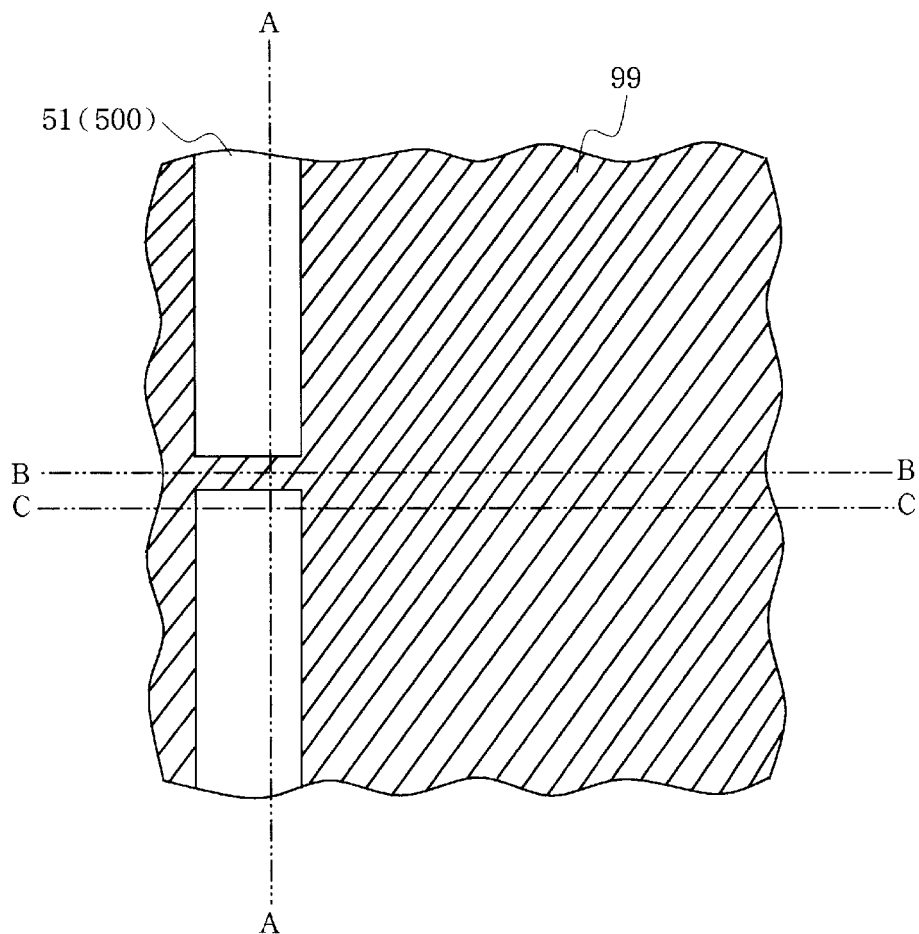
FIG. 36 is a plan view showing a shield portion of a lower core layer of the second embodiment as it is seen from above.
Figure 37:
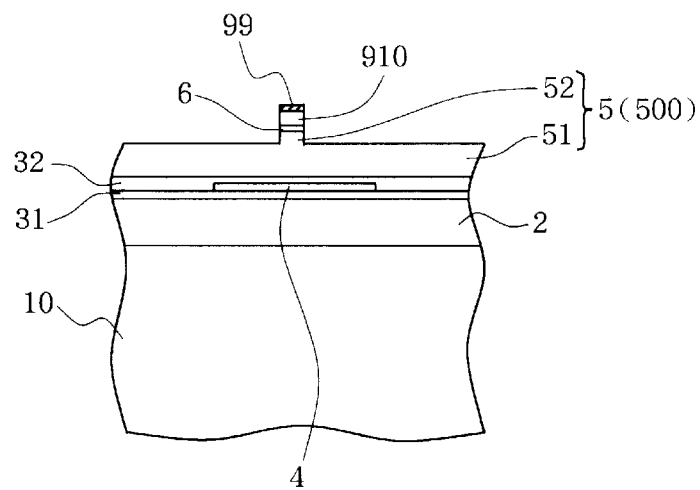
FIG. 37 is a view in section taken along the line A—A in FIG. 36.
Figure 38:
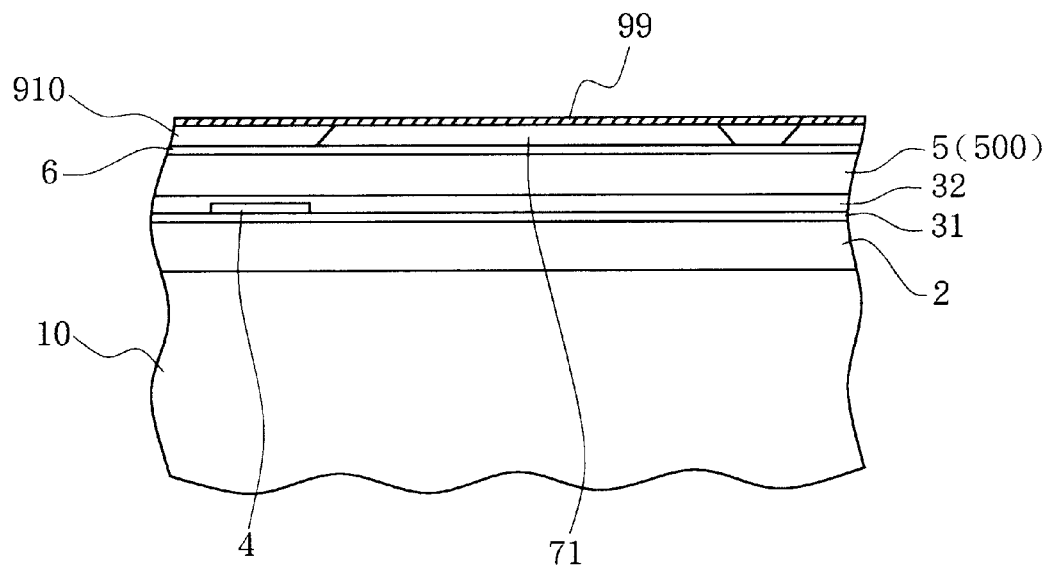
FIG. 38 is a view in section taken along the line B—B in FIG. 36.
Figure 39:
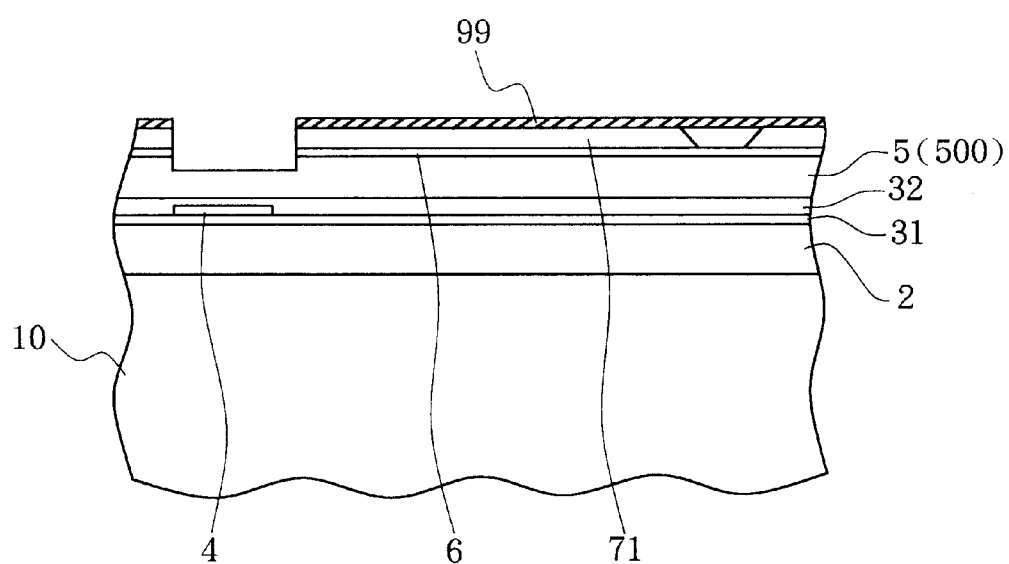
FIG. 39 is a view in section taken along the line C—C in FIG. 36.

Subsequently, the resist layer 99, upper magnetic layer 910, gap spacer layer 6 and surface of the lower magnetic layer 500 are subjected to ion beam etching as is the case with the first embodiment to remove the layers 910, 6 and an upper layer portion of the layer 500 at the parts thereof extending outward from opposite sides of the resist layer 99 with respect to the direction of track width, whereby the upper magnetic layer 910, gap spacer layer and upper layer portion of the lower magnetic layer 500 are aligned with one another on a vertical plane at each of opposite sides with respect to the track width direction as shown in FIG. 36, FIG. 37 (section taken along the line A—A in FIG. 36), FIG. 38 (section taken along the line B—B in FIG. 36) and FIG. 39 (section taken along the line C—C in FIG. 36). Since the resist layer 99 is accurately formed as described above, the upper magnetic layer 910, gap spacer layer 6 and upper layer portion of the lower magnetic layer 500 are given the desired width, i.e., the same width as the track width, in the vicinity of the position providing the medium-opposed face.

In this way, the upper layer portion of the lower magnetic layer 500 is formed into the core portion 52 of a lower core layer 5.

On the other hand, the lower layer portion of the lower magnetic layer 500 is not treated by ion beam etching and therefore remains over the entire surface of the upper insulating layer 32.

Consequently, a lower core layer 5 is prepared which comprises a core portion 52 having the same width as the track width in the vicinity of the position providing the medium-opposed face, and a shield portion 51 having a greater width than the core portion 52.

The reactive ion etching process can be resorted to instead of the ion beam etching process.

The steps shown in FIGS. 18 to 25 and executed for the first embodiment thereafter follow to complete a composite-type thin film magnetic head.

Third Embodiment

Figure 40:
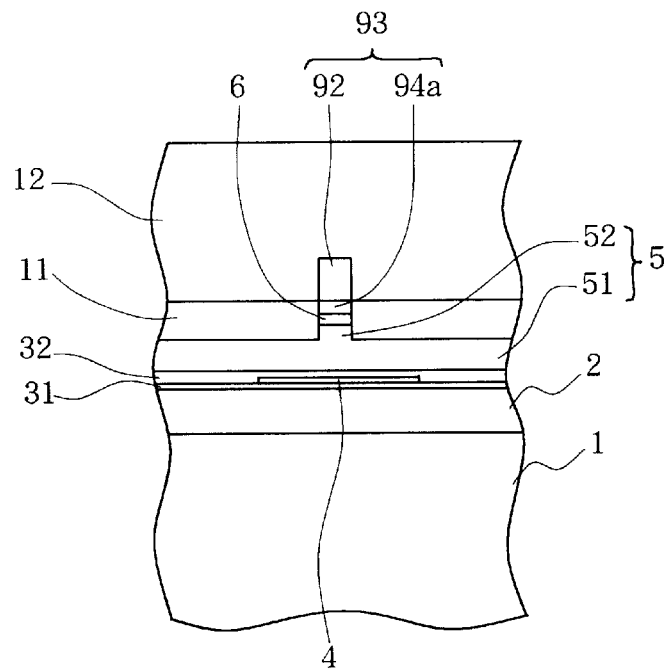
FIG. 40 is a view in section in parallel to a recording medium and showing a composite-type thin film magnetic head as a third embodiment.
Figure 41:
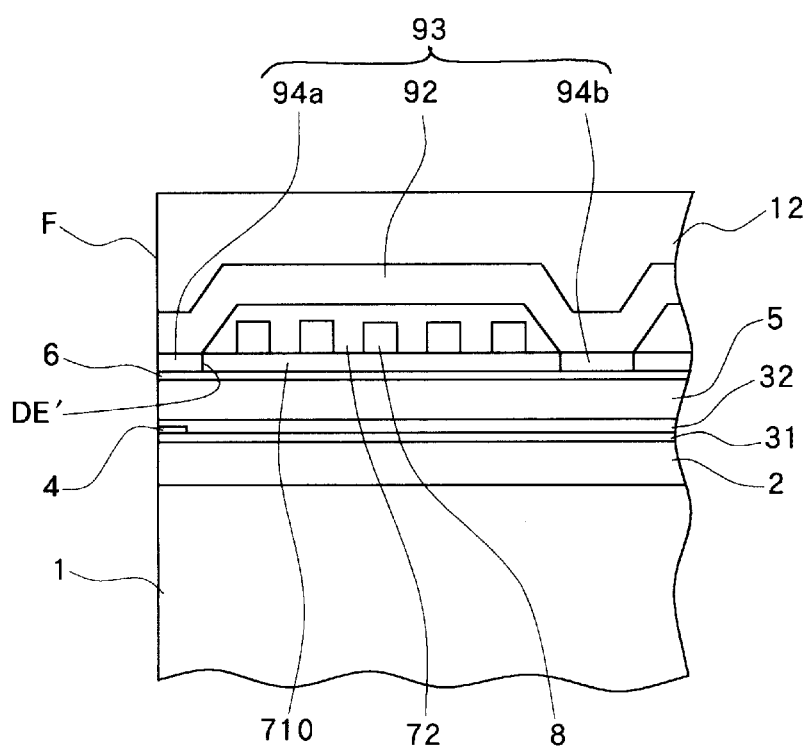
FIG. 41 is a view in section perpendicular to the recording medium and showing the head of the third embodiment.

As shown in FIGS. 40 and 41, the composite-type thin film magnetic head of this embodiment is the same as the first embodiment shown in FIGS. 1 to 4 except for a front first core layer 94*a* and back first core layer 94*b* of an upper core layer 93, and a lower insulating layer 710, so that the overall construction will not be described.

In the head of this embodiment, the lower insulating layer 710 has a depth end restricting face DE' perpendicular to a substrate 1 at its front end toward an MR element layer 4 as seen in FIG. 41.

Formed on a gap spacer layer 6 are a front first core layer 94a extending from the face to be opposed to the medium to a depth end restricting face DE', and a back first core layer 94b extending rearward from the rear end face of the lower insulating layer 710. A nonmagnetic high-hardness layer 11, front first core layer 94a, lower insulating layer 710 and back first core layer 94b have respective upper surfaces which are flush with one another.

The process for producing the head of the present embodiment includes the same steps as in the process for the first embodiment until the gap spacer layer 6 is formed.

FIGS. 42 to 49 show in detail the steps following the formation of the gap spacer layer 6 and performed until the lower insulating layer 710 is formed.

Figure 42:
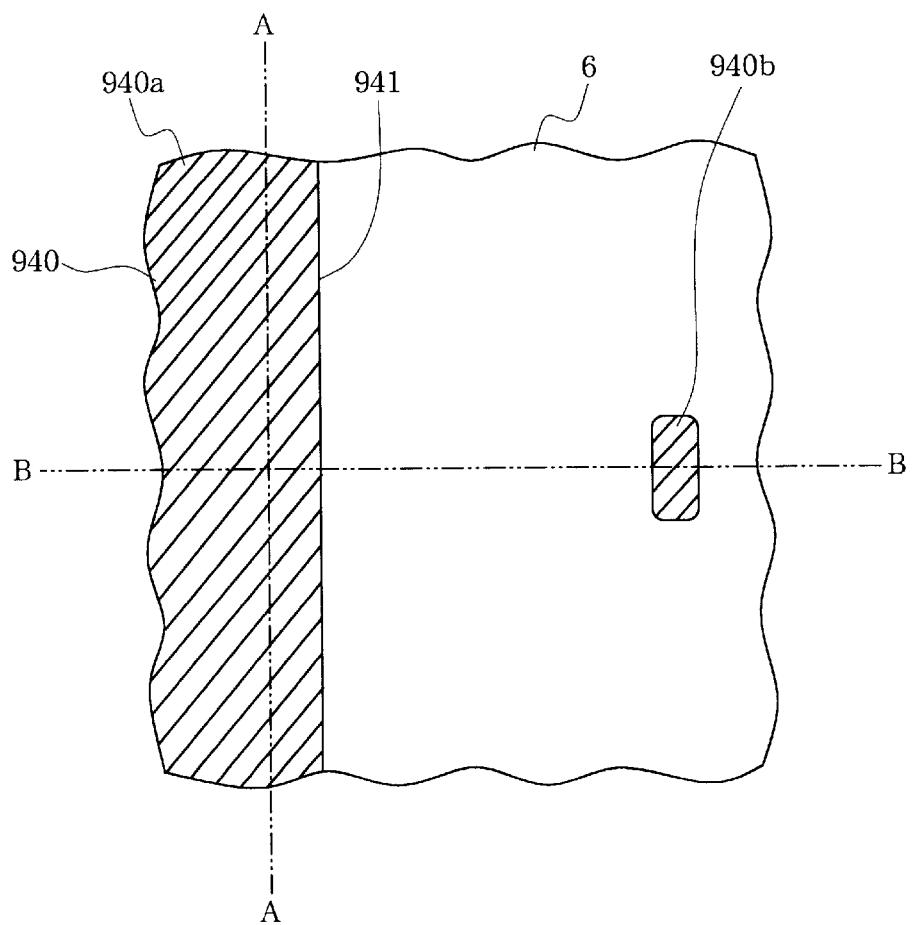
FIG. 42 is a plan view showing an upper magnetic layer of the third embodiment as it is seen from above.
Figure 43:
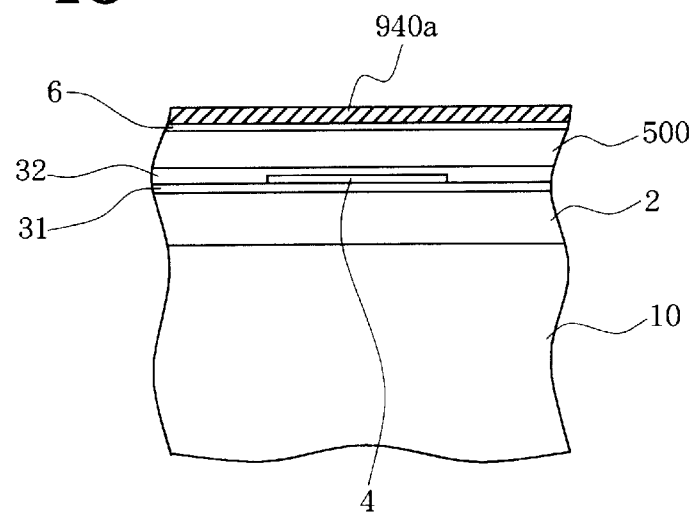
FIG. 43 is a view in section taken along the line A—A in FIG. 42.
Figure 44:
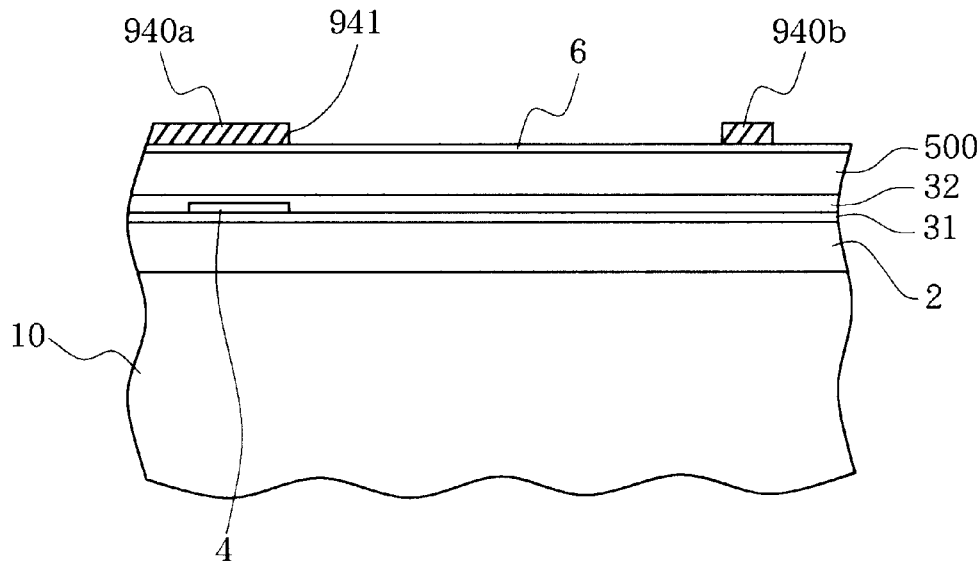
FIG. 44 is a view in section taken along the line B—B in FIG. 42.

With reference to FIG. 42, FIG. 43 (section taken along the line A—A in FIG. 42) and FIG. 44 (section taken along the line B—B in FIG. 42), a wafer 10 has successively formed thereon a lower shield layer 2, lower insulating layer 31, MR element layer 4, electrode layer (not shown), upper insulating layer 32, lower magnetic layer 500 and gap spacer layer 6.

First, an upper magnetic layer 940 is formed on the gap spacer layer 6 by ion beam etching or reactive ion etching. This layer 940 comprises a front upper magnetic layer 940a extending forward from a position retracted from the position providing the medium-opposed face by a predetermined gap depth, and a rear upper magnetic layer 940b formed at the position where the back first core layer 94b is to be formed. The front upper magnetic layer 940a has a rear end face 941 perpendicular to the substrate 1. The rear upper magnetic layer 940b is shaped in conformity with the shape of the back first core layer 94b when seen from above.

Figure 45:
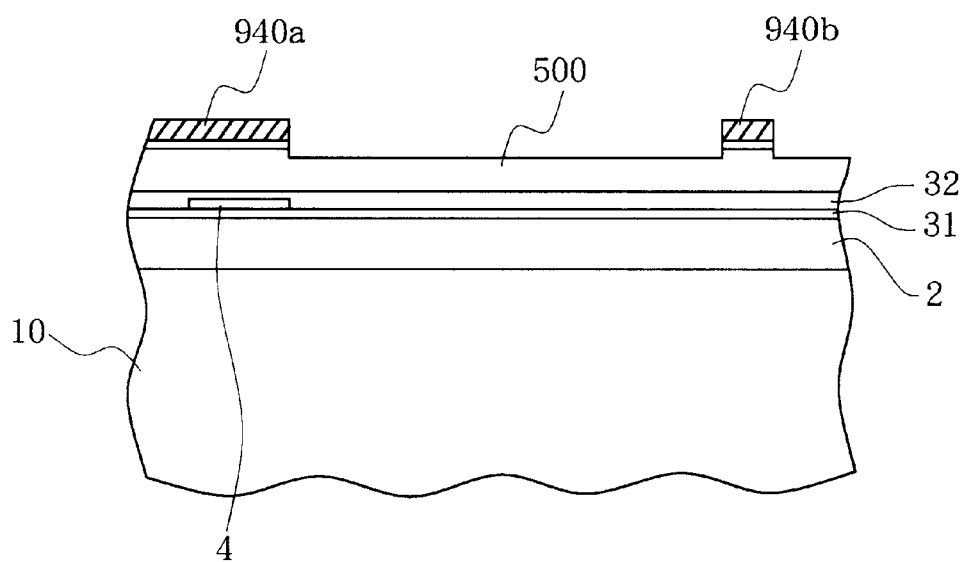
FIG. 45 is a sectional view showing a lower magnetic layer in the case where the etching depth is great.

Incidentally, no problem arises even if the etching steps etches away the gap spacer layer 6 and an upper layer porion of the lower magnetic layer 500 at the parts thereof formed between the front upper magnetic layer 940a and the rear upper magnetic layer 940b as shown in FIG. 45.

Figure 46:
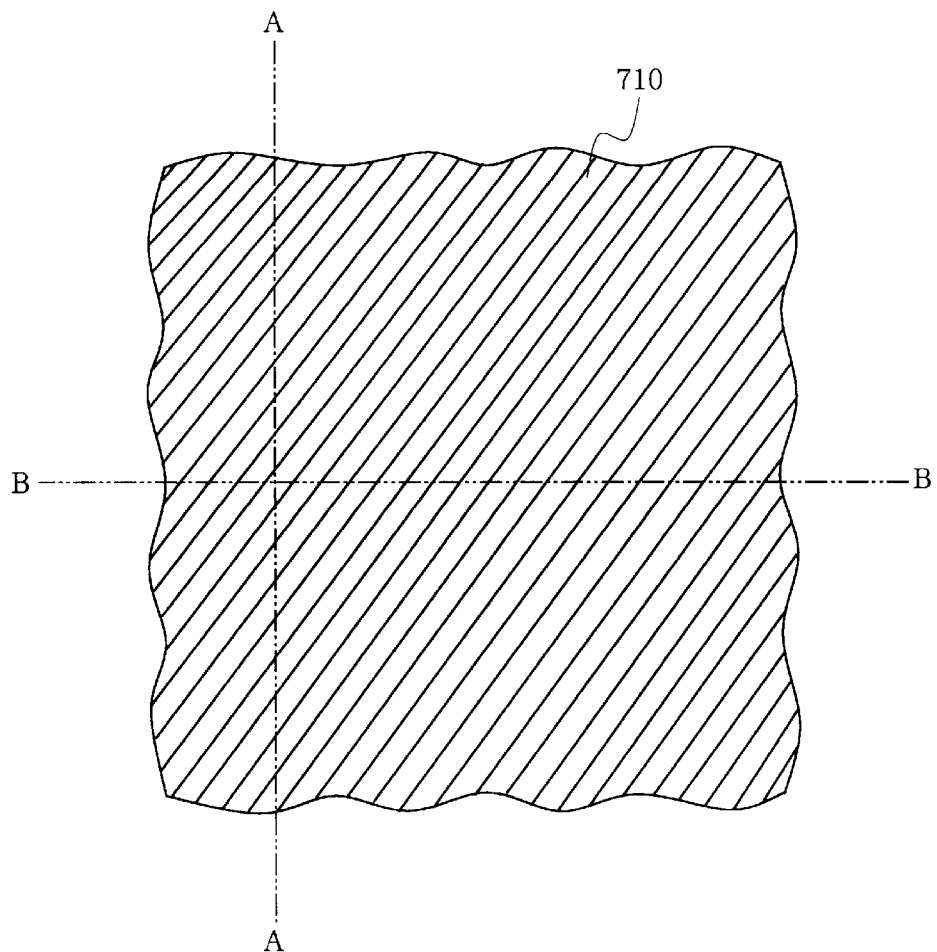
FIG. 46 is a plan view showing a lower insulating layer before a polishing step.
Figure 47:
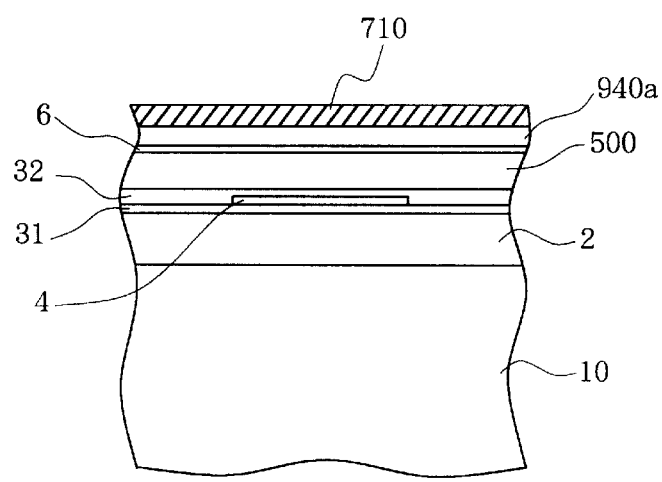
FIG. 47 is a view in section taken along the line A—A in FIG. 46.
Figure 48:
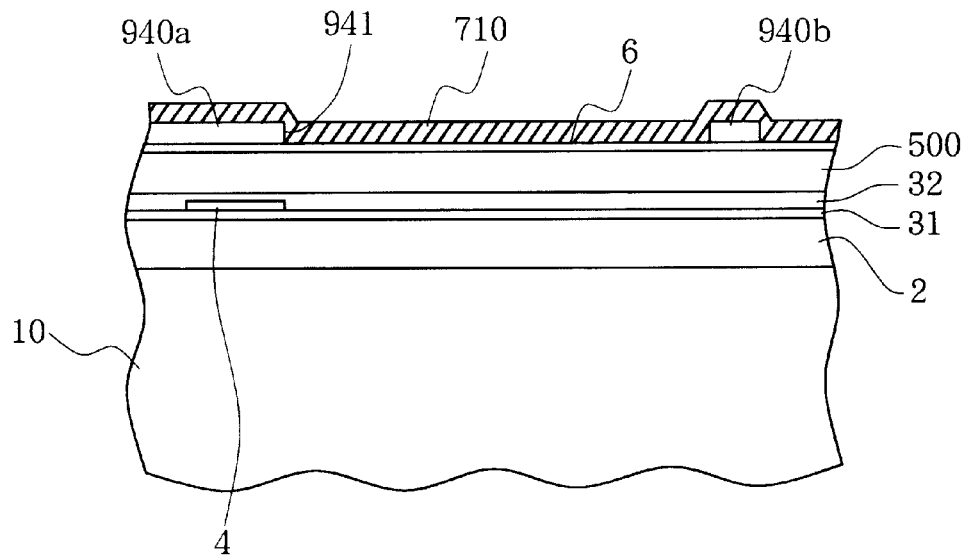
FIG. 48 is a view in section taken along the line B—B in FIG. 46.
Figure 49:
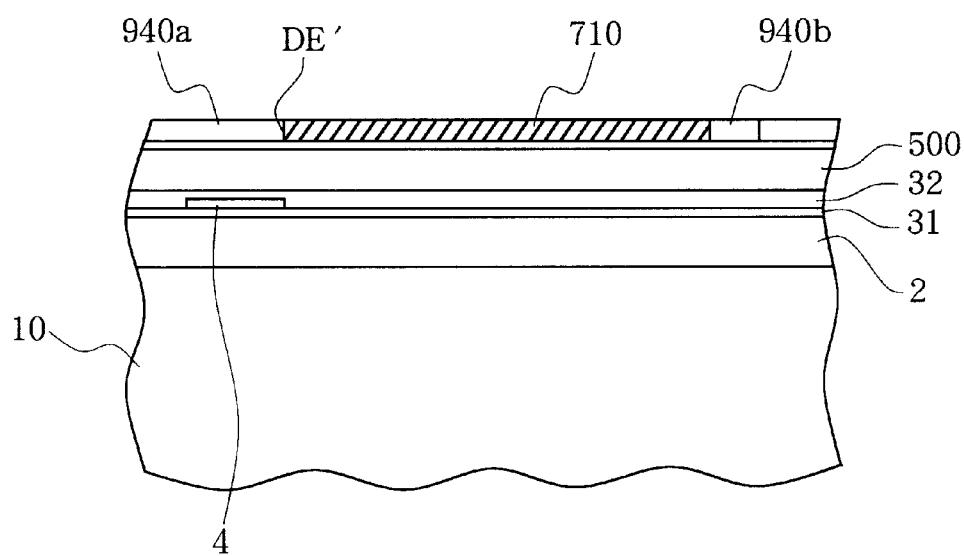
FIG. 49 is a view in section perpendicular to the recording medium and showing the lower insulating layer resulting from the polishing step.

Next, a lower insulating layer 710 made, for example, of $Al_2O_3$, $SiO_2$ or photosensitive resin is formed over the front and rear upper magnetic layers 940a, 940b and the gap spacer layer as shown in FIG. 46, FIG. 47 (section taken along the line A—A in FIG. 46) and FIG. 48 (section taken along the line B—B in FIG. 46). The surface of the lower insulating layer 710 is then polished to expose the surfaces of the front and rear upper magnetic layers 940a, 940b from the surface of the insulating layer 710, and the surface of the magnetic layer 940a, the surface of the insulating layer 710 and the surface of the magnetic layer 940b are made planar and flush with one another. Since the rear end face 941 of the front magnetic layer 940a is perpendicular to the wafer 10 as stated above, the insulating layer 710 is given a depth end restricting face DE' perpendicular to the wafer 10.

The same steps as performed for the second embodiment and shown in FIGS. 32 to 39 then follow, further followed by the same steps as executed for the second embodiment and shown in FIGS. 18 to 25, whereby a composite-type thin film magnetic head is completed.

Fourth Embodiment

Figure 20:
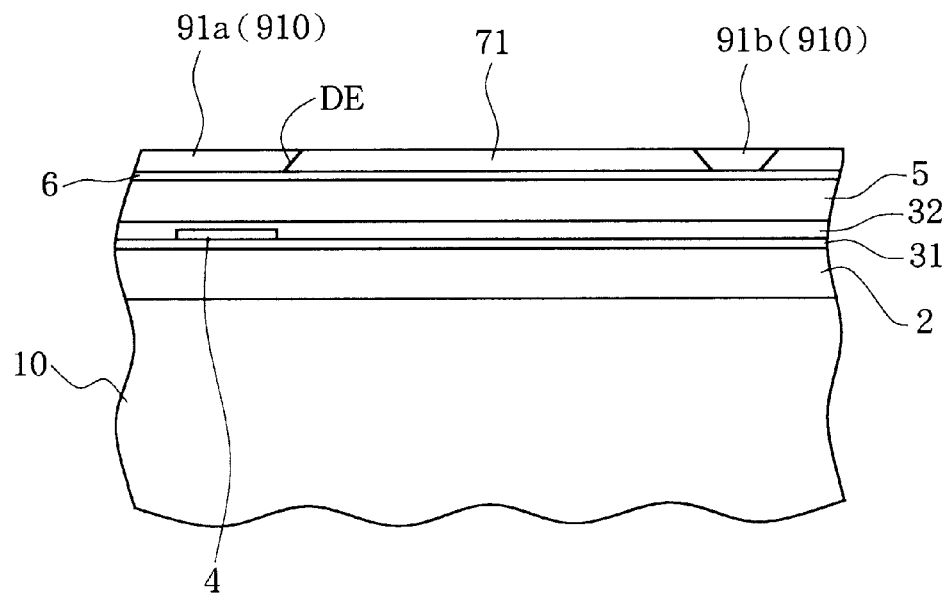
FIG. 20 is a view in section taken along the line B—B in FIG. 18.
Figure 21:
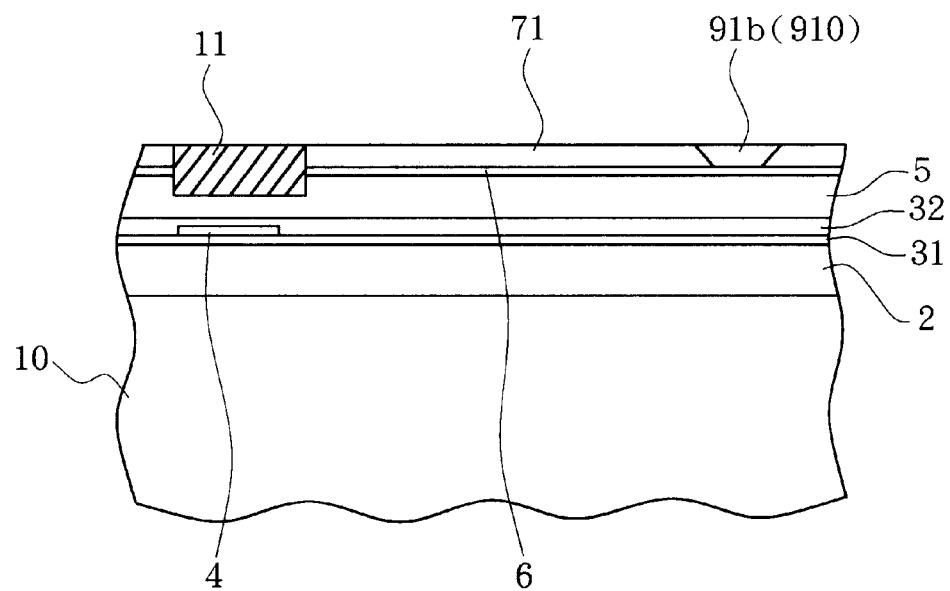
FIG. 21 is a view in section taken along the line C—C in FIG. 18.

When the surfaces of the front first core layer 91a and the lower insulating layer 71 are polished in the process for producing the head of the first embodiment, the depth end restricting face DE of the layer 71 is inclined as shown in FIG. 20, so that if variations occur in the amount of polishing, the boundary resulting from the polishing step between the surface of the core layer 91a and the surface of the insulating layer 71 will be positioned as altered from the specified position in the direction of gap depth in a plane parallel to the substrate.

Figure 71:
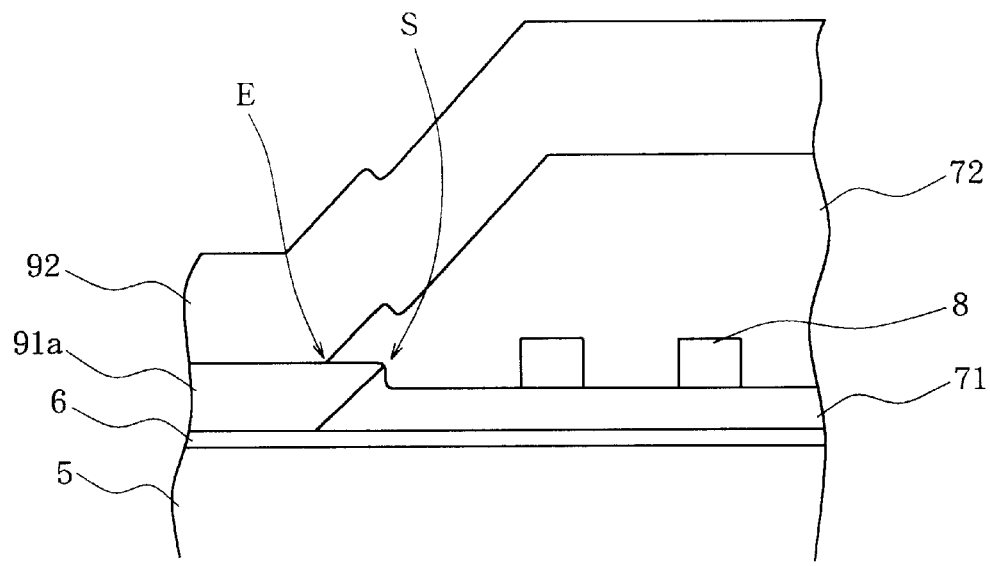
FIG. 71 is a sectional view showing faulty position of the front end of an upper insulating layer as shifted forward from the position of a boundary between the surface of a front first core layer and the surface of a lower insulating layer.
Figure 72:
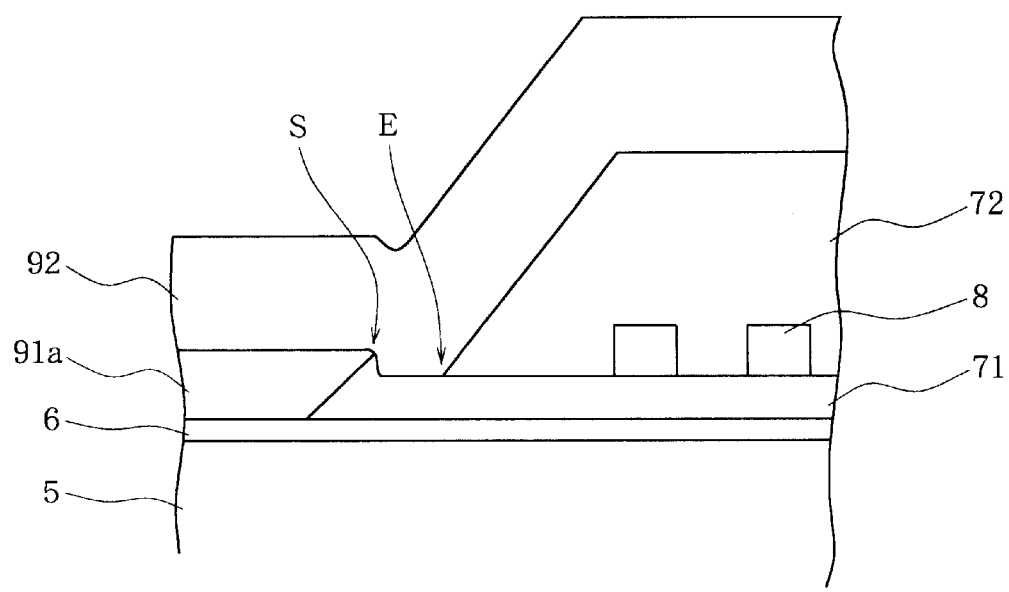
FIG. 72 is a sectional view showing faulty position of the front end of the upper insulating layer as shifted rearward from the position of the boundary between the surface of the front first core layer and the surface of the lower insulating layer.

The front first core layer 91a is prepared, for example, from NiFe, while the lower insulating layer 71 is formed, for example, from a photoresist. Accordingly, the surface of the insulating layer 71 is polished more rapidly since the hardness of the layer 71 is lower than the core layer 91a. As a result, the polishing step performed gives a lower surface to the lower insulating layer 71 than to the first core layer 91a, possibly producing a stepped portion at the boundary between the surfaces of the two layers 91a and 71 as shown in FIGS. 71 and 72.

If the boundary between the two layer surfaces shifts or includes a stepped portion, the step to be performed later of forming the upper insulating layer 72 encounters difficulty in making the boundary S between the two surfaces to coincide with the front end E of the upper insulating layer 72 as shown in FIG. 3. If the front end E of the insulating layer 71 is positioned forwardly of the boundary S as shown in FIG. 71, the area of contact between the upper surface of the front first core layer 91a and the lower surface of the second core layer 92 diminishes, presenting difficulty in transmitting magnetic flux. On the other hand, if the front end E of the insulating layer 72 is positioned rearwardly of the boundary S as seen in FIG. 72, the distance between the upper surface of the lower core layer 5 and the lower surface of the second core layer 92 decreases locally, giving rise to the problem of leakage of magnetic flux.

Accordingly, we have made improvements in the head of the first embodiment to provide a composite-type thin film magnetic head of the present embodiment which is free of the above problems.

Figure 50:
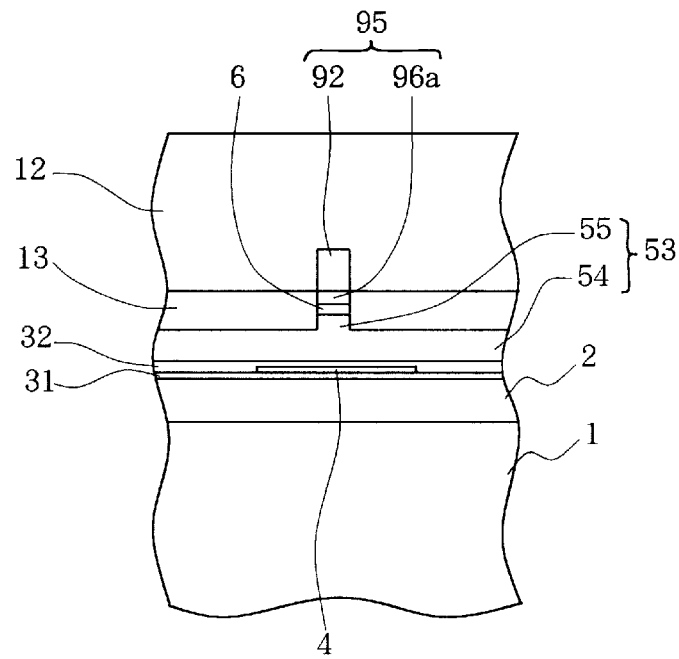
FIG. 50 is a view in section parallel to the recording medium and showing a composite-type thin film magnetic head as a fourth embodiment.
Figure 51:
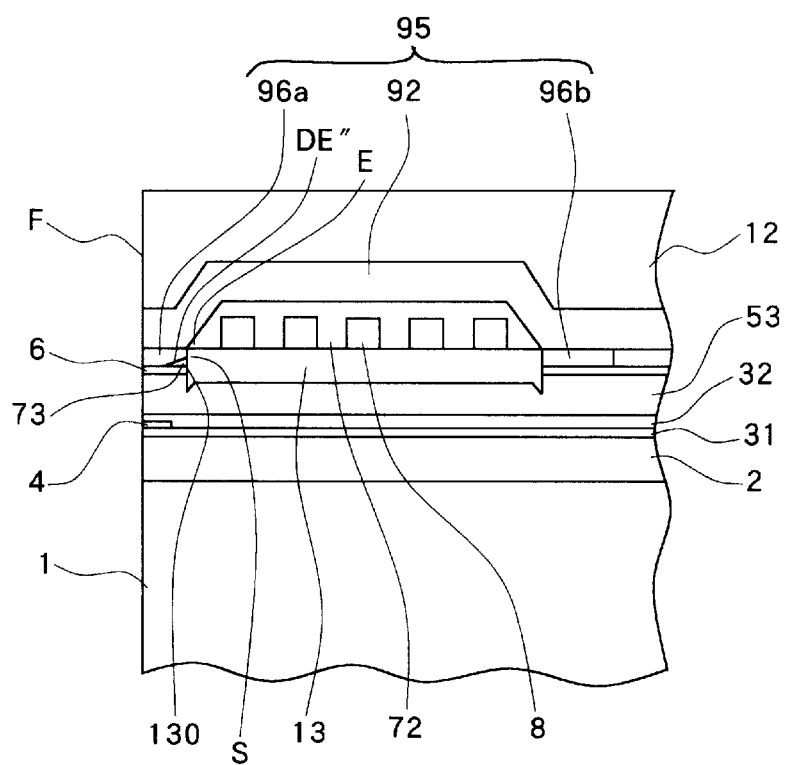
FIG. 51 is a view in section perpendicular to the recording medium and showing the same head.

With the head of the present embodiment as shown in FIGS. 50 and 51, a lower shield layer 2 is formed on a substrate 1, and an MR element layer and electrode layer (not shown) are formed over the shield layer 2 with a lower insulating layer 31 interposed therebetween to provide an MR head element. Formed over the layer 4 is an upper insulating layer 32. This structure is the same as in the case with the head of the first embodiment.

A lower core layer 53, for example, of NiFe is formed on the upper insulating layer 32 as an inductive head element. The lower core layer 53 comprises a shield portion 54 formed on the substrate (1) side thereof and having a large width, and a core portion 55 formed on the other side thereof and having a small width. The core portion 55 has the same width as the track width on the recording medium in the vicinity of the face to be opposed to the medium.

A gap spacer 6 and a nonmagnetic high-hardness layer 13 are formed on the lower core layer 53. The spacer layer 6 has the same width as the track width in the vicinity of the medium-opposed face. The high-hardness layer 13 is prepared, for example, from $Al_2O_3$ or $SiO_2$ and has a front end face 130 positioned toward the MR element layer 4 and perpendicular to the substrate 1.

Formed on the gap spacer layer 6 is a depth end defining layer 73 of a photosensitive resin, such as a photoresist, at a position retracted from the medium-opposed face by a predetermined gap depth. The depth end defining layer 73 has a depth end restricting face DE" slanting rearward to a gradually elevated level from the front end thereof close to the MR element layer 4. The layer 73 has a rear end face in contact with the front end face 130 of the nonmagnetic high-hardness layer 13 at a position lower than the surface of this layer 13.

Formed on the nonmagnetic high-hardness layer 13 is a coil layer 8, which is covered with an upper insulating layer 72.

An upper core layer 95 made, for example, of NiFe is formed on the surfaces of the gap spacer layer 6, depth end defining layer 73 and upper insulating layer 72. The upper core layer 95 comprises a front first core layer 96*a* and a back first core layer 96*b* which are formed on the substrate (1) side thereof, and a second core layer 92 formed on the other side thereof. The front first core layer 96*a* is formed in a region extending from the medium-opposed face to the front end face 130 of the nonmagnetic high-hardness layer 13, while the back first core layer 96*b* is formed in a region extending rearward from the rear end face of the high-hardness layer 13. The second core layer 92 extends from the medium-opposed face onto the upper surfaces of the front first core layer 96*a*, upper insulating layer 72 and back first core layer 96*b*, and has a greater thickness in the region extending from the medium-opposed face to the depth end restricting face DE" than in the region extending over the upper insulating layer 72. The thickness is greater by an amount corresponding to the thickness of the core layer 96*a*.

The front first core layer 96*a*, nonmagnetic high-hardness layer 13 and back first core layer 96*b* have respective planar upper surfaces which are flush with one another.

The front first core layer 96*a* has the same width as the track width on the recording medium. The second core layer 92 has the same width as the medium track width in the vicinity of the medium-opposed face. In the vicinity of the medium-opposed face, the second core layer 92, front first core layer 96*a*, gap spacer layer 6 and core portion 55 of the lower core layer 53 are aligned on a vertical plane at each of opposite sides with respect to the direction of the track width as shown in FIG. 50.

A protective layer 12 is formed over the second core layer 92 of the upper core layer 95.

The process for producing the head of the present embodiment includes the same steps as in the process for the first embodiment until the gap spacer layer 6 is formed.

FIGS. 52 to 66 show in detail the steps following the formation of the gap spacer layer 6 and performed until the nonmagnetic high-hardness layer 13 is formed.

Figure 52:
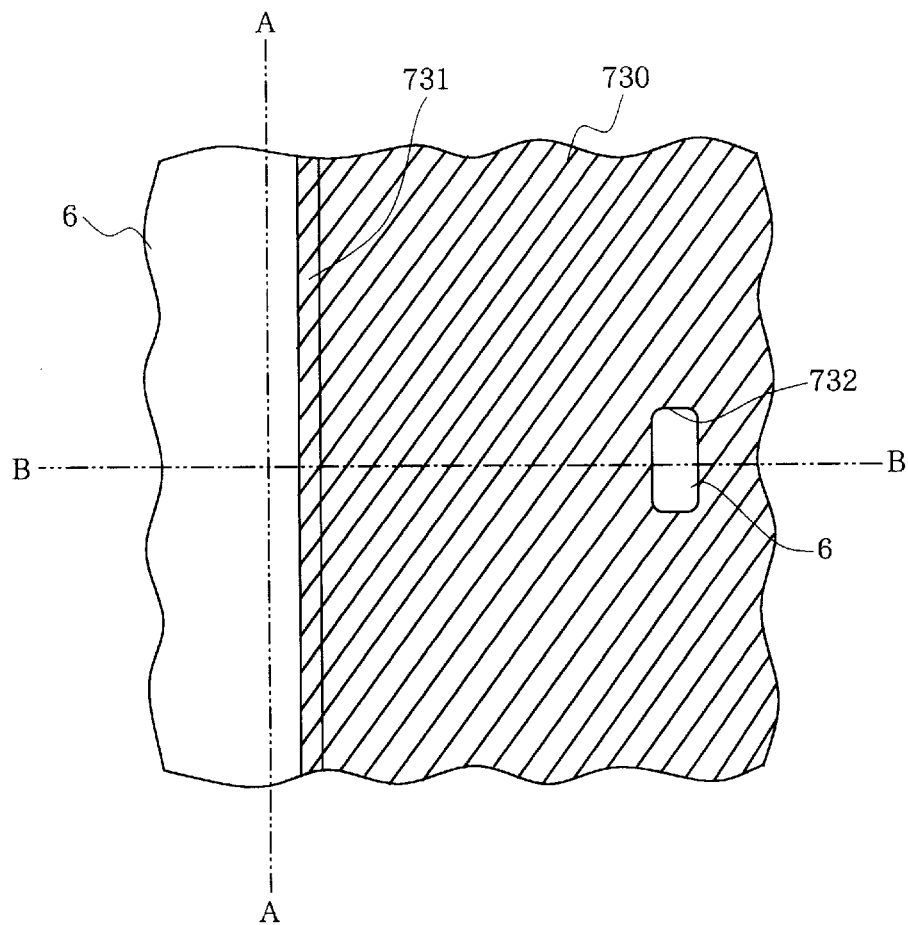
FIG. 52 is a plan view showing an insulating layer of the fourth embodiment as it is seen from above.
Figure 53:
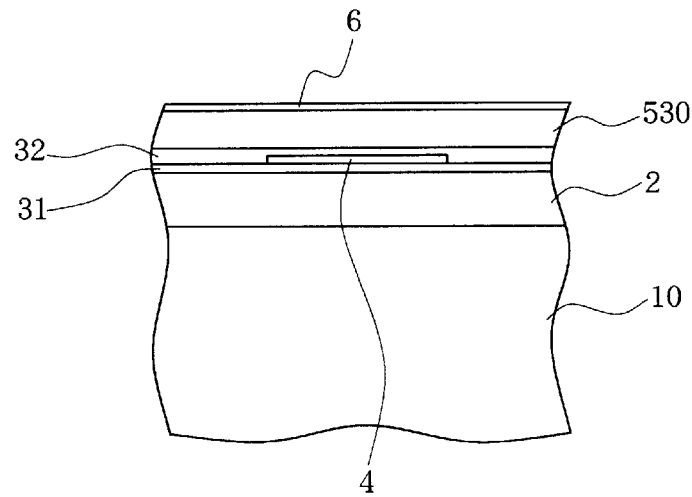
FIG. 53 is a view in section taken along the line A—A in FIG. 52.
Figure 54:
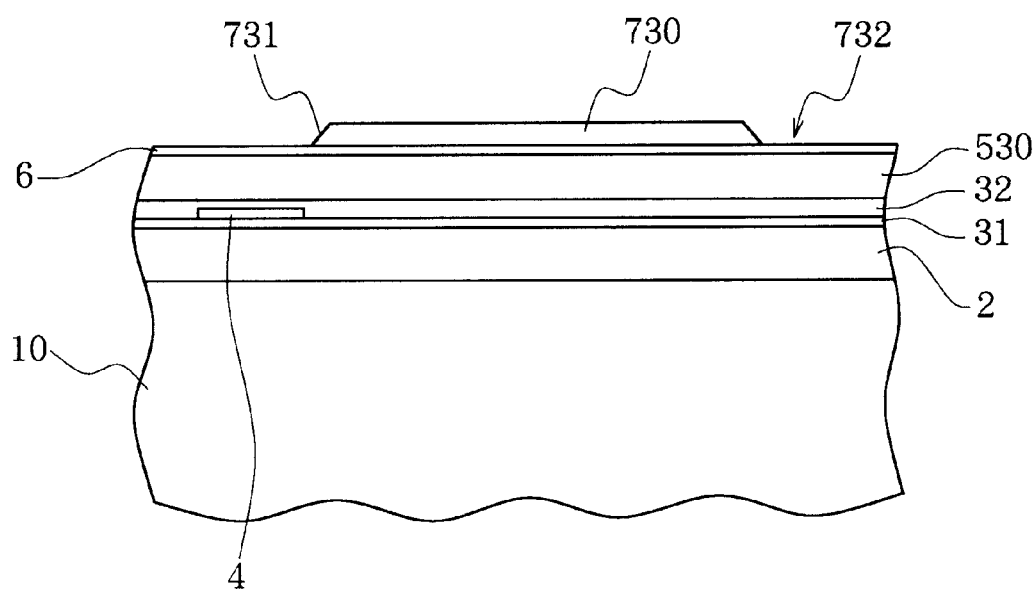
FIG. 54 is a view in section taken along the line B—B in FIG. 52.

With reference to FIG. 52, FIG. 53 (section taken along the line A—A in FIG. 52) and FIG. 54 (section taken along the line B—B in FIG. 52), a wafer 10 has successively formed thereon a lower shield layer 2, lower insulating layer 31, MR element layer 4, electrode layer (not shown), upper insulating layer 32, lower magnetic layer 530 and gap spacer layer 6.

First, an insulating layer 730, for example, of a photoresist is formed on the gap spacer layer 6 by the same step as the lower insulating layer forming step performed for the first embodiment and shown in FIGS. 7 to 9. The insulating layer 730 is formed at a position retracted from the position providing a face to be opposed to the medium by a predetermined gap depth. This layer has a slanting face 731 inclined rearward from the retracted position to a gradually elevated level as seen in FIG. 54. Further as shown in FIG. 52, the insulating layer 730 is formed, at the position where the back first core layer 96*b* is to be formed, with an opening 732 shaped in conformity with the shape of the layer 96*b* when seen from above. The surface of the spacer layer 6 is exposed from the layer 730 at the opening 732.

Figure 55:
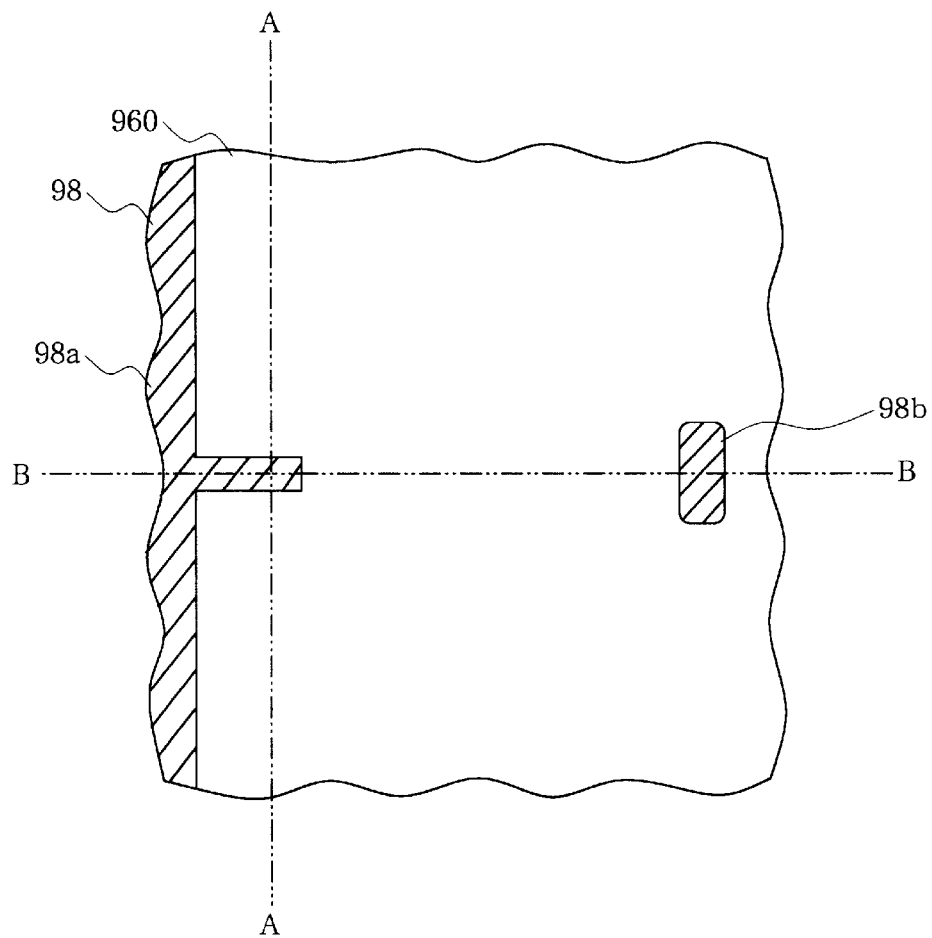
FIG. 55 is a plan view showing a resist layer of the fourth embodiment as it is seen from above.
Figure 56:
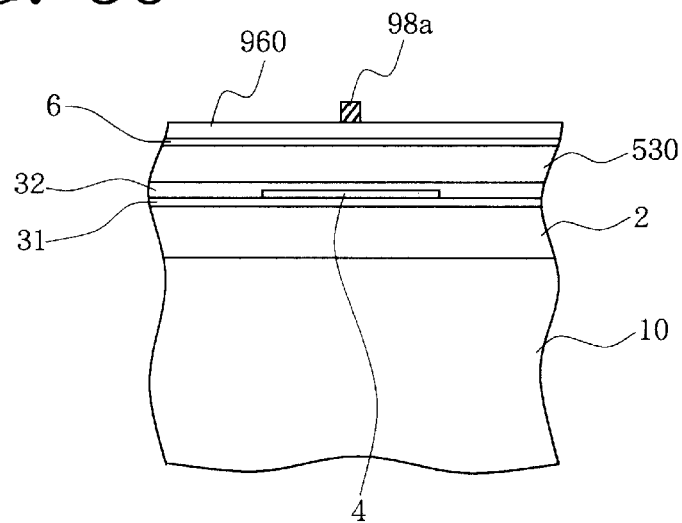
FIG. 56 is a view in section taken along the line A—A in FIG. 55.
Figure 57:
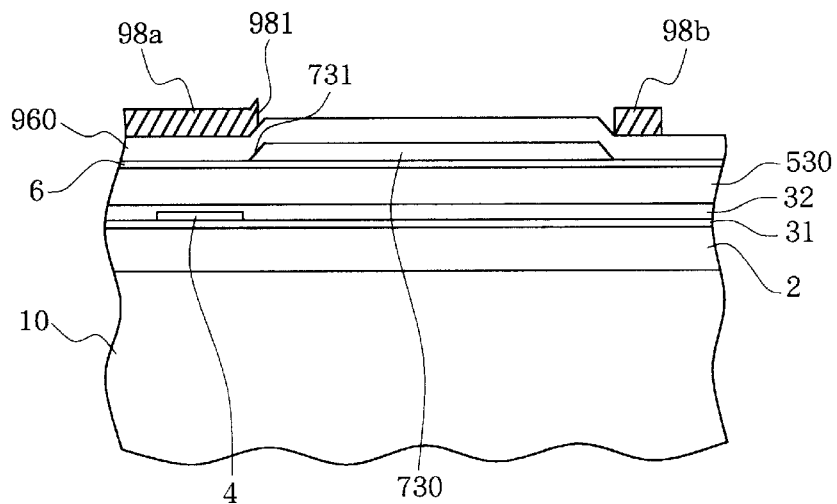
FIG. 57 is a view in section taken along the line B—B in FIG. 55.

With reference to FIG. 55, FIG. 56 (section taken along the line A—A in FIG. 55) and FIG. 57 (section taken along the line B—B in FIG. 55), an upper magnetic layer 960, for example, of NiFe is then formed over the entire surfaces of the spacer layer 6 and the insulating layer 730, and a resist layer 98 is formed on the magnetic layer 960 by exposure and developing treatments. The resist layer 98 comprises a front resist layer 98*a* formed in a region extending forward from an intermediate portion of the insulating layer slanting face 731, and a rear resist layer 98*b* formed at the position for providing the back first core layer 96*b*. The front resist layer 98*a* has the same width as the track width in the vicinity of the position for providing the medium-opposed face, and a rear end face 981 perpendicular to the wafer 10. On the other hand, the rear resist layer 98*b* is shaped in conformity with the shape of the back first core layer 96*b* when seen from above.

Figure 58:
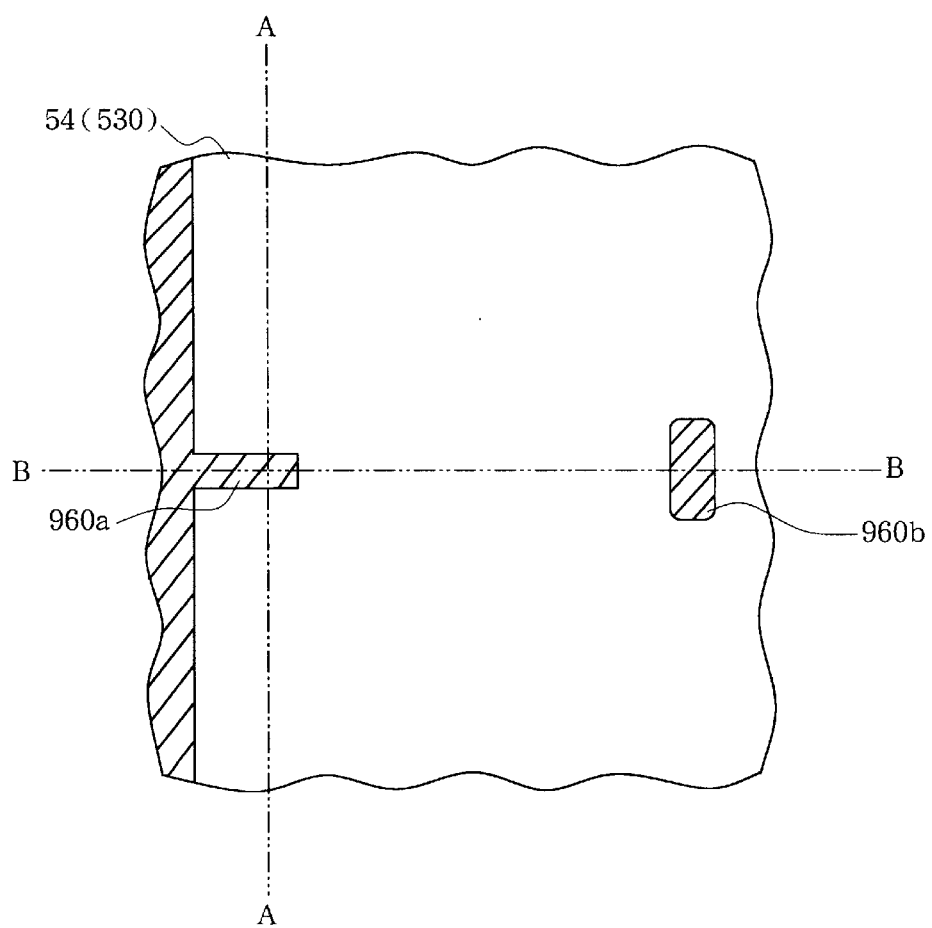
FIG. 58 is a plan view showing a front upper magnetic layer and a rear upper magnetic layer as they are seen from above.
Figure 59:
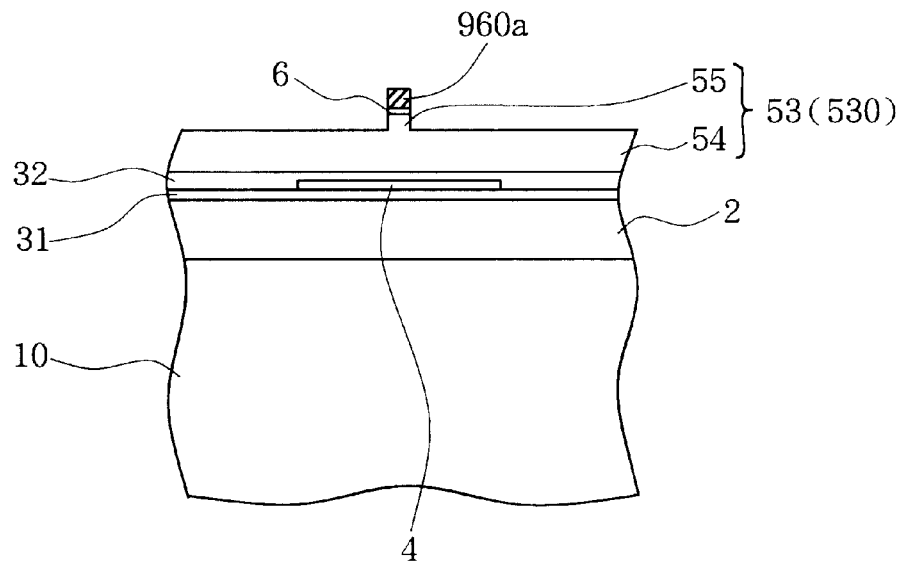
FIG. 59 is a view in section taken along the line A—A in FIG. 58.
Figure 60:
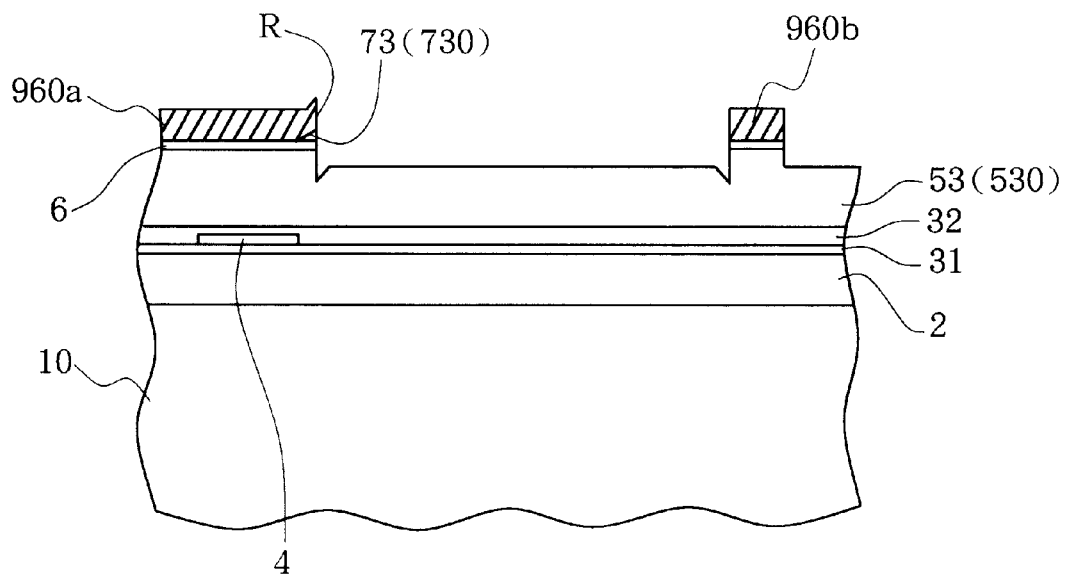
FIG. 60 is a view in section taken along the line B—B in FIG. 58.

Subsequently, the surfaces of the front and rear resist layers 98*a*, 98*b*, upper magnetic layer 960, insulating layer 730, gap spacer layer 6 and lower magnetic layer 530 are subjected to an ion beam etching operation to etch away the magnetic layer 960, insulating layer 730, spacer layer 6 and an upper layer portion of the magnetic layer 530 at the parts thereof extending outward beyond the outer peripheries of the resist layers 98*a*, 98*b* to align the upper magnetic layer 960, spacer layer 6 and upper layer portion of the lower magnetic layer 530 with one another on a vertical plane at each of opposite sides with respect to the track width direction and give these layers 960, 6 and upper layer portion of the layer 530 a vertical face R in alignment with the rear end face 981 of the front resist layer 98*a* as seen in FIG. 58, FIG. 59 (section taken along the line A—A in FIG. 58) and FIG. 60 (section taken along the line B—B in FIG. 58).

In this way, the upper layer portion of the lower magnetic layer 530 is formed into a core portion 55 of a lower core layer 53. The lower core layer 53 prepared comprises the core portion 55 and a shield portion 54 having a greater width than the core portion 55.

The upper magnetic layer 960 remains under the front and rear resist layers 98*a*, 98*b* to form a front upper magnetic layer 960*a* and a rear upper magnetic layer 960*b*, while a front end portion of the insulating layer 730 remains to provide a depth end defining layer 73.

Instead of ion beam etching, reactive ion etching can be resorted to.

The front and rear resist layers 98*a*, 98*b* are then removed.

Figure 61:
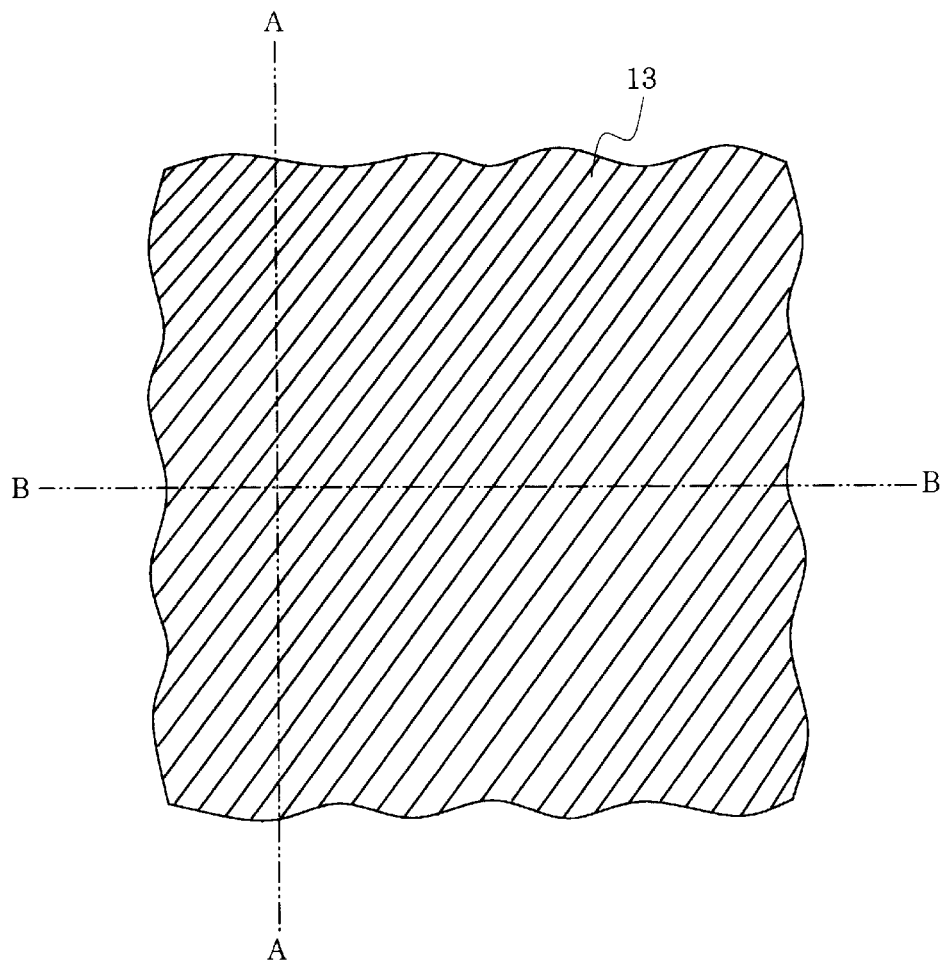
FIG. 61 is a plan view showing a nonmagnetic high-hardness layer before a polishing step as it is seen from above.
Figure 62:
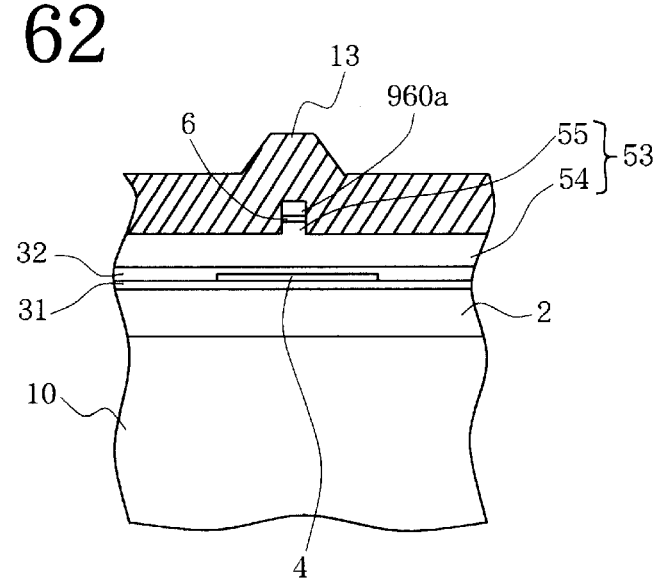
FIG. 62 is a view in section taken along the line A—A in FIG. 61.
Figure 63:
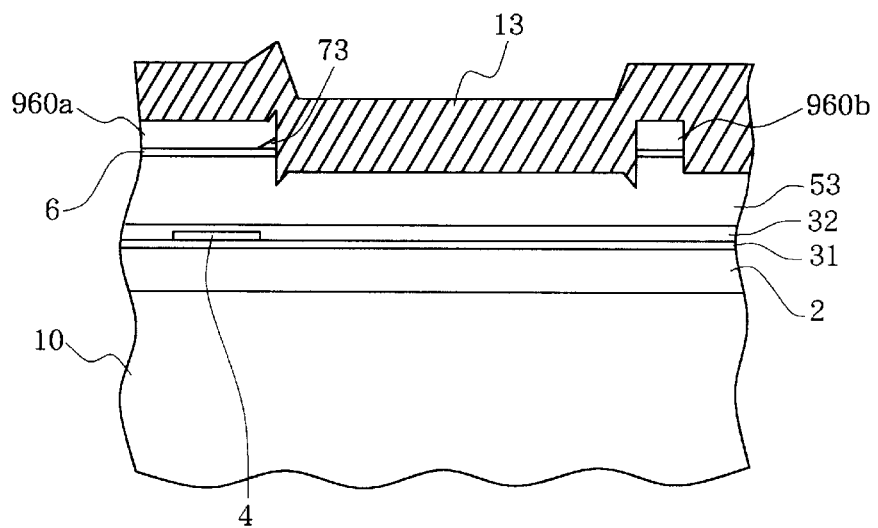
FIG. 63 is a view in section taken along the line B—B in FIG. 61.

Next, a nonmagnetic high-hardness layer 13 is formed over the front upper magnetic layer 960*a*, lower core layer 53 and rear upper magnetic layer 960*b* as seen in FIG. 61, FIG. 62 (section taken along the line A—A in FIG. 61) and FIG. 63 (section taken along the line B—B in FIG. 61). The nonmagnetic high-hardness layer 13 is formed from a material, such as $Al_2O_3$ or $SiO_2$, having approximately the same hardness as the front and rear upper magnetic layers 960*a*, 960*b*.

The surface of the nonmagnetic high-hardness layer 13 is then polished to expose the surfaces of the front and rear upper magnetic layers 960*a*, 960*b* from the layer 13 first, and the surfaces of these layers 960*a*, 960*b*, 13 are subsequently polished. The high-hardness layer 13 is comparable in hardness to the front and rear magnetic layers 960*a*, 960*b*, so that the layers 960*a*, 960*b* are polished at approximately the same rate as the layer 13 in this step.

Figure 64:
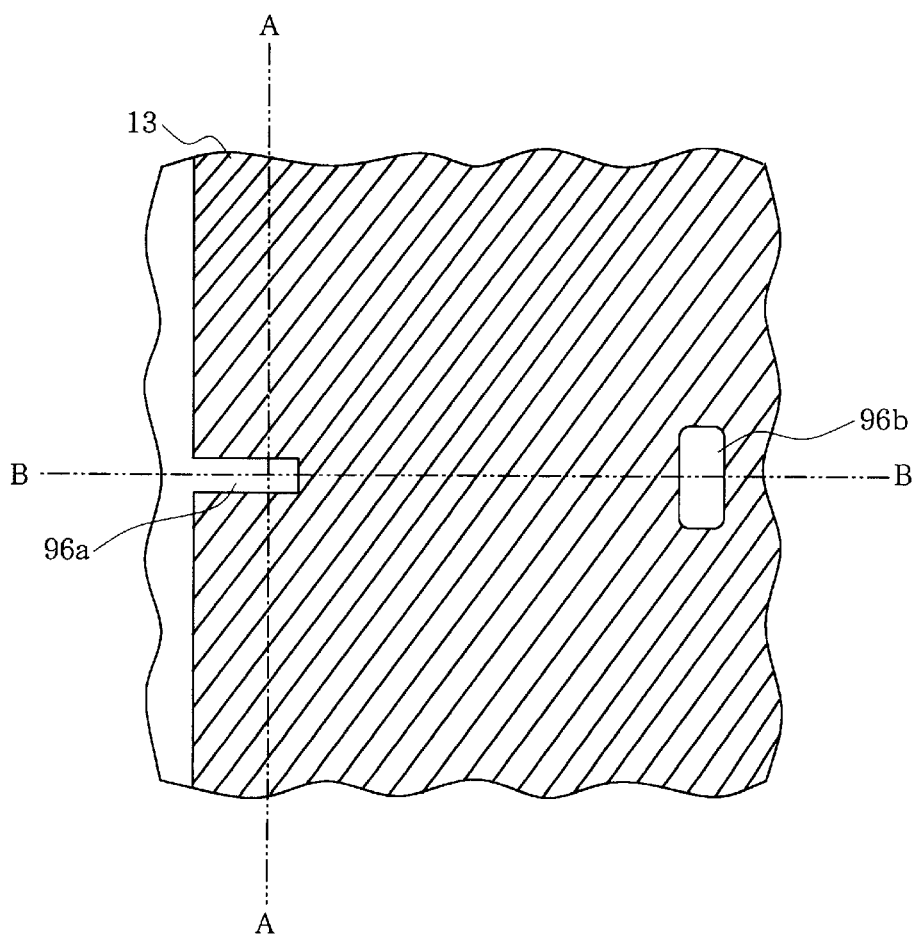
FIG. 64 is a plan view showing the nonmagnetic high-hardness layer as it is seen from above before a polishing step.
Figure 65:
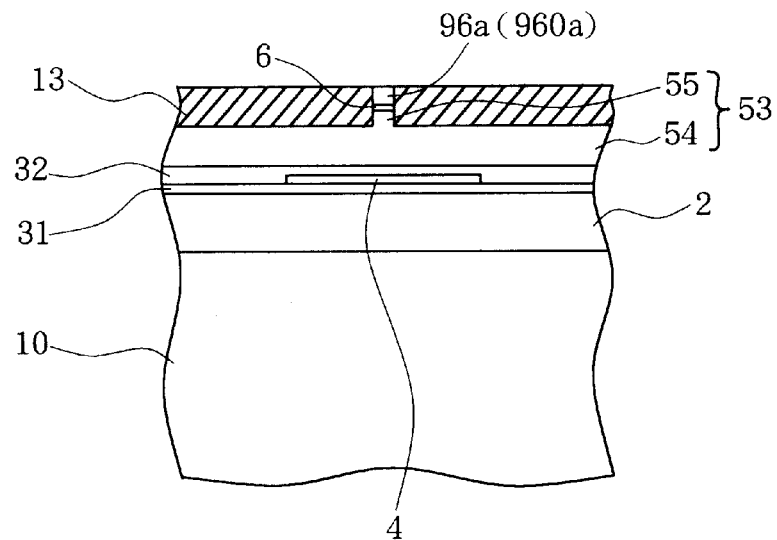
FIG. 65 is a view in section taken along the line A—A in FIG. 64.
Figure 66:
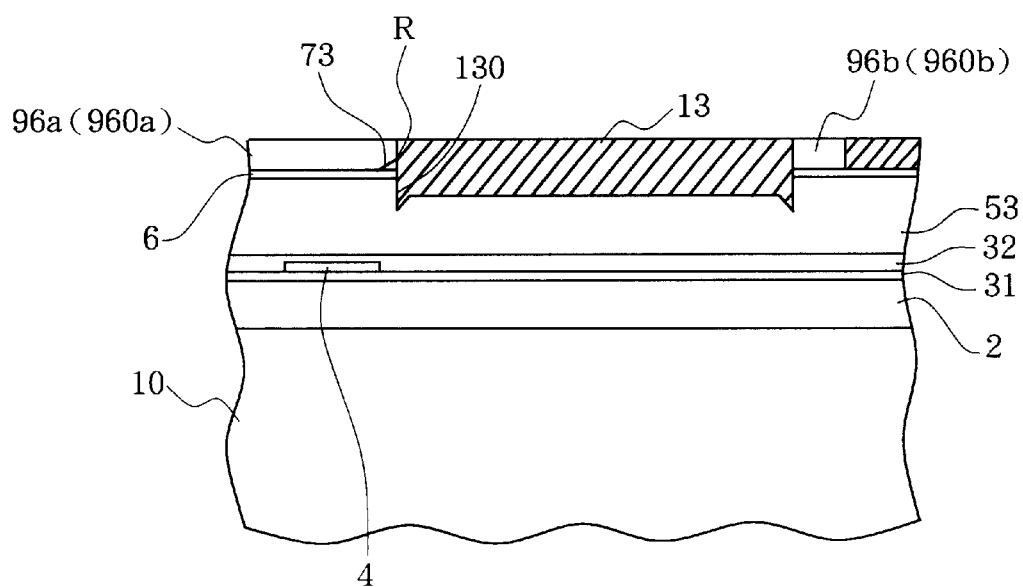
FIG. 66 is a view in section taken along the line B—B in FIG. 64.
Figure 67:
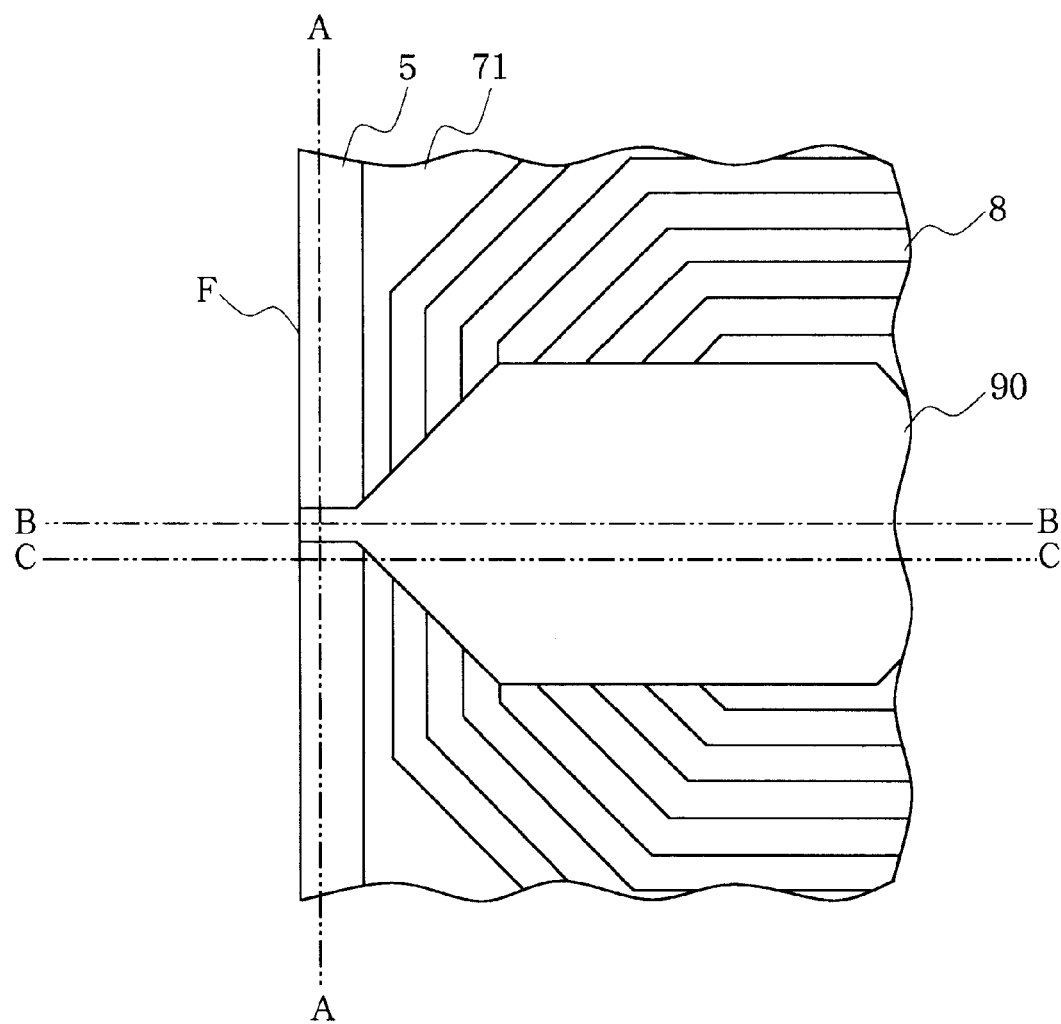
FIG. 67 is a plan view showing a conventional composite-type thin film magnetic head as it is seen from above.
Figure 68:
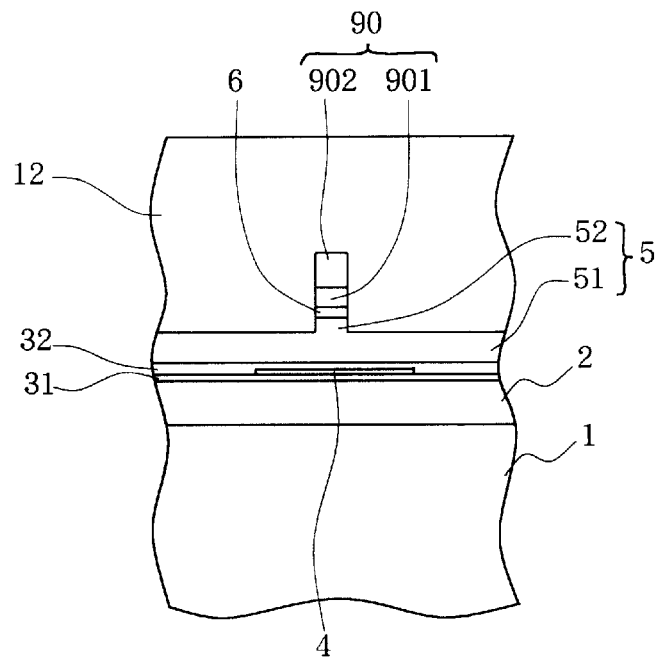
FIG. 68 is a view in section taken along the line A—A in FIG. 67.
Figure 69:
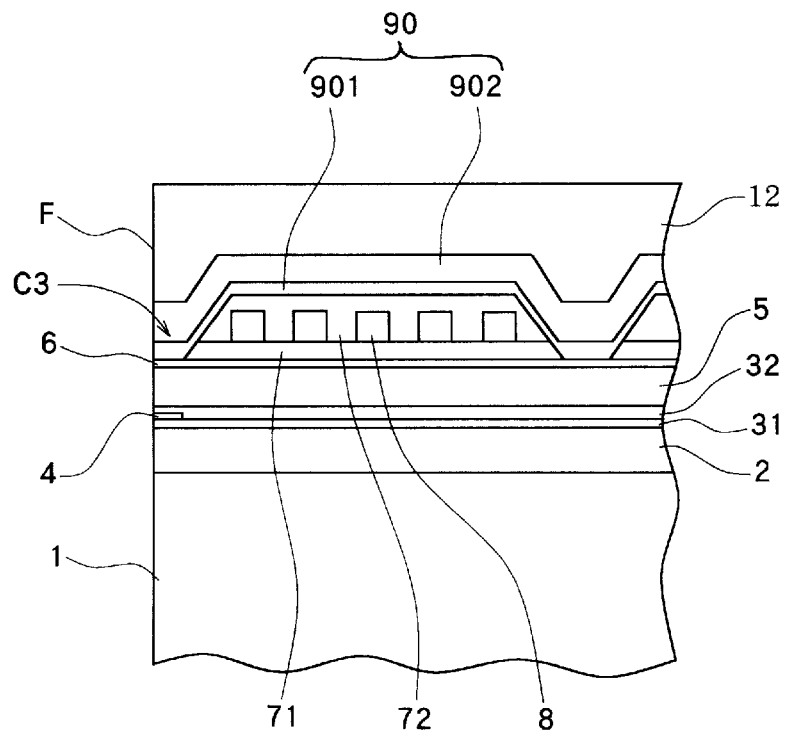
FIG. 69 is a view in section taken along the line B—B in FIG. 67.
Figure 70:
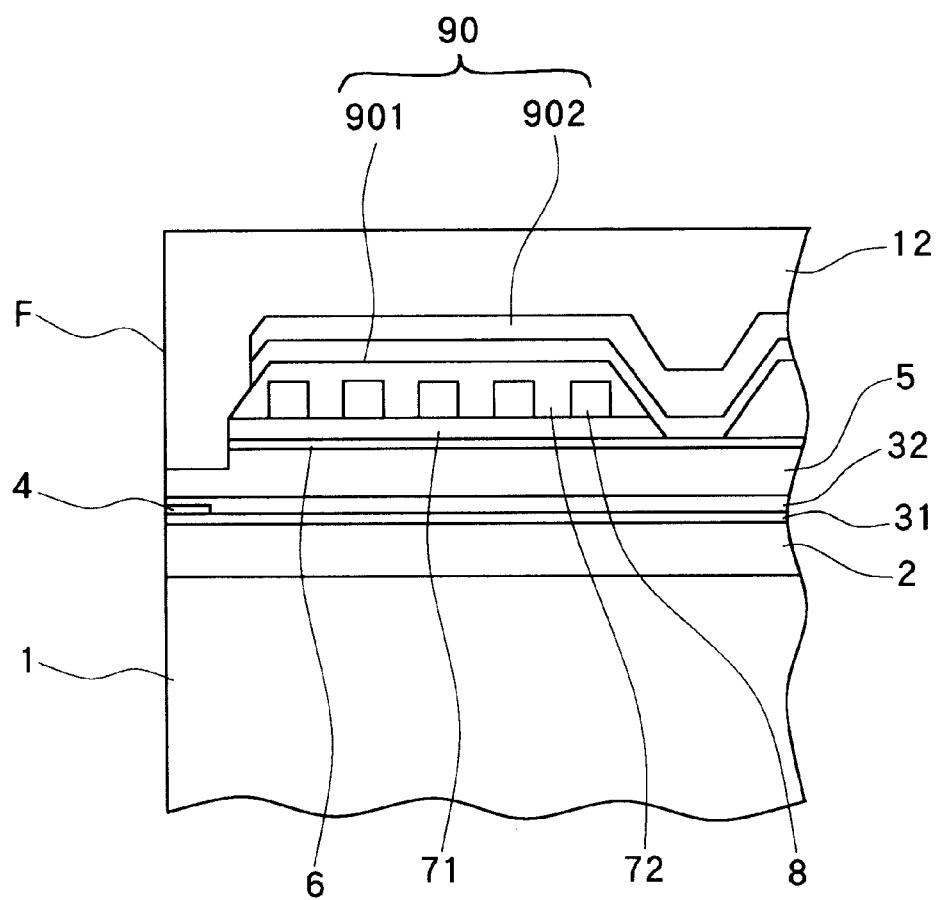
FIG. 70 is a view in section taken along the line C—C in FIG. 67.

Consequently, the layers 13, 960*a*, 960*b* are given respective planar surfaces, which are flush with one another as shown in FIG. 64, FIG. 65 (section taken along the line A—A in FIG. 64) and FIG. 66 (section taken along the line B—B in FIG. 64).

In this way, the front and rear upper magnetic layers 960*a*, 960*b* are formed into front and rear first core layers 96*a*, 96*b*, respectively. Since the vertical face R is given to the front upper magnetic layer 960a, depth end defining layer 73, gap spacer layer 6 and lower core layer 53, the nonmagnetic high-hardness layer 13 has a front end face 130 perpendicular to the wafer 10. During the progress of polishing, therefore, the boundary between the surface of the front first core layer 96a and the surface of the nonmagnetic high-hardness layer 13 is present always at a definite position without shifting from the specified position even if the polishing operation involves variations in the amount of polishing.

A coil layer 8 is thereafter formed on the nonmagnetic high-hardness layer 13, and an upper insulating layer 72 is subsequently formed over the coil layer 8 by known steps as shown in FIG. 51. The boundary between the surface of the front first core layer 96a and that of the high-hardness layer 13 is present at the specified position, and the surfaces of these layers 96a, 13 are flush with each other, with the result that the boundary S between the surfaces of the two layers 96a, 13 is in coincidence with the front end E of the upper insulating layer 72 with a high accuracy.

The same steps as performed for the first embodiment then follow to complete a composite-type thin film magnetic head.

U.S. Pat. No. 5,452,164 discloses a thin film magnetic writing head having an upper magnetic pole P2 which comprises an upper pole-tip element PT2a and a lower pole-tip element PT2b. In this head, the upper surface of the element PT2b is lower than the upper surf ace of a first insulating layer $I_1$ formed in a lower layer of a conductor layer 108. On the other hand with the foregoing four embodiments, the upper surface of the front first core layer 91a, 94a or 96a is flush with the surface of the lower insulating layer 71 or 710 or the nonmagnetic high-hardness layer 13.

Figure 73:
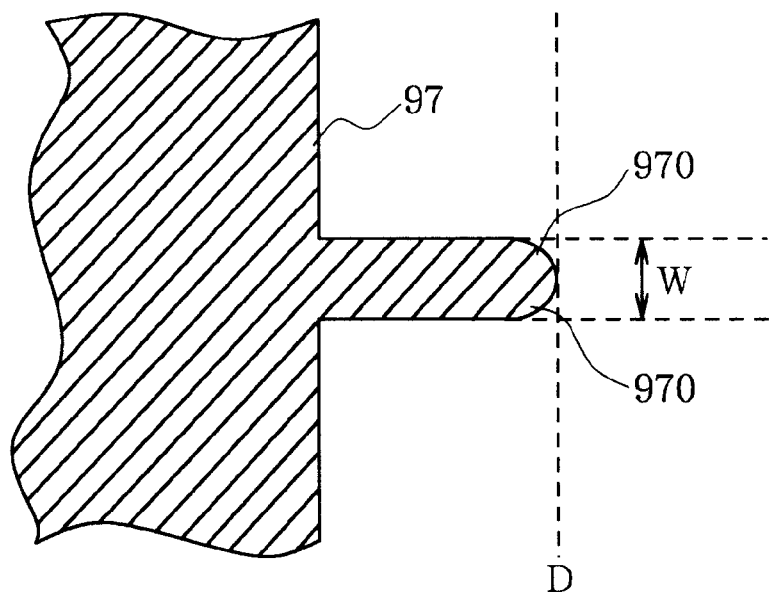
FIG. 73 is a sectional view for illustrating a fault occurring when an etching operation for defining a depth end and an etching operation for defining a track width are effected by the same step.

Further with the process for producing the head of the U.S. Patent, a resist layer 97 formed by exposure and development is used for ion beam etching to define a depth end D and track width W at the same time. However, generally in the process for forming resist layers by exposure and development, the exposure involves diffraction of light, so that a resist layer 97 is formed which is rounded at opposite sides 970, 970 of an end as shown in FIG. 73. The resist layer 97 having such an end rounded at opposite sides 970, 970 is used as a mask for ion beam etching to define the depth end D and track width W. This entails the problem that the gap depth becomes smaller than is specified at opposite side portions with respect to the track width direction.

With the first, second and fourth embodiments of the present invention, a photosensitive resin is exposed to light, developed and cured to form the insulating layer 71 or 730 for defining the depth end. Since the insulating layer 71 or 710 has in the track width direction a width greater than the track width, the specified gap depth is available even if the insulating layer 71 or 710 is rounded at opposite side portions. Further according to the third embodiment, the etching for defining the depth end is effected by a step separate from the etching for defining the track width. The step of etching for restricting the depth end uses a resist layer having in the track width direction a width greater than the track width. Accordingly, even if this etching step is performed with use of a resist layer with an end having rounded side portions, the specified gap depth can be obtained.

Thus, the present invention differs from U.S. Pat. No. 5,452,164 disclosing the thin magnetic writing head and the process for producing the same in that the upper surface of the front first core layer 91a, 94a or 96a is flush with the surface of the lower insulating layer 71 or 710 or the nonmagnetic high-hardness layer 13, and that the step of defining the depth end is separate from the step of defining the track width.

The foregoing description of the embodiments is given for illustrating the present invention and should not be construed as restricting the invention as set forth in the appended claims or reducing the scope thereof. The heads of the invention are not limited to the embodiments described in construction but can of course be modified variously without departing from the spirit of the invention set forth in the claims.

Figure 5:
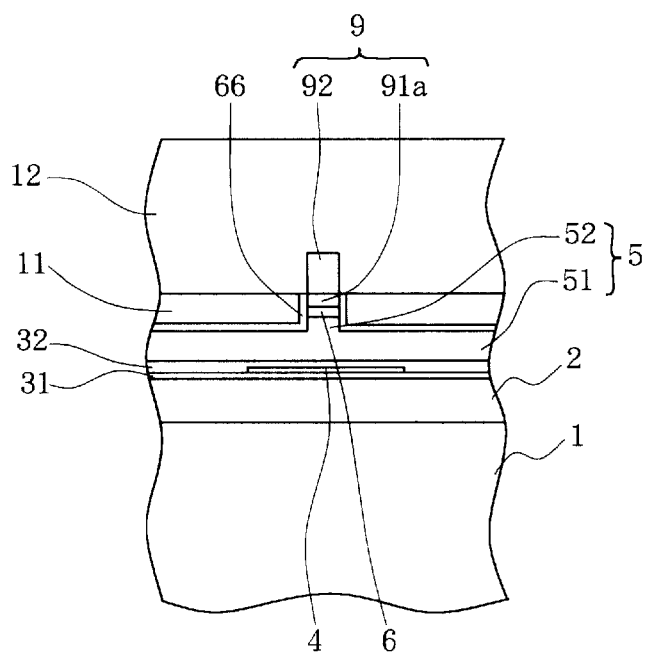
FIG. 5 is a sectional view showing a modification of the first embodiment.

For example, prior to the step of forming the nonmagnetic high-hardness layer 11 of the first embodiment, a nonmagnetic electrically conductive layer 66, for example, of Ti, Cr, Ta or W can be formed over opposite side faces, with respect to the track width direction, of the front first core layer 91a, gap spacer layer 6 and core portion 52 of the lower core layer 5, and over the upper surface of the shield portion 51 of the lower core layer 5 extending from opposite sides of the core portion 52, in the vicinity of the medium-opposed face as shown in FIG. 5. The layer 66 then inhibits leakage magnetic flux from opposite sides of the layers 91a, 6 and the lower core layer core portion 52.

Figure 6:
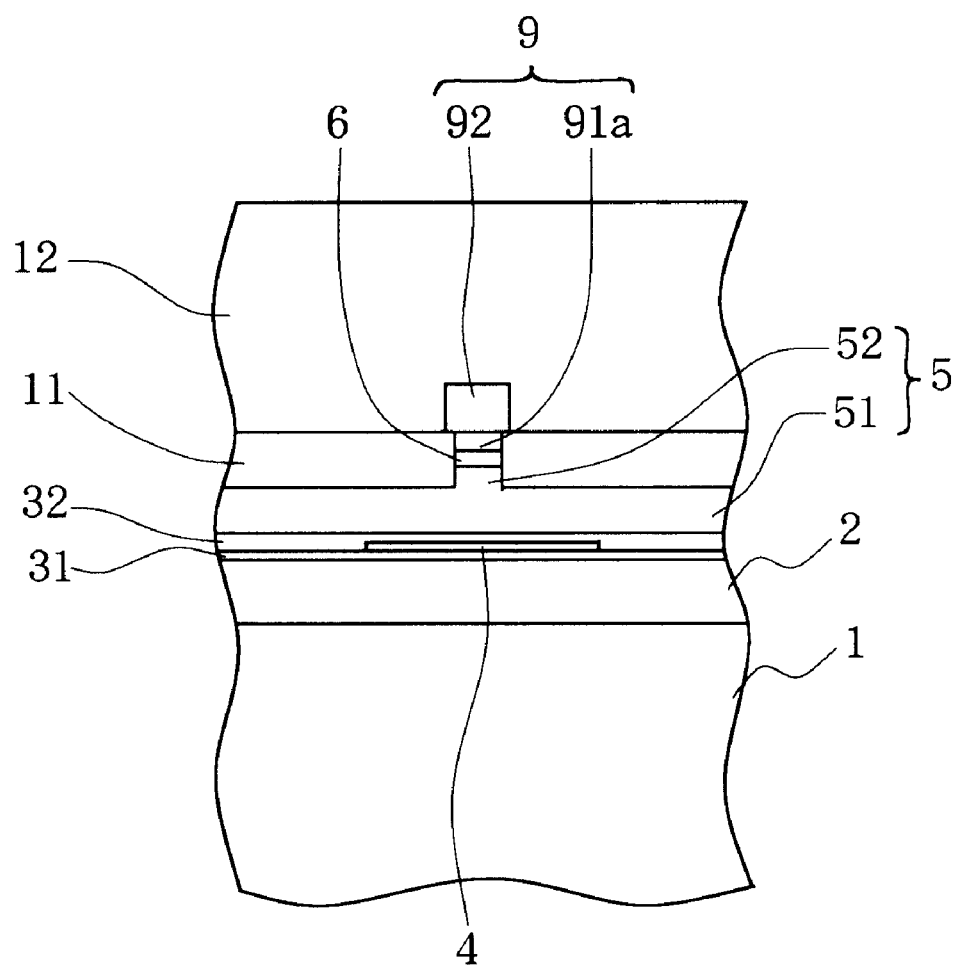
FIG. 6 is a sectional view showing another modification of the first embodiment.

According to any of the foregoing embodiments, the second core layer 92 has the same width as the front first core layer 91a in the vicinity of the medium-opposed face, while the track width on the recording medium is defined by the core layer 91a. It is therefore possible to give a greater width to the second core layer 52 than to the front first core layer 91a as shown in FIG. 6.

Further according to any of the foregoing embodiments, the gap spacer layer 6 is interposed between the lower core layer 5 or 53 and the back first core layer 91b, 94b or 96b, whereas this arrangement is not limitative; alternatively, the upper surface of the lower core layer 5 or 53 can be in contact with the lower surface of the back first core layer 91b, 94b or 96b.

Further according to any of the foregoing embodiments, the lower core layer 5, 53 comprises the shield portion 51 or 54 and core portion 52 or 55 to serve the function of the magnetic core of the inductive head element, also serving as a magnetic shield between the inductive head element and the MR head element. However, the lower core layer 5 or 53 can be replaced by a lower core layer serving as the magnetic core of the inductive head element, and an upper shield layer serving the function of a magnetic shield between the inductive head element and the MR head element.

Furthermore, the present invention is not limited to composite-type thin film magnetic heads comprising an MR head element and an inductive head element, but can be embodied into an inductive thin film magnetic head comprising an inductive head element only.

What is claimed is:

1. A process for producing a thin film magnetic head comprising the steps of:

forming a lower core layer on a substrate, forming a gap spacer layer on a surface of the lower core layer, forming on a surface of the gap spacer layer a lower insulating layer extending rearward from a position retracted from a medium-opposed face to be opposed to a recording medium by a predetermined gap depth, forming a magnetic layer over the surface of the gap spacer layer and a surface of the lower insulating layer, coating a surface of the magnetic layer with a resist, forming a resist layer by exposing the resulting resist coating to light and developing the exposed resist coating, the resist layer having the same width as a track width on the recording medium in the vicinity of the medium-opposed face, etching the magnetic layer with the resist layer formed thereon to remove the magnetic layer at the portions thereof extending outward from opposite sides of the resist layer with respect to the direction of the track width, removing the resist layer, forming a first core layer by machining the surface of the magnetic layer and the surface of the lower insulating layer to make the surfaces planar and form the magnetic layer into the first core layer, the first core layer extending from the medium-opposed face to a front end face of the lower insulating layer, forming an upper insulating layer over the resulting lower insulating layer with a coil layer interposed therebetween, and forming a second core layer on a surface of the first core layer and a surface of the upper insulating layer to form an upper core layer comprising the first core layer and the second core layer, the second core layer extending from the medium-opposed face over the upper surface of the first core layer and further over the upper surface of the upper insulating layer.

2. A process for producing a thin film magnetic head comprising a procedure for fabricating a magnetoresistance effect head element on a substrate, and a procedure for fabricating an inductive head element on the head element, the inductive head element fabricating procedure comprising the steps of:

forming a lower magnetic layer on the magnetoresistance effect head element, forming a gap spacer layer on a surface of the lower magnetic layer, forming on a surface of the gap spacer layer a lower insulating layer extending rearward from a position retracted from a medium-opposed face to be opposed to a recording medium by a predetermined gap depth, forming an upper magnetic layer over the surface of the gap spacer layer and a surface of the lower insulating layer, coating a surface of the upper magnetic layer with a resist, forming a resist layer by exposing the resulting resist coating to light and developing the exposed resist coating, the resist layer having the same width as a track width on the recording medium in the vicinity of the medium-opposed face, forming a lower core layer by etching the upper magnetic layer, the gap spacer layer and an upper layer portion of the lower magnetic layer with the resist layer formed on the magnetic layer to remove the upper magnetic layer, the gap spacer layer and the upper layer portion of the lower magnetic layer at the parts thereof extending outward from opposite sides of the resist layer with respect to the direction of the track width and thereby form the upper layer portion of the lower magnetic layer into a core portion constituting the lower core layer and having the same width as the track width on the recording medium in the vicinity of the medium-opposed face, removing the resist layer, forming a first core layer by machining the surface of the upper magnetic layer and the surface of the lower insulating layer to make the surfaces planar and form the upper magnetic layer into the first core layer, the first core layer extending from the medium-opposed face to a front end face of the lower insulating layer, forming an upper insulating layer over the resulting lower insulating layer with a coil layer interposed therebetween, and forming a second core layer on a surface of the first core layer and a surface of the upper insulating layer to form an upper core layer comprising the first core layer and the second core layer, the second core layer extending from the medium-opposed face over the upper surface of the first core layer and further over the upper surface of the upper insulating layer.

3. A process for producing a thin film magnetic head according to claim 2 wherein the step of forming the first core layer comprises:

a first step of forming a nonmagnetic high-hardness layer having approximately the same hardness as the upper magnetic layer over the upper magnetic layer, the gap spacer layer and a surface of the lower core layer, and a second step of machining a surface of the nonmagnetic high-hardness layer, the surface of the upper magnetic layer and the surface of the lower insulating layer to make the surfaces planar and form the upper magnetic layer into the first core layer.

4. A process for producing a thin film magnetic head according to claim 3 wherein the first step forms a nonmagnetic electrically conductive layer over opposite side faces, with respect to the direction of the track width, of the upper magnetic layer, the gap spacer layer and the core portion of the lower core layer and over an upper surface of a lower layer portion of the lower core layer, and thereafter forms the nonmagnetic high-hardness layer over a surface of the nonmagnetic electrically conductive layer.

5. A process for producing a thin film magnetic head comprising a procedure for fabricating a magnetoresistance effect head element on a substrate, and a procedure for fabricating an inductive head element on the head element, the inductive head element fabricating procedure comprising the steps of:

forming a lower magnetic layer on the magnetoresistance effect head element, forming a gap spacer layer on a surface of the lower magnetic layer, forming on a surface of the gap spacer layer a lower insulating layer extending rearward from a position retracted from a medium-opposed face to be opposed to a recording medium by a predetermined gap depth, forming an upper magnetic layer over the surface of the gap spacer layer and a surface of the lower insulating layer, machining a surface of the upper magnetic layer and the surface of the lower insulating layer to make the surfaces planar, coating the surface of the upper magnetic layer and the surface of the lower insulating layer with a resist, forming a resist layer by exposing the resulting resist coating to light and developing the exposed resist coating, the resist layer having the same width as a track width on the recording medium in the vicinity of the medium-opposed face, forming core layers and by etching the upper magnetic layer, the gap spacer layer and an upper layer portion of the lower magnetic layer with the resist layer formed on the magnetic layer to remove the upper magnetic layer, the gap spacer layer and the upper layer portion of the lower magnetic layer at the parts thereof extending outward from opposite sides of the resist layer with respect to the direction of the track width, thereby form the upper layer portion of the lower magnetic layer into a core portion constituting a lower core layer and having the same width as the track width on the recording medium in the vicinity of the medium-opposed face and thereby form the upper magnetic layer into a first core layer having the same width as the track width on the recording medium in the vicinity of the medium-opposed face, removing the resist layer, forming an upper insulating layer over the lower insulating layer with a coil layer interposed therebetween, and forming a second core layer on a surface of the first core layer and a surface of the upper insulating layer to form an upper core layer comprising the first core layer and the second core layer, the second core layer extending from the medium-opposed face over the upper surface of the first core layer and further over the upper surface of the upper insulating layer.

6. A process for producing a thin film magnetic head according to claim 5 wherein the step of forming the upper insulating layer comprises:

a first step of forming a nonmagnetic high-hardness layer having approximately the same hardness as the first core layer over the first core layer, the gap spacer layer, the lower core layer and the surface of the lower insulating layer, a second step of machining a surface of the nonmagnetic high-hardness layer, the surface of the first core layer and the surface of the lower insulating layer to make the surfaces planar, and a third step of forming the upper insulating layer over the lower insulating layer with the coil layer interposed therebetween.

7. A process for producing a thin film magnetic head according to claim 6 wherein the first step forms a nonmagnetic electrically conductive layer over opposite side faces, with respect to the direction of the track width, of the first core layer, the gap spacer layer and the core portion of the lower core layer and over an upper surface of a lower layer portion of the lower core layer, and thereafter forms the nonmagnetic high-hardness layer over a surface of the nonmagnetic electrically conductive layer.

8. A process for producing a thin film magnetic head comprising a procedure for fabricating a magnetoresistance effect head element on a substrate, and a procedure for fabricating an inductive head element on the head element, the inductive head element fabricating procedure comprising the steps of:

forming a lower magnetic layer on the magnetoresistance effect head element, forming a gap spacer layer on a surface of the lower magnetic layer, forming an upper magnetic layer on a surface of the gap spacer layer, forming on a surface of the upper magnetic layer a first resist layer extending from a surface to be opposed to a recording medium to a position retracted by a predetermined gap depth, subjecting at least the upper magnetic layer to a first etching process with the first resist layer formed thereon to remove the upper magnetic layer extending rearward from a rear end face of the first resist layer in the direction of the gap depth, removing the first resist layer, forming a lower insulating layer over the upper magnetic layer and a surface to be etched, machining a surface of the lower insulating layer and the surface of the upper magnetic layer to make the surfaces planar, coating the surface of the upper magnetic layer and the surface of the lower insulating layer with a resist, forming a second resist layer by exposing the resulting resist coating to light and developing the exposed resist coating, the resist layer having the same width as a track width on the recording medium in the vicinity of the medium-opposed face, subjecting the upper magnetic layer, the gap spacer layer and an upper layer portion of the lower magnetic layer to a second etching process with the second resist layer formed on the magnetic layer to remove the upper magnetic layer, the gap spacer layer and the upper layer portion of the lower magnetic layer at the parts thereof extending outward from opposite sides of the second resist layer with respect to the direction of the track width, thereby form the upper layer portion of the lower magnetic layer into a core portion constituting a lower core layer and having the same width as the track width on the recording medium in the vicinity of the medium-opposed face and thereby form the upper magnetic layer into a first core layer having the same width as the track width on the recording medium in the vicinity of the medium-opposed face, removing the second resist layer, forming an upper insulating layer over the lower insulating layer with a coil layer interposed therebetween, and forming a second core layer on a surface of the first core layer and a surface of the upper insulating layer to form an upper core layer comprising the first core layer and the second core layer, the second core layer extending from the medium-opposed face over the upper surface of the first core layer and further over the upper surface of the upper insulating layer.

9. A process for producing a thin film magnetic head according to claim 8 wherein the upper insulating layer forming step comprises:

a first step of forming a nonmagnetic high-hardness layer 11 having approximately the same hardness as the first core layer over the first core layer, the gap spacer layer, lower core layer and the surface of the lower insulating layer, a second step of machining a surface of the nonmagnetic high-hardness layer, the surface of the first core layer and the surface of the lower insulating layer to make the surfaces planar, and a third step of forming the upper insulating layer over the lower insulating layer with the coil layer interposed therebetween.

10. A process for producing a thin film magnetic head according to claim 9 wherein the first step forms a nonmagnetic electrically conductive layer over opposite side faces, with respect to the direction of the track width, of the first core layer, the gap spacer layer and the core portion of the lower core layer and over an upper surface of a lower layer portion of the lower core layer, and thereafter forms the nonmagnetic high-hardness layer over a surface of the nonmagnetic electrically conductive layer.

11. A process for producing a thin film magnetic head comprising a procedure for fabricating a magnetoresistance effect head element on a substrate, and a procedure for fabricating an inductive head element on the head element, the inductive head element fabricating procedure comprising the steps of:

forming a lower magnetic layer on the magnetoresistance effect head element, forming a gap spacer layer on a surface of the lower magnetic layer, forming on a surface of the gap spacer layer an insulating layer extending rearward from a position retracted from a face to be opposed to a recording medium by a predetermined gap depth and having a slanting face inclined rearward from the retracted position to a gradually elevated level, forming an upper magnetic layer over the surface of the gap spacer layer and a surface of the insulating layer, forming on a surface of the upper magnetic layer a resist layer having the same width as a track width on the recording medium in the vicinity of the medium-opposed face and having a rear end face perpendicular to the substrate on the slanting face of the insulating layer, etching the upper magnetic layer, the gap spacer layer and an upper layer portion of the lower magnetic layer with the resist layer formed on the upper magnetic layer to remove the upper magnetic layer, the insulating layer, the gap spacer layer and an upper layer portion of the lower magnetic layer at the parts thereof extending rearward beyond the rear end face of the resist layer, align rear ends of the upper magnetic layer, the insulating layer, the gap spacer layer and the upper layer portion of the lower magnetic layer on a vertical plane, form the insulating layer into a depth end defining layer, remove the upper magnetic layer, the insulating layer, the gap spacer layer and the upper layer portion of the lower magnetic layer at the parts thereof extending outward from opposite sides of the resist layer with respect to the direction of the track width, form the upper layer portion of the lower magnetic layer into a core portion having the same width as the track width in the vicinity of the medium-opposed face and provide a lower core layer including the core portion, forming a nonmagnetic high-hardness layer having approximately the same hardness as the upper magnetic layer over the upper magnetic layer, the depth end defining layer, the gap spacer and a surface of the lower core layer, forming a first core layer by machining a surface of the nonmagnetic high-hardness layer and the surface of the upper magnetic layer to a depth not reaching the depth end defining face to make the surfaces planar, expose the entire surface of the upper magnetic layer and form the upper magnetic layer into the first core layer, forming an upper insulating layer over a surface region of the nonmagnetic high-hardness layer formed rearwardly of the first core layer by the machining with a coil layer interposed therebeween, and forming on a surface of the first core layer and a surface of the upper insulating layer a second core layer extending from the medium-opposed faces over the upper surface of the first core layer and further over the upper surface of the upper insulating layer to provide an upper core layer comprising the first core layer and the second core layer.

* * * * *